US010800667B1

(12) United States Patent
Janicki et al.

(10) Patent No.: US 10,800,667 B1
(45) Date of Patent: Oct. 13, 2020

(54) SYSTEM AND METHOD FOR MULTI-FUNCTIONAL SLURRY PROCESSING

(71) Applicant: Sedron Technologies, LLC, Sedro Woolley, WA (US)

(72) Inventors: Peter William Janicki, Mount Vernon, WA (US); Sara Amber Van Tassel, Sedro Woolley, WA (US); John Edward Weller, Bellingham, WA (US); Stanley James Janicki, Mount Vernon, WA (US); Warren Lewis Heartwood, Bow, WA (US); Keith Boyd Fackler, II, Bellingham, WA (US); Alex James Gross, Sedro Woolley, WA (US); Tyler Everett Hamke, Bellingham, WA (US); Austin George Law, Bellingham, WA (US); Eric Christopher McBride, Mount Vernon, WA (US); Ann Kate Nowinski, Lynnwood, WA (US); Liam Joseph Potocsnak, Lake Stevens, WA (US); James O'Keefe Armstrong, Sedro Woolley, WA (US)

(73) Assignee: SEDRON TECHNOLOGIES, LLC, Sedro Woolley, WA (US)

( * ) Notice: Subject to any disclaimer, the term of this patent is extended or adjusted under 35 U.S.C. 154(b) by 0 days.

(21) Appl. No.: 16/403,066

(22) Filed: May 3, 2019

Related U.S. Application Data

(60) Provisional application No. 62/666,668, filed on May 3, 2018.

(51) Int. Cl.
*C02F 1/04* (2006.01)
*B01D 1/22* (2006.01)
(Continued)

(52) U.S. Cl.
CPC ............. *C02F 1/041* (2013.01); *B01D 1/225* (2013.01); *B01D 1/24* (2013.01); *B01D 1/284* (2013.01);
(Continued)

(58) Field of Classification Search
CPC .......... B01D 1/24; B01D 1/225; B01D 1/284; B01D 5/006; B01D 5/009; B01D 5/0039;
(Continued)

(56) References Cited

U.S. PATENT DOCUMENTS

| 4,269,719 | A | * | 5/1981 | Yamamoto | ............. | B01D 1/228 |
| | | | | | | 210/150 |
| 5,534,118 | A | * | 7/1996 | McCutchen | ............. | B01D 3/10 |
| | | | | | | 202/205 |
| 5,810,975 | A | * | 9/1998 | Bourdel | ................. | B01D 1/225 |
| | | | | | | 159/11.3 |

* cited by examiner

*Primary Examiner* — Jonathan Miller
*Assistant Examiner* — Gabriel E Gitman
(74) *Attorney, Agent, or Firm* — Karr Tuttle Campbell; Paul Heynssens

(57) ABSTRACT

A multi-functional slurry processing system ("VARCOR") and associated methods is disclosed. The present examples provide a multi-functional slurry processing system incorporating systems and methods for separating liquid and solid components in slurries. In particular the systems and methods described herein produce clean water, dried solids, and potential concentration of desirable constituents with a boiling point lower than water. At least one example of the multi-functional slurry processing system provides a self-contained processing facility configured to efficiently convert high water-content slurries into its constituent solid and liquid fractions and subsequently generating and collecting clean water and concentrating desirable constituents with a boiling point lower than water. The multi-functional slurry processing system advantageously applies thermodynamic principles in a system which may include various combina-
(Continued)

tions of a preheater, a degassing unit, a dryer, a steam filter, a compressor, a concentrating tower, and a condensation unit.

20 Claims, 42 Drawing Sheets

(51) Int. Cl.
*B01D 1/24* (2006.01)
*B01D 1/28* (2006.01)
*B01D 5/00* (2006.01)
*F26B 3/20* (2006.01)
*B01D 19/00* (2006.01)
*F26B 11/04* (2006.01)
*C02F 11/13* (2019.01)
*C02F 3/08* (2006.01)
*C02F 11/12* (2019.01)

(52) U.S. Cl.
CPC .............. *B01D 5/006* (2013.01); *B01D 5/009* (2013.01); *B01D 5/0039* (2013.01); *B01D 19/0042* (2013.01); *B01D 19/0068* (2013.01); *C02F 3/08* (2013.01); *C02F 3/082* (2013.01); *C02F 11/13* (2019.01); *F26B 3/20* (2013.01); *F26B 11/0409* (2013.01); *C02F 11/12* (2013.01); *F26B 2200/18* (2013.01)

(58) Field of Classification Search
CPC . B01D 19/0042; B01D 19/0068; C02F 1/041; C02F 11/12; C02F 11/13; C02F 3/08; C02F 3/082; F26B 3/20; F26B 11/0409
See application file for complete search history.

Exemplary Computing Environment 3500

SYSTEM AND METHOD FOR MULTI-FUNCTIONAL SLURRY PROCESSING

CROSS REFERENCE TO RELATED APPLICATION

This application claims the benefit of U.S. Provisional Patent Application No. 62/666,668 filed May 3, 2018, the contents of which are hereby incorporated by reference.

TECHNICAL FIELD

This description relates generally to waste processing and reclamation and more specifically to slurry processing systems.

BACKGROUND

Many industries generate slurries (or equivalent waste streams) as a waste byproduct. These slurry producing industries may include industrial livestock production, food processing, septic waste, municipal wastewater treatment, pharmaceutical processing, cosmetics production, mining, military and relief efforts, and the like. Slurry generation ranges from small scale generation (i.e. household, commercial) to large scale generation (i.e. refinery, industrial). In addition, these slurries may contain one or more recoverable substances. These slurries typically require some type of disposal, either with or without treatment.

The simple disposal of slurries can lead to the waste of valuable recoverable resources contained in the slurries. In addition, if the slurries are not further processed or treated they can cause contamination issues in the environment. Accordingly, appropriate management and recovery processes applied to slurries might be desirable to mitigate their environmental impact. Some slurries are more challenging to process than others. Waste streams containing high levels of suspended solids, biochemical oxygen demand ("BOD"), and chemical oxygen demand ("COD") can be particularly challenging to treat.

Slurry processing has typically been processed in a dedicated plant, often custom designed for a given type of processing, especially where processing might be challenging. Such plants are typically expensive to construct and operate and require skilled operators to run and maintain the slurry processing plant. Current slurry processing plants are typically not easily scalable to accommodate varying capacities of slurry. These limitations can result in slurries simply being buried, or dumped into a water way rather than being disposed of properly.

While simply burying slurry, or dumping slurry into waterways is typically the most economical way to dispose of waste for the party creating the slurry, such methods of disposal generate a cost borne by society in general. Aside from a general desire not to spoil the environment, laws and regulations have often been created to compel safe disposal of such slurries, with the cost of further processing, or safe disposal being borne by the party that generates them, and ultimately the consumer of the goods producing the slurry. To keep prices for their products competitive, and to not pollute the environment, it may be desirable to process slurries as cost effectively as possible, in a non-polluting manner. If the processed slurries can create an additional product that can be sold or used, an additional benefit may be provided.

Accordingly, there is a need for economical and scalable slurry processing system that adequately separates the solid and liquid fraction from one another to recover valuable resources such as clean water and nutrients and to keep waste out of the environment.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide a multi-functional slurry processing system incorporating systems and methods for separating liquid and solid components in slurries. This process is alternatively named Vapor Recompression for Concentration and Recovery ("Varcor" or "VARCOR"). In particular the systems and methods described herein produce clean water, dried solids, and potential concentration of desirable constituents with a boiling point lower than water (for example nutrient recovery in the form of ammonia-nitrogen). At least one example of the multi-functional slurry processing system provides a self-contained processing facility configured to efficiently convert high water-content slurries into its constituent solid and liquid fractions and subsequently generating and collecting clean water and potentially concentrating desirable low-boiling point constituents. The multi-functional slurry processor advantageously applies thermodynamic principles in a system which may include various combinations of a preheater, a degassing unit, a dryer (or equivalently an evaporator), a steam filter, a compressor, a concentrating tower, and a condensation unit.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
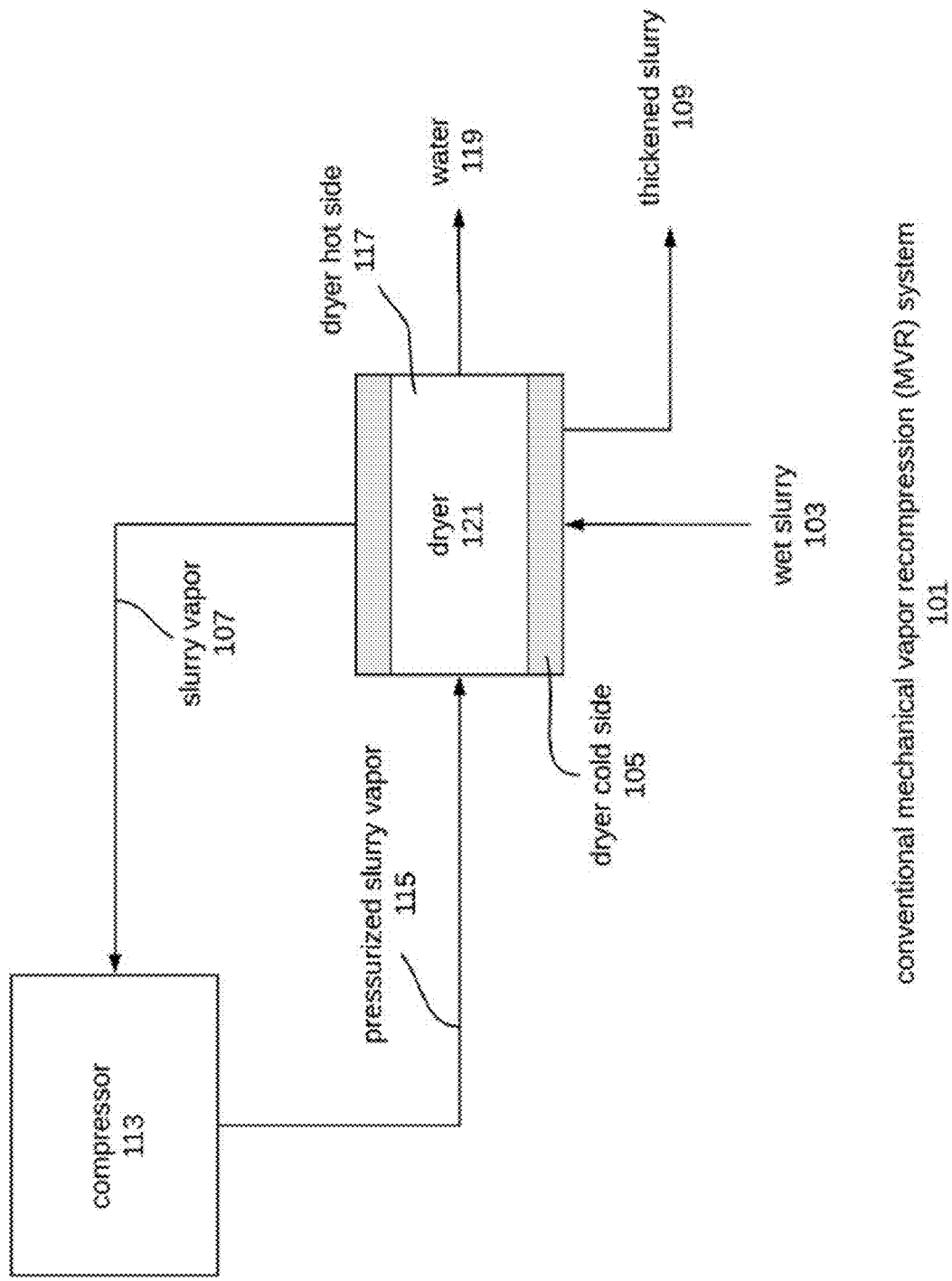
FIG. 1 is a block diagram of a conventional mechanical vapor recompression (MVR) system.

The examples below describe a multi-functional slurry processing system that separates solid and liquid fractions of the slurry and produces clean water, dried solids, and concentrates constituents with a boiling point lower than water that may be present. Although the present examples are described and illustrated herein as being implemented in a dairy manure slurry system, the system described is provided as an example and not a limitation. As those skilled in the art will appreciate, the present examples are suitable for application in a variety of different types of slurry processing systems.

A slurry is a typically thin fluid mixture of a granular pulverized solids with a liquid (usually water), which may behave like thick fluids, flowing under gravity and are also capable of being pumped if not too thick. In particular, a manure slurry, may be a mixture of animal waste, organic matter, and sometimes water that may be referred to simply as a "slurry" in agricultural use, and as used describing the examples herein.

Human activity can create large quantities of waste and wastewater—e.g. septage, fracking water, pre-consumer food, beer, wine and soda production, commercial operations, industrial facilities, dairy, cattle, swine and poultry feeding operations. Waste and wastewater can be generated in a range of facilities from small scale systems (i.e. household, commercial) up to large scale facilities and complexes (i.e. refineries, industrial sites). Consequentially substantial sums of money may be expended on disposal surcharges, hauling and tipping fees, and various waste treatment solutions. Currently, these industries do not have a simple, cost-effective and environmentally-friendly solution for the separation, treatment or disposal of these waste streams, and in particular the challenges posed by high levels of suspended solids, biochemical oxygen demand (BOD), and chemical oxygen demand (COD) that may be present in these streams.

Current methods for treating wet slurries such as anaerobic digestion, landfilling, and aerobic storage ponds have several drawbacks. Anaerobic digestion requires a large capital investment, a constant feed stream, and continuous monitoring to ensure proper operation and maintenance. Additional drawbacks to anaerobic digestion are the generation of a wet solid stream that requires further processing, the inability to entirely eliminate pathogens, and the lack of desirable constituent recovery and/or concentration (such as nutrients). Landfilling requires hauling long distances at great expense and risk of spills. Organic waste placed in landfills can contribute to methane gas production, which increases greenhouse gas emissions. Aerobic storage ponds require the slurry stream to be continuously pumped and agitated until disposal or application to fields occurs, have a large footprint, and usually have little to no pathogen treatment of the slurry stream.

The multi-functional slurry processing system tends to provide a cost effective, environmentally-friendly, and robust self-contained processing facility configured to convert high water-content slurries into its constituent solid and liquid fractions generating and collecting clean water and allowing for recovery and concentration of desirable low-boiling point constituents. Potential revenue sources can be generated from the sale of output products such as pathogen-free, nutrient-rich organic fertilizers (depending on the input slurry stream). A reduction in disposal costs of waste slurries is achieved through a significant reduction in waste volumes. Lower operating costs for slurry processing are achieved from offsets received from the sale of value-added byproducts, recycling of clean water, and reduction in transportation and pumping costs.

For example, when dairy manure is used as an input to the system the following valuable outputs are generated: 1) dry, pathogen-free solids that can provide beneficial use as a fertilizer, soil amendment, bedding material, or a fuel source for power generation, 2) clean, pathogen-free liquid water that can provide beneficial use as animal drinking water, irrigation water, or reclaimed water, and 3) a concentrated, nitrogen-rich liquid that can be used as a fertilizer. Depending on the input to the system, output products can be considered organic which can be advantageous in the agricultural industry.

The present examples described herein are cost effective as a result of being tremendously efficient in energy consumption. The system requires roughly 25 times less energy to evaporate water from the wet slurry than the energy necessary to boil the wet slurry directly. Additional energy efficiency savings can be recognized with the present technology. For example, energy efficiency can result from significant reductions in electrical and fuel use required during current slurry management activities such as wastewater storage, agitation, pumping, truck hauling, and associated labor/maintenance costs.

The multi-functional slurry processing system has several environmentally-friendly advantages including improved water, soil, and air quality as a result of its use. Clean water is generated for reuse or discharged to the environment to assist in the maintenance of at-risk stream flows. Due to the high temperature of the system, outputs generated are pathogen-free which eliminates the risk of fecal coliform bacteria run-off or leaching into surface or ground water if the material is applied to fields or stored outside. The use of this technology reduces on-site storage requirements for waste wet slurry streams, thereby eliminating greenhouse gas emissions, ammonia, and odors generated from storage lagoons.

For example, when processing cow manure recovered dried solids are pathogen-free eliminating the risk of fecal coliform bacteria run-off when the solids are used as a fertilizer. A further example with the processing of cow manure is eliminating the risk of nutrient run-off though the production of a concentrated, nitrogen fertilizer that allows for precise, site-specific, variable rate application of nitrogen to fields. Concentration and drying allows for the economical transport of nutrients from areas of high concentration to areas in need of these nutrients.

The multi-functional slurry processing system is robust in accepting a wide range of input streams with relatively high variability and can be turned off in a matter of hours rather than days as compared to technologies that rely on biological processes. The improvements and advantages provided by the multi-functional slurry processing system will be further appreciated by its comparison to a mechanical vapor recompression (MVR) system.

Mechanical Vapor Recompression (MVR) Systems

FIG. 1 is a block diagram of a conventional mechanical vapor recompression ("MVR") system 101. This system typically relies on mechanical vapor recompression to evaporate liquid from the wet slurry. Wet slurry 103 enters the dryer cold side 105 (there is one physical dryer 121 having a cold side 105 and a hot side 117) and is separated into slurry vapor 107 and thickened slurry 109 through the transfer of heat. The evaporated slurry vapor 107 is passed through a compressor 113, undergoing mechanical vapor recompression. The compressor 113 adds energy to the slurry vapor 107 resulting in a smaller volume of vapor, at a higher temperature and pressure, which can be used to do useful work. The pressurized slurry vapor 115 is sent to the dryer hot side 117 where it comes into indirect contact with the incoming wet slurry 103. Heat is transferred from the pressurized slurry vapor 115 to the incoming wet slurry 103. As the pressurized slurry vapor 115 transfers heat to the incoming wet slurry 103 it condenses and forms a water 119 output. Mechanical vapor recompression allows the transfer of heat from the dryer hot side 117 to the dryer cold side 105 resulting in energy recovery. Rather than wasting the heat from condensation of the pressurized slurry vapor 115, mechanical vapor recompression allows the heat to be recovered and used in the evaporation process.

Figure 2:
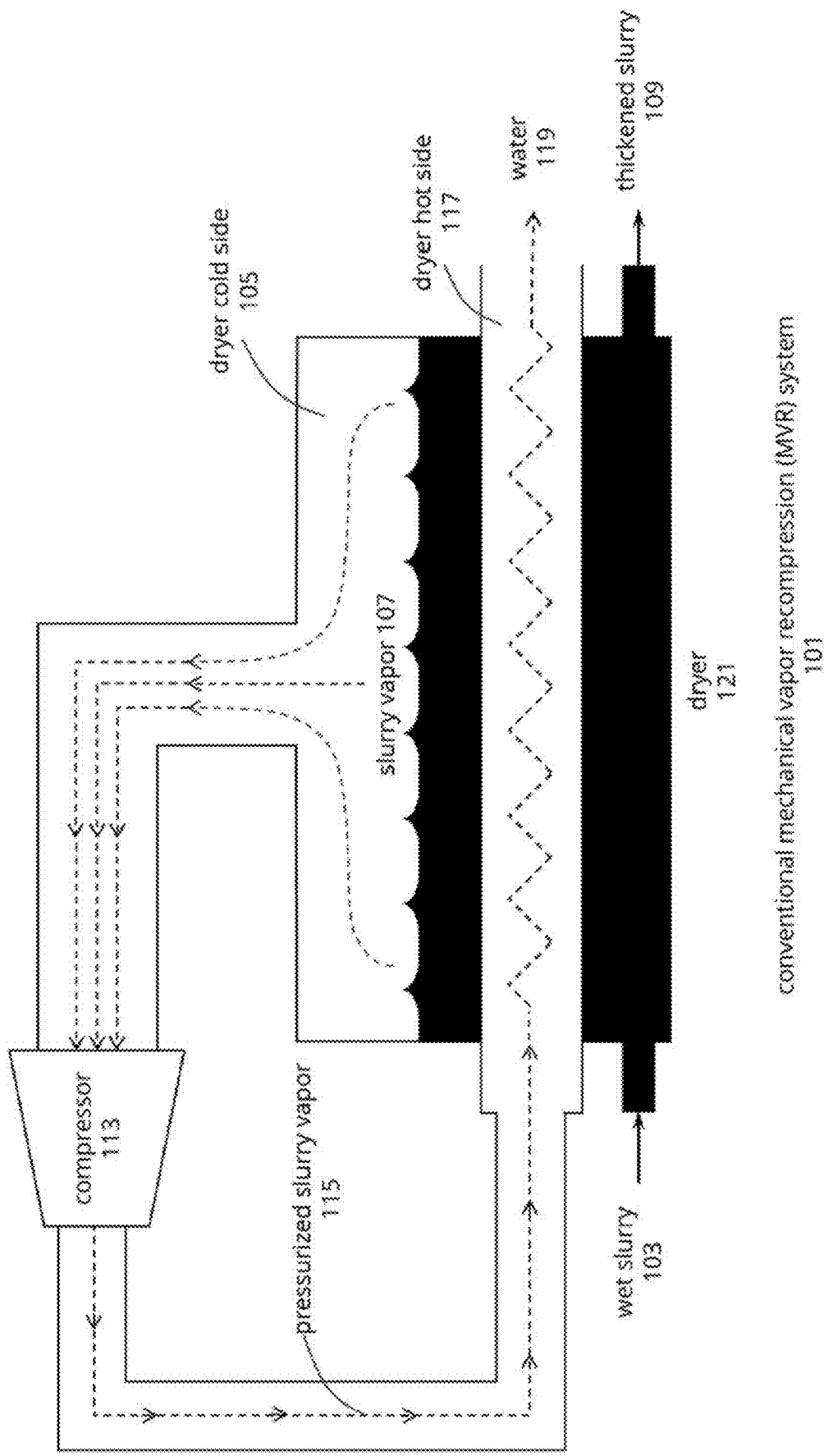
FIG. 2 shows the operation of a conventional mechanical vapor recompression (MVR) system.

FIG. 2 shows the operation of the conventional mechanical vapor recompression (MVR) system 101 described in FIG. 1. Wet slurry 103 enters a dryer 121, where slurry vapor 107 is collected and applied to a compressor 113. Pressurized slurry vapor 115 is fed back to the dryer 121 where water 119 is produced as an output. The slurry vapor 107 removal results in a thickened slurry 109 as an output.

Although a MVR system is capable of separating water from solids, there are numerous shortcomings with the MVR type of system that are overcome by the multi-functional slurry processing system described below. In particular the shortcomings of the MVR system include inefficient thermodynamic operation, incomplete purification of water, no constituent recovery or concentration, and inability to produce dried solids.

As such the multi-functional slurry processing system is a substantial improvement over the conventional mechanical vapor recompression system 101, in that a unique combination of components allows the processing of slurry to be carried out more efficiently and cost-effectively. The separation of liquid and solid constituents is more efficient than in conventional mechanical vapor recompression (MVR) systems resulting in a dried solid output rather than thickened slurry 109. The present invention also allows the scaling of the multi-functional slurry processing system to process both small and large volumes of wet slurry. In addition, the multi-functional slurry processing system removes low-boiling point constituents from the incoming wet slurry, to produce a clean water product, and destroys pathogens in the solid and liquid outputs. The multi-functional slurry processing system allows for the concentration of constituents possessing boiling points lower than water if desired.

The Multi-Functional Slurry Processing System

Figure 3:
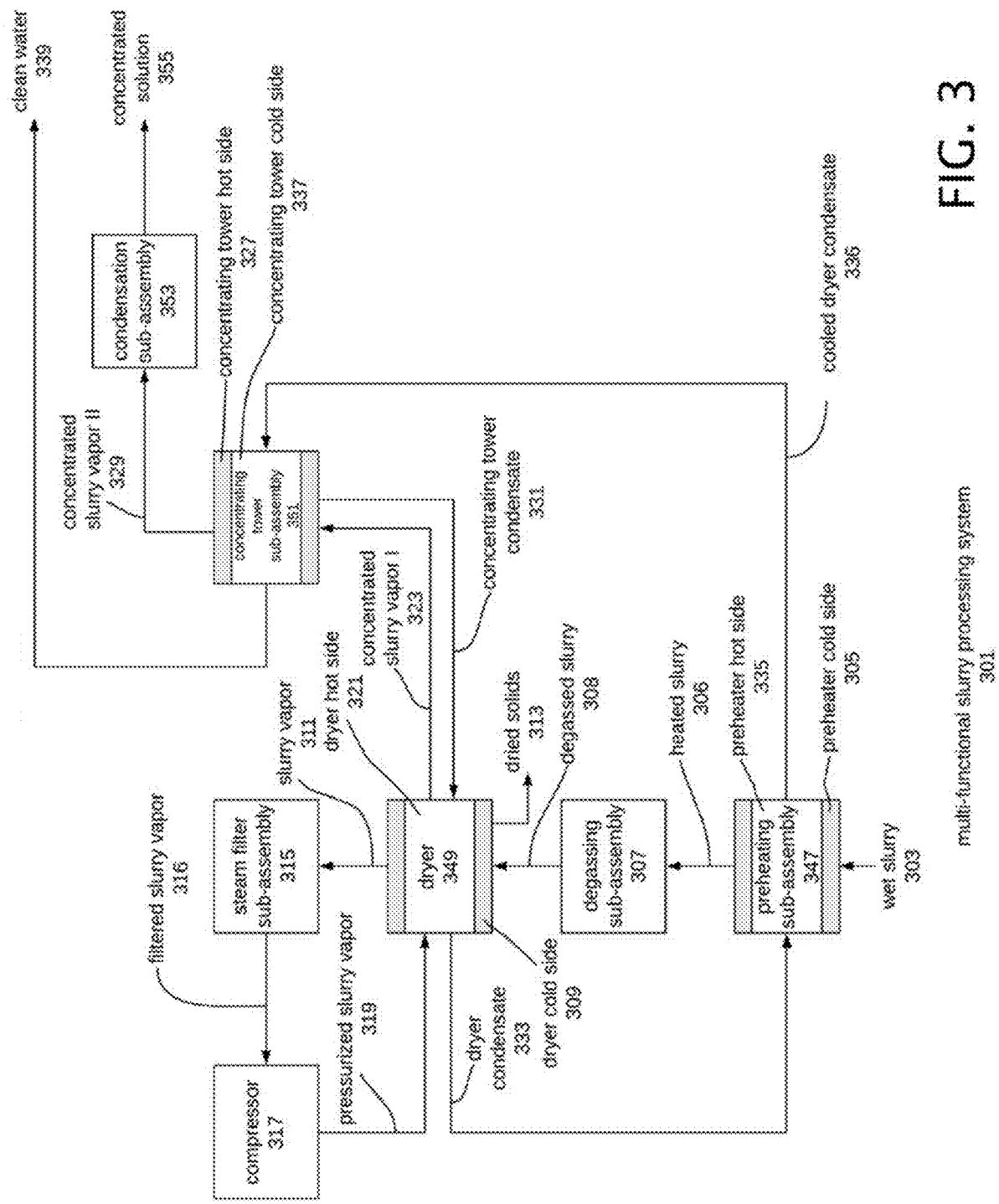
FIG. 3 is a block diagram of a multi-functional slurry processing system.
Figure 4:
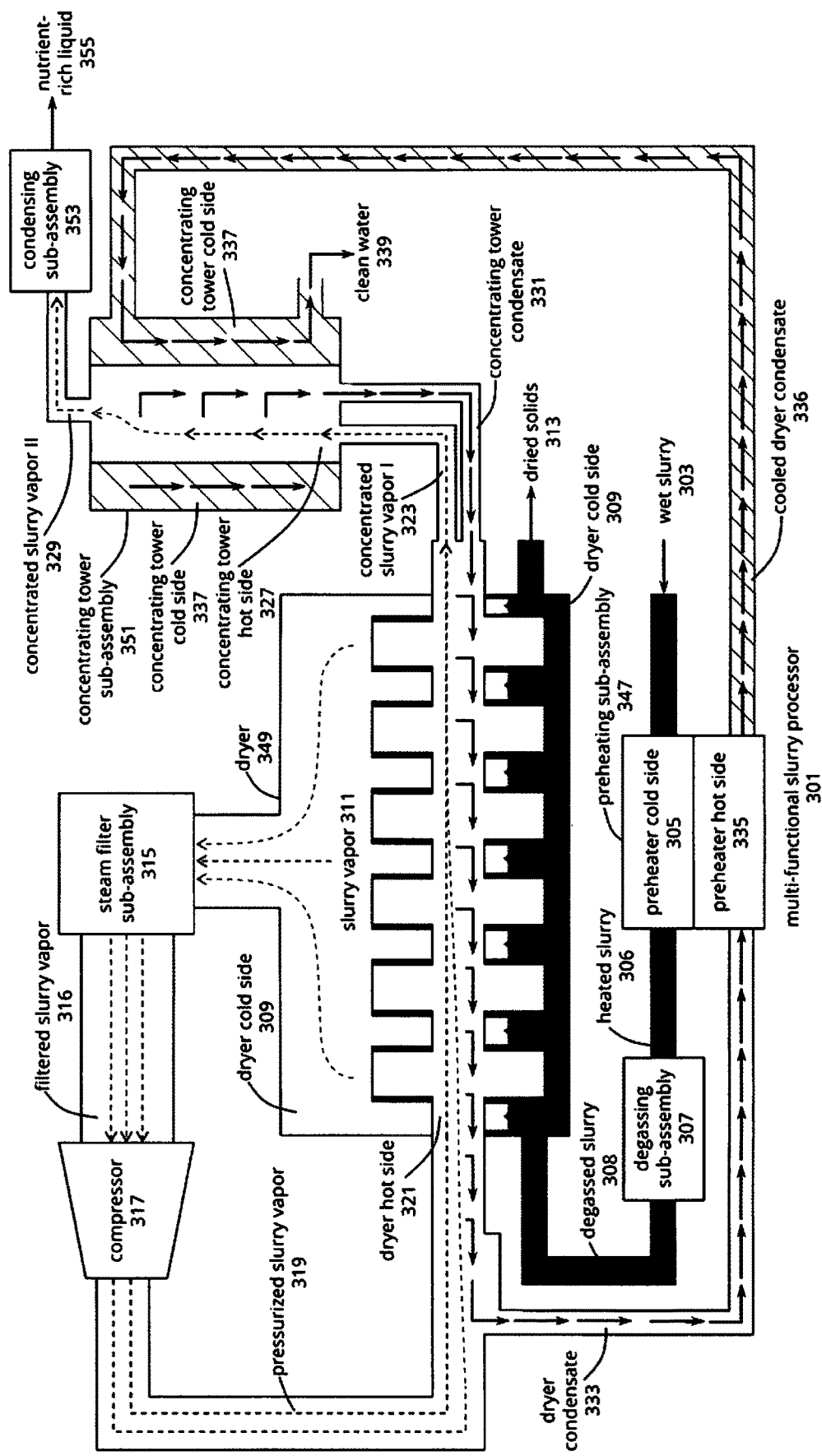
FIG. 4 shows the operation of the multi-functional slurry processing system.

FIG. 3 is a block diagram of a new multi-functional slurry processing system 301. A preheating sub-assembly 347 is used to preheat wet slurry 303. Wet slurry 303 enters the preheater cold side 305 (there is typically one physical preheating sub-assembly 347 having a cold side 305 and a hot side 335). Heat input to the preheating sub-assembly 347 is provided from a heat source such as the dryer condensate 333 present at the hot side of the preheater 335. Heated slurry 306 is outputted to a degassing sub-assembly 307.

A degassing sub-assembly 307 may be used to suppress foaming of the heated slurry 306. The degassing sub-assembly 307 allows for the removal of non-condensables from the heated wet slurry 306 that has been raised in temperature close to its boiling point. Concurrent with degassing, clarification of the slurry can also happen at this point to remove any heavy grit from the slurry, if desired. Clarification may be accomplished by methods know to those skilled in the art.

A dryer 349 is utilized to principally dry the degassed slurry 308 and produce dried solids 313. The dryer 349 also produces slurry vapor 311 which is fed back to the dryer as a heat source to aid drying. The dryer also processes concentrating tower concentrate 331. Following the degassing sub-assembly 307, the degassed slurry 308 enters the dryer cold side 309 (there is one physical dryer 349 having a cold side 309 and a hot side 321). The dryer cold side 309 outputs slurry vapor 311 and dried solids 313.

A direct application sub-assembly 360 may optionally be employed to promote uniform application and drying of the degassed slurry 308. There is an optional output of a portion of the degassed slurry 308 from the dryer cold side 309 fed to the direct application sub-assembly 360. Direct application sub-assembly 360 re-introduces a portion of the degassed slurry 308 to the dryer to aid the drying process. The direct application sub-assembly 360 may be considered a separate sub-assembly as shown, or may alternatively be considered as an optional component of the dryer 349. Heat input to the dryer 349 is provided from the hot side of the dryer 321.

Steam Filter sub-assembly 315 may be used to remove particulates from the slurry vapor 311. After exiting the dryer 349, slurry vapor 311 passes through an optional steam filter sub-assembly 315 to remove particulates. Following the steam filter sub-assembly 315, the filtered slurry vapor 316 enters a conventionally constructed compressor 317 and is pressurized causing an increase in temperature of the slurry vapor. The pressurized slurry vapor 319 is then routed to the dryer hot side 321 where it provides heat to evaporate the incoming wet degassed slurry 308 producing slurry vapor 311.

The dryer hot side 321 also outputs concentrated slurry vapor I 323. Concentrated slurry vapor I typically possesses a higher concentration of low-boiling point constituents, such as ammonia, alcohol, or the like, than slurry vapor 319 and dryer condensate 333. As heat is transferred to the dryer cold side 309, a portion of the pressurized slurry vapor 319 condenses forming dryer condensate 333. The remainder of the pressurized slurry vapor 319 is reduced in volume and concentrated in low-boiling point constituents to form a concentrated slurry vapor I 323. The concentration of slurry vapor 319 uniquely occurs in the dryer 349 without the additional input of energy that is typically required during conventional concentrating (distillation) processes.

The concentrated slurry vapor I 323 may subsequently enter the optional concentrating tower sub-assembly 351. The concentrated slurry vapor I 323 enters the concentrating tower hot side 327 (there is typically one physical concentrating tower sub-assembly 351 having a cold side 337 and a hot side 327). The concentrating tower hot side 327 outputs concentrated slurry vapor II 329 (concentrated slurry vapor II 329 typically possesses a higher concentration of low-boiling constituents than concentrated slurry vapor I 323) and concentrating tower condensate 331. As heat is removed from the concentrating tower hot side 327 to the concentrating tower cold side 337, a portion of the concentrated slurry vapor I 323 condenses forming concentrating tower condensate 331. The remainder of the concentrated slurry vapor I 323 is reduced in volume and further concentrated in constituents having a lower boiling point than water to form a concentrated slurry vapor II 329.

Following the concentrating tower sub-assembly 351, the concentrated slurry vapor II 329 enters the optional condensation sub-assembly 353 where it is condensed and recovered as a concentrated solution 355 rich in low-boiling point constituents. The concentrated slurry vapor II 329 passes through a condenser 351 followed by a phase separator (not shown). The temperature of the condenser 351 is adjusted to a desired temperature slightly below saturation through the use of a cooler or heat exchanger. The phase separator (not shown) removes volatile organic compounds, non-condensables, and some water vapor from the condensed concentrated slurry vapor II 329. The concentrated slurry vapor II 329 condensate flows through a mesh screen (not shown) before entering the phase separator to coalesce water droplets. The liquid condensate phase can be passed through a condensate filter to trap any particulates. The outputted concentrated solution 355 condensate is pathogen-free and has a substantial amount of high-boiling point constituents (such as metals, minerals, salts, and the like) removed. When dairy manure is processed the concentrated solution 355 contains a high percentage of nutrient ammonia-nitrogen which can be used as a valuable fertilizer. In some instances it may not be desirable to further concentrate the pressurized slurry vapor 319 or concentrated slurry vapor I 323 or there may not be any low-boiling point constituents present in the incoming slurry 303 in which case the concentrating tower sub-assembly 351 and/or the condensation sub-assembly 353 need not be used.

After exiting the concentrating tower hot side 327, the concentrating tower condensate 331 flows back to the dryer hot side 321. The concentrating tower condensate 331 combines with dryer condensate 333 and exits the dryer hot side 321. After exiting the dryer hot side 321, the dryer condensate 333 flows through the preheater hot side 335 where it transfers heat to the incoming wet slurry 303. Following the preheater hot side 335, a portion of the cooled dryer condensate 336 may flow through the concentrating tower cold side 337 where it removes heat from the concentrated slurry vapor I 323. Alternative cooling medium may be used other than cooled dryer condensate 336. Finally, the condensate exits the system as clean water 339.

FIG. 4 shows the operation of a multi-functional slurry processing system 301. This system 301 receives and processes a flow of wet slurry 303 and separates the slurry into at least two fractions composed of dried solids 313 and clean water 339. In equivalent examples the principles of this disclosure may be applied to non-aqueous solutions as well. Additional fractions such as a concentrated solution 355 containing concentrated low-boiling point constituents (such as ammonia-nitrogen, alcohol, or the like) can also be recovered.

Wet slurry 303 enters through the preheating sub-assembly 347. The preheating sub-assembly 347 allows for more efficient heat recovery in the system leading to lower operating costs and increased performance.

Following the preheating sub-assembly 347, heated slurry 306 enters the degassing sub-assembly 307. The degassing sub-assembly 307 removes non-condensable gases from the incoming heated slurry 306 and eliminates foam in the incoming material. The degassing sub-assembly 307 allows for the processing of materials that foam which are traditionally difficult to deal with in typical dryers. In addition, the degassing sub-assembly 307 removes non-condensables from the system such as carbon dioxide, air, and others which can interfere with the concentration of low-boiling point constituents and with condensation of the pressurized slurry vapor 319. The removal of non-condensables improves the concentration of constituents that posses a boiling point lower than water in the dryer sub-assembly 349 and in the concentrating tower sub-assembly 351. The degassing sub-assembly can also act like a clarifier, removing any heavy particles from the slurry stream that may cause damage to downstream components of the system.

Following the degassing sub-assembly 307, the degassed slurry 308 enters the dryer sub-assembly 349. Degassed slurry 308 is coated onto the outside of a heated rotating surface. The temperature of the heated surface is high enough such that once the slurry is picked up upon the surface it has turned to a substantially dry coating by the time it is scraped off. From the heated surface, degassed slurry 308 is separated into slurry vapor 311 and dried solids 313. In this example, the dryer 349 is shown containing rotating discs as the heated surface, but other drying devices can be used such as a rotating drums or the like. The dryer 349 contains several inventive features that allow it to efficiently dry the degassed slurry 308 including large rotating heated surfaces, "self-tracking" scrapers, and dried solid chutes for the removal of solids from the system. An optional direct application sub-assembly 360 can be adjunctly used with the dryer sub-assembly 349. This optional sub-assembly introduces an outlet flow of degasses slurry 308 to the direct application sub-assembly 360. This sub-assembly also introduces an outflow of degassed slurry 308 from the direct sub-assembly 360 to the dryer sub-assembly 349.

Phase separation occurs in the dryer 349 based on the operating temperature and pressure of the drying environment. Slurry constituents that boil at or below the operating temperature and pressure of the dryer cold side 309 evaporate from the heated surface. Slurry constituents with boiling points above the temperature and pressure of the dryer cold side 309 will not evaporate during drying but will remain with the solid fraction as a dried, pathogen-free solid 313 that can be scraped off the heated surface. These solids include constituents such as metals, minerals, salts, and the like. For example, when cow manure is processed high-boiling point constituents such as potassium, phosphorus, and organic nitrogen (and other nutrients) will be recovered in the dried solids 313 and can have value for use as a fertilizer or soil amendment. The dried, pathogen-free solid 313 material can have potential beneficial uses, including use as a combustible solid fuel material for energy recovery, animal bedding material, fertilizer, soil amendment, landfill cover among others.

The evaporated constituents, including water, from the degassed slurry 308 are extracted from the dryer 349 and are referred to as slurry vapor 311. The liberated slurry vapor 311 may be kept at a high temperature for a sufficient duration, so that the slurry vapor 311 is pathogen-free. The slurry vapor 311 exits the dryer 349 and then passes through an optional steam filter sub-assembly 315 to prevent particulate carry-over from the dried solids 313. This innovative feature leads to a much cleaner water output 339 from the system and prevents particles from fouling the remainder of the unit.

After exiting the optional steam filter sub-assembly 315, the filtered slurry vapor 316 is routed through a compressor 317 to increase the pressure of the filtered slurry vapor 316. In this example steam compression is utilized. In alternative examples equivalent compression methods may be utilized. The pressurized slurry vapor 319 increases in temperature providing a temperature differential that is used to dry the incoming degassed slurry 308. In one example, the pressurized slurry vapor 319 is passed through the inside of the drying discs and is used as a heat source to dry the incoming degassed slurry 308. Other examples may exist to transfer heat between the pressurized slurry vapor 319 and the incoming degassed slurry 308.

As the pressurized slurry vapor 319 transfers heat to the degassed slurry 308 the pressurized slurry vapor 319 partially condenses back into a liquid and forms dryer condensate 333. The pressurized slurry vapor 319 has the option to flow through each of the discs individually, in groups, or not at all; subsequently becoming concentrated in constituents that have a lower boiling point than water (such as ammonia, alcohol, or the like) if they are present in the slurry 308. Two possible flow paths of pressurized slurry vapors are described in later FIGS. 11 and 42. Partially condensing the pressurized slurry vapor 319 creates a water-rich liquid and a low-boiling point constituent-rich vapor due to the difference in volatility between the species. The concentration of low boiling-point constituents in the vapor phase is achieved without additional input of energy into the system 301.

The condensed slurry vapor from each disc (dryer condensate 333) typically flows in the opposite direction to the pressurized slurry vapor 319 and exits the dryer hot side 321 at the pressurized slurry vapor inlet. As the dryer condensate 333 flows countercurrent to the pressurized slurry vapor 319 it is stripped of low-boiling point constituents (such as ammonia) resulting in a clean water output 339.

The interior of the dryer hot side 321 contains several inventive features to allow for the concentration of species that have a lower boiling point than water. This design allows for the recovery and concentration of valuable low-boiling point constituents such as ammonia and for the production of cleaner water. The inventive features of the dryer internals include novel design of disc internals and the interior of the shaft to move dryer condensate 333 in a counter current flow to the pressurized slurry vapor 319 and load-bearing rotary unions that pump condensate. The multi-functional slurry processing system 301 differs from conventional mechanical vapor recompression systems 101 in that all the pressurized slurry vapor 319 does not condense in the dryer hot side 321. As the pressurized slurry vapor 319 passes through the dryer hot side 321 it is concentrated in species that have boiling points lower than water and a small fraction of pressurized slurry vapor 319 exits the dryer 349 as concentrated slurry vapor I 323.

Typically, not all the pressurized slurry vapor 319 is condensed in the dryer hot side 321. In some instances, if there are no low-boiling point constituents present or if concentration of constituents is undesired then all the slurry vapor 319 may be condensed in the dryer 349 and no concentrated slurry vapor I 323 would be generated. The concentrated slurry vapor I 323 that exits the dryer hot side 321 can optionally be further processed in the concentrating tower sub-assembly 351. The concentrating tower sub-assembly 351 increases the concentration of low-boiling point constituents (boiling point lower than water) in the vapor phase to form concentrated slurry vapor II 329. The concentrated slurry vapor II 329 stream typically contains higher concentrations of low-boiling point constituents (such as ammonia, alcohol, light hydrocarbons, or the like if present) than the concentrated slurry vapor I 323 stream.

The outside jacket of the concentrating tower cold side 337 contains a cooling medium (typically cooled dryer condensate 336 from the preheating sub-assembly 347) which is used to partially condense the concentrated slurry vapor I 323 on the inside of the concentrating tower hot side 327. Partially condensing the concentrated slurry vapor I 323 creates a water-rich liquid 331 and a low-boiling point constituent-rich vapor 329 due to the difference in volatility between the species. As saturated concentrated slurry vapor I 323 rises on the inside of the concentrating tower hot side 327 the vapor begins to condense forming concentrating tower condensate 331. As the concentrating tower condensate 331 flows down the concentrating tower hot side 327 it is additionally stripped volatile (low boiling point) constituents by the rising concentrated slurry vapor I 323. This process continues up the tower and results in the concentration of low-boiling point constituents (such as ammonia, alcohol, or the like) in the vapor phase 329.

The concentrating tower sub-assembly 351 is inventive because it relies on the concentrating tower condensate 331 falling countercurrent to the rising concentrated slurry vapor I 323 to strip out low-boiling point species and does not utilize a re-boiler to generate slurry vapor. This allows for efficient operation of the concentrating tower sub-assembly 351 and takes advantage of the pressurized slurry vapor 319 generated through the mechanical vapor recompression cycle. The concentration of low boiling-point constituents in the vapor phase 329 is achieved without additional input of energy into the system 301.

Concentrated slurry vapor II 329 exiting the top of the concentrating tower hot side 327 subsequently passes through the optional condensation sub-assembly 353. In the absence of the concentrating tower sub-assembly 351, the concentrated slurry vapor I 323 could be introduced into the condensation sub-assembly 353. The condensation sub-assembly 353 is comprised of a condenser and phase separator (not shown) to condense out low-boiling point constituents and water to form a concentrated solution 355. For example, when cow manure is processed the concentrated solution 355 can be utilized as a fertilizer since it is nutrient-rich in ammonia-nitrogen. Any remaining non-condensables and some volatile organic compounds ("VOC"s) pass out of the phase separator and are destroyed or trapped accordingly, for example via the use of a flare or bio-filter. The concentrated solution 355 is pathogen-free and excludes constituents that do not boil out from the wet slurry 303. Constituents that do not boil out from the wet slurry 303 include high-boiling point constituents such as minerals, metals, salts, and the like.

The concentrating tower condensate 331 leaving the concentrating tower hot side 327 returns back through the dryer hot side 321 and joins with dryer condensate 333 typically exiting the opposite side of the dryer hot side 321. The counter current flow of pressurized slurry vapor 319 and dryer condensate 333 in the dryer hot side 321 leads to the stripping of low boiling point species from the dryer condensate 333 resulting in a clean water output 339. The dryer condensate 333 exiting the dryer hot side 321 is used as a heat source to preheat the incoming wet slurry 303 and can subsequently be used as a heat sink to condense concentrated slurry vapor I 323 in the concentrating tower sub-assembly 351 if desired. The clean water output 339 can undergo further processing using conventional water treatment methods, such as membrane filtration, oxidation (via ozone and/or hydrogen peroxide), activated carbon filtration, reverse osmosis, chlorination, and the like.

Accordingly, and as described above the multi-functional slurry processing system 301 is an improvement over a conventional mechanical vapor recompression system 101 allowing for more complete and efficient separation of wet slurry 303 into clean water 339 and dried solids 313, as well as the opportunity to concentrate and recover low-boiling point constituents in the form of a concentrated solution 355. The functions of the multi-functional slurry processing system 301 may be implemented into a scalable plant that may be easily shipped to a processing site and installed. The multi-functional slurry processing system 301 can accommodate processing of small-scale and large-scale slurry generating facilities. Components are typically constructed having a form factor to allow ease of shipping through conventional shipping, where they may be assembled on site.

Multi-Functional Slurry Processing Plant

Figure 5:
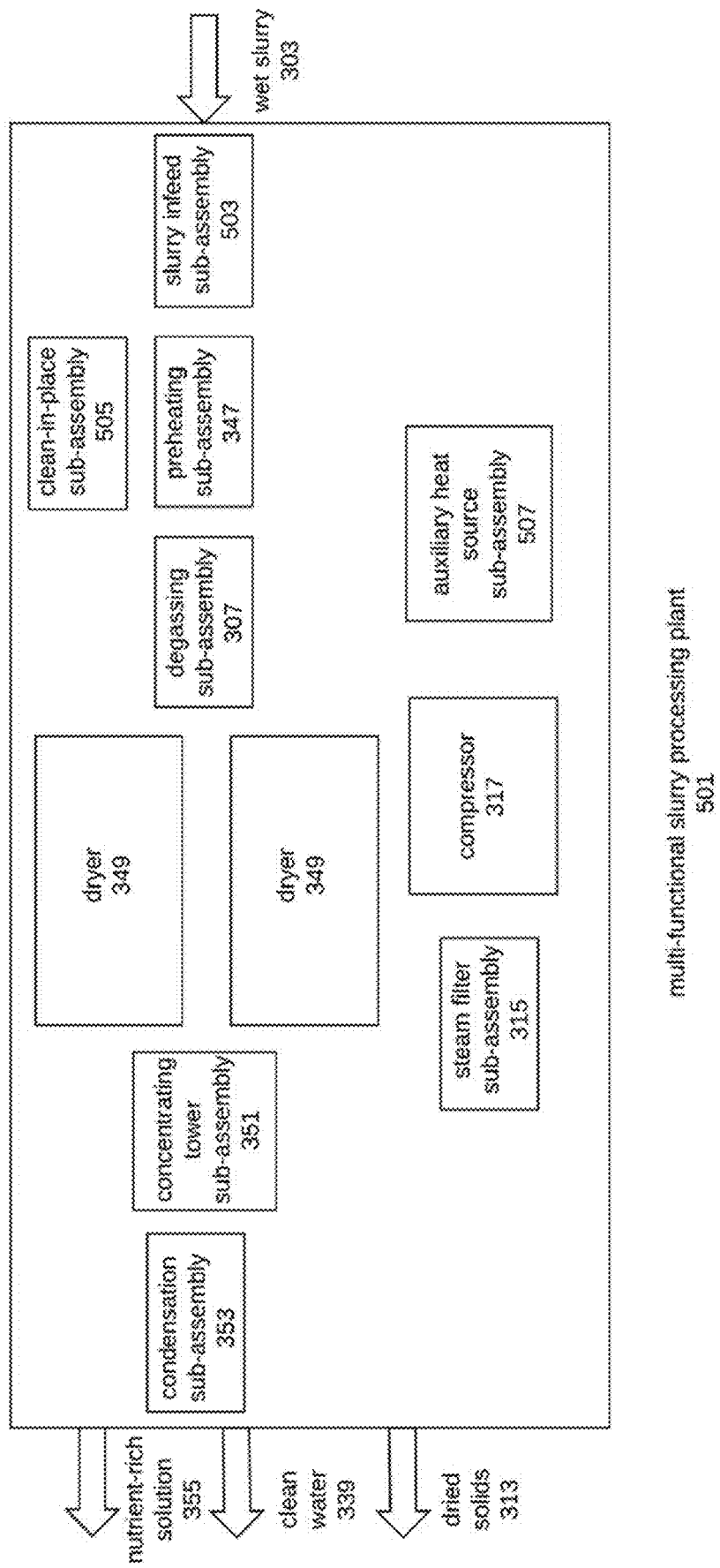
FIG. 5 is an aerial view of a multi-functional slurry processing plant.

FIG. 5 is an aerial view of an exemplary layout of a multi-functional slurry processing plant 501. The exemplary multi-functional slurry processing plant 501 as shown can process approximately 90 gallons per minute of wet slurry 303 or more per day. Those skilled in the art will realize that the system described herein may be scaled appropriately to accommodate differing capacities as required in a given application.

The multi-functional slurry processing plant 501 is able to be a fully contained system that requires substantially no outside water or drainage to process the wet slurry 303 and generate clean water 339 and dried solids 313. The multi-functional slurry processing plant is flexible in operation and in alternative examples may be supplied with outside water if desired. Several conventionally constructed ancillary sub-systems are shown including a slurry infeed sub-assembly 503, a clean-in-place sub-assembly 505, and an auxiliary heat source sub-assembly 507.

The slurry infeed sub-assembly 503 facilitates the entry of wet slurry 303 into the multi-functional slurry processing plant 501. Wet slurry 303 typically includes any mixture of at least 0.05% solids and one or more liquids. Some types of wet slurries include cow manure, septic waste, cheese processing waste, fracking water, or the like. In one example, the system is configured to process wet slurry 303 containing a mixture of water-based liquids and up to approximately 25% total solids that can be separated from the water and dried to provide recovery of the solid material. The system can be configured for use with other ranges of total solids within the wet slurry 303.

The slurry infeed sub-assembly 503 may include a conventionally constructed holding tank (not shown) that receives substantially wet slurry 303. The holding tank can be sized to hold a selected volume of wet slurry for continual operation of the system for several hours before the holding tank needs to be replenished. The holding tank can be configured to accept slurry from many inputs such as a slurry storage lagoon or a slurry delivery vehicle. In this example, the in-feed assembly includes a slurry pump that transports the wet slurry 303 from the holding tank to the inlet of the preheating sub-assembly 347. Other configurations of the in-feed assembly can be used as known to those skilled in the art of slurry conveyance.

The clean-in-place sub-assembly 505 automatically cleans the piping and preheating sub-assembly 347 in the multi-functional slurry processing plant 501. The clean-in-place-sub-assembly 505 consists of chemical feed pumps, chemical holding tanks, and a back-flush system. The clean-in-place sub-assembly 505 pumps cleaning chemical through the pipes and preheater cold side 305. The cleaning chemical can be recycled through the system several times before needing to be replaced. Cleaning chemicals include acidic, alkaline, and detergents. Examples of cleaning chemicals include citric acid and sodium hydroxide solutions. Clean water can also be used in the clean-in-place sub-assembly 505.

The auxiliary heat source sub-assembly 507 provides supplementary heat to the multi-functional slurry processing plant 501 during start up and minimally during normal operation to supplement for heat losses in the system. The auxiliary heat source sub-assembly 507 also helps to maintain pressure in the dryer sub-assembly 349. In addition, the auxiliary heat source sub-assembly 507 provides energy to heat up water for use in the clean-in-place subassembly 505. In this example, an auxiliary steam generator is used, however, alternate heat sources such as hot-water heaters, electric immersion heaters, thermal fluid heaters, or the like could also be used.

Having described the overall function of the multi-functional slurry processing system 301 and its operation in conjunction with various sub-assemblies on a systems level, the internal details of the various sub-assemblies will now be described. Many of these sub-assemblies are of a unique design in their own right and when integrated into the multi-functional slurry processing system 301 allow its advantageous operation.

Concentrating Process

Figure 6:
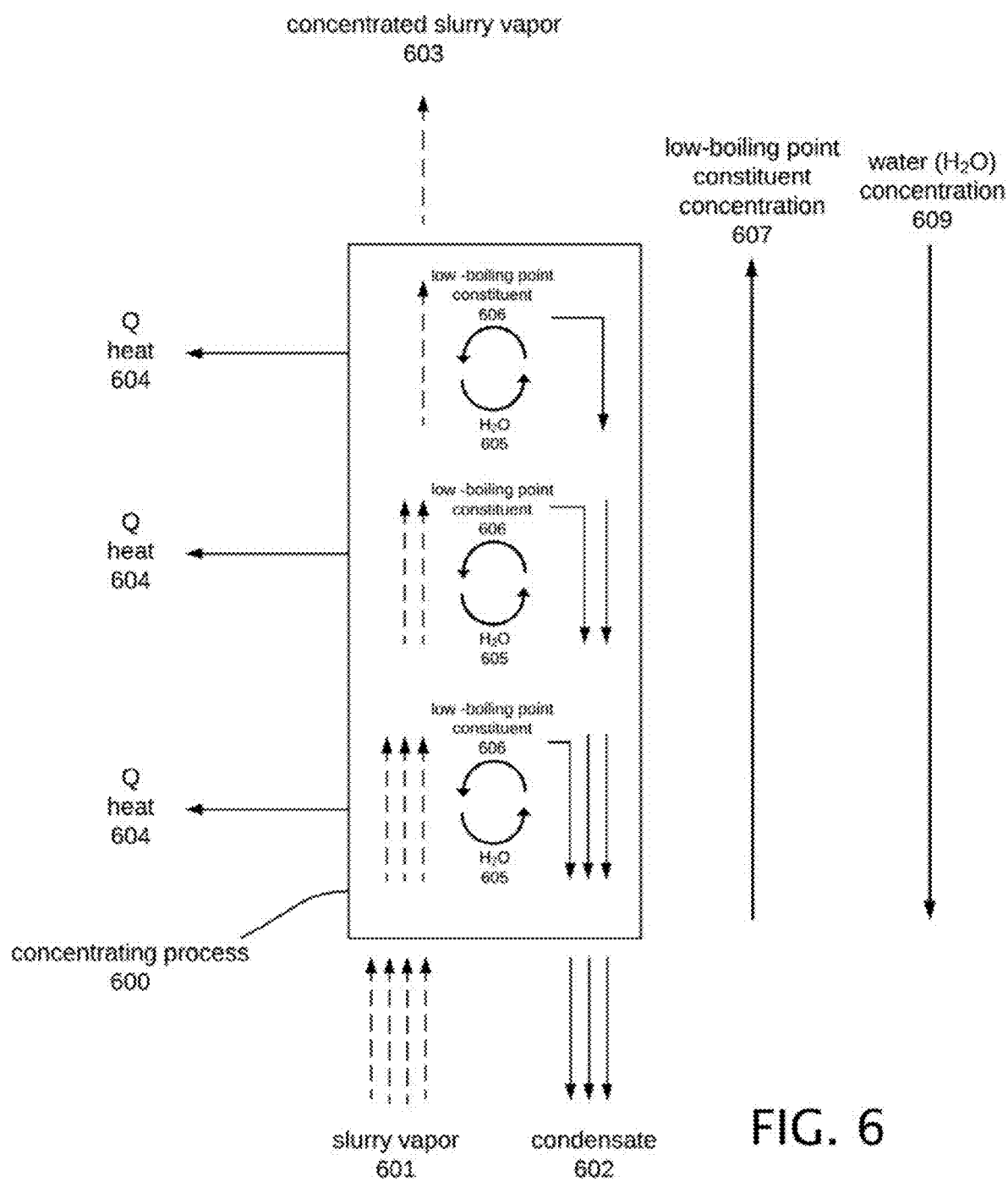
FIG. 6 is a diagram showing the process of concentrating low-boiling point constituents which may be carried out in the dryer sub-assembly and the concentrating tower sub-assembly.

FIG. 6 is a diagram showing the concentrating process 600 of concentrating low-boiling point constituents which may be carried out in the dryer sub-assembly 349 and the concentrating tower sub-assembly 351. Slurry vapor 601 enters the bottom of the tower. Concentrated slurry vapor 603 exits the top of the tower and condensate 602 exits the bottom. As the slurry vapor 601 moves up the tower heat 604 is removed from the tower interior. This results in a portion of the slurry vapor 601 condensing to form condensate 602. The slurry vapor 601 continues to condense as it moves up the tower resulting in a stream with a lower flow rate out the top of the tower. Conversely, the flow rate of condensate 602 increases from the top of the tower to the bottom of the tower. In the shown example, no condensate 602 enters the top of the tower. In some configurations a liquid stream may be introduced at the top of the tower (not shown). Rather the condensate 602 is typically generated in the tower from the removal of heat 604 which causes partial condensation of the slurry vapor 601. Partially condensing the slurry vapor 601 creates a water-rich liquid 602 and a low-boiling point constituent-rich vapor 603 due to the difference in volatility (or boiling point) between the species (distilling process). The slurry vapor 601 and condensate 602 typically flow in a countercurrent direction to each other, but can flow co-currently or tangentially As the falling liquid condensate stream 602 and rising slurry vapor stream 601 pass each other the mass transfer of constituents also occurs. The components with higher volatility (lower boiling point) 606 are stripped from the liquid phase and move to the vapor phase and the components with lower volatility (higher boiling point) 605 remain in the liquid phase. For example, in a solution of water and ammonia, the ammonia will be transferred to the vapor phase and the water will be transferred to the liquid phase. This process continues along the length of the tower. This results in a higher concentration of low-boiling point constituents 607 in the outlet concentrated slurry vapor stream 603 compared to the inlet slurry vapor 601. The concentration of water 609 follows the opposite trend. This results in a higher concentration of water 609 in the condensate 602 exiting the bottom of the tower compared to the condensate forming in the tower. This process can be utilized to concentrate constituents that have a boiling point lower than water such as ammonia, alcohol, light hydrocarbons, and others.

This concentrating process 600 can be achieved in many geometrical configurations. For example, a horizontal or vertical orientation can be utilized. The dryer 349 is an example of the use of a horizontal orientation and the concentrating tower sub-assembly 351 is an example of the use of a vertical orientation. The removal of heat 604 from the system can be achieved in various methods. Examples of these configurations include tube-in-tube, multiple tube arrangements, and others. Packing, trays, baffles, and other internal structures can be incorporated to increase the contact between the liquid and vapor phase as known to those skilled in the art.

The concentrating process 600 described is unique when coupled with mechanical vapor recompression (MVR) because it takes advantage of the pressurized slurry vapor 319 generated in the process. No additional energy must be added to the system to generate the vapor and a reboiler does not need to be used. This concentrating process 600 allows for the recovery of valuable low-boiling point constituents (such as ammonia from cow manure, alcohol recovery from alcohol waste streams, or others) in a highly energy efficient manner.

Preheating Sub-Assembly

Figure 7:
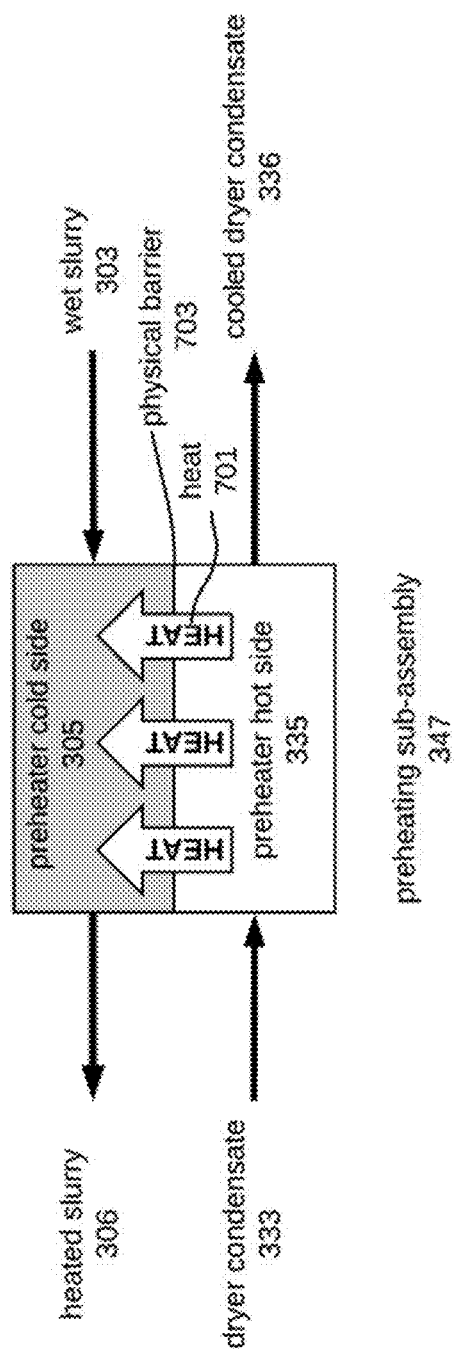
FIG. 7 is a block diagram of the preheating sub-assembly.

FIG. 7 is block diagram of the preheating sub-assembly 347. Wet slurry 303 enters the preheater cold side 305. Heated slurry 306 exits the preheater cold side 305. Dryer condensate 333 from the dryer 349 enters the preheater hot side 335, and cooled dryer condensate 336 is output from the preheater hot side 335.

The preheating sub-assembly 347 typically provides heat 701 exchange from the hot side 335 of the preheater to the cold side 305 of the preheater. The cold side 305 and hot side 335 are typically separated by a physical barrier 703 to prevent materials on the hot side 335 from mixing with those on the cold side 305. The barrier 703 may be constructed to aid in the transfer of heat 701 from the hot side 335 to the cold side 305 by methods known to those skilled in the art.

As known to those skilled in the art alternative examples of the preheating sub-assembly 347 may be constructed. One example is a conventional tube-tube heat exchanger with the pipe diameter sized to increase the velocity through the pipes and prevent scaling. Another alternative example is a spiral heat exchanger.

Wet slurry 303 exits a slurry holding tank (not shown) and is introduced into a slurry feed pump (not shown). The wet slurry 303 received from the slurry feed pump is input to the preheating sub-assembly 347 as cold, pressurized inlet slurry 303. The inlet slurry 303 is pressurized to approximately 350 kPa (3.5 bara), although other pressures can be used in equivalent examples. In the illustrated example, the preheating sub-assembly 347 outputs heated slurry 306 slightly below its saturation point, which is approximately 373 K at 100 kPa.

The preheating sub-assembly 347 advantageously utilizes the transfer of heat 701 produced during slurry processing to preheat the slurry input 303 to the multi-functional slurry processing system 301. The wet slurry input (or equivalently "inlet slurry") 303 passes through the preheating sub-assembly 347 prior to drying to increase the temperature of the wet slurry 303 close to the saturation temperature (near boiling).

The cold side of the preheater 305 is heated by a heat source. In this example, the heat source is hot dryer condensate 333 from the dryer 349. Heat 701 is transferred from the heat source to the cold wet slurry stream 303. Those skilled in the art will realize that there are equivalent alternative devices that may be constructed to achieve preheating of the slurry 303.

Degassing Sub-Assembly

Figure 8:
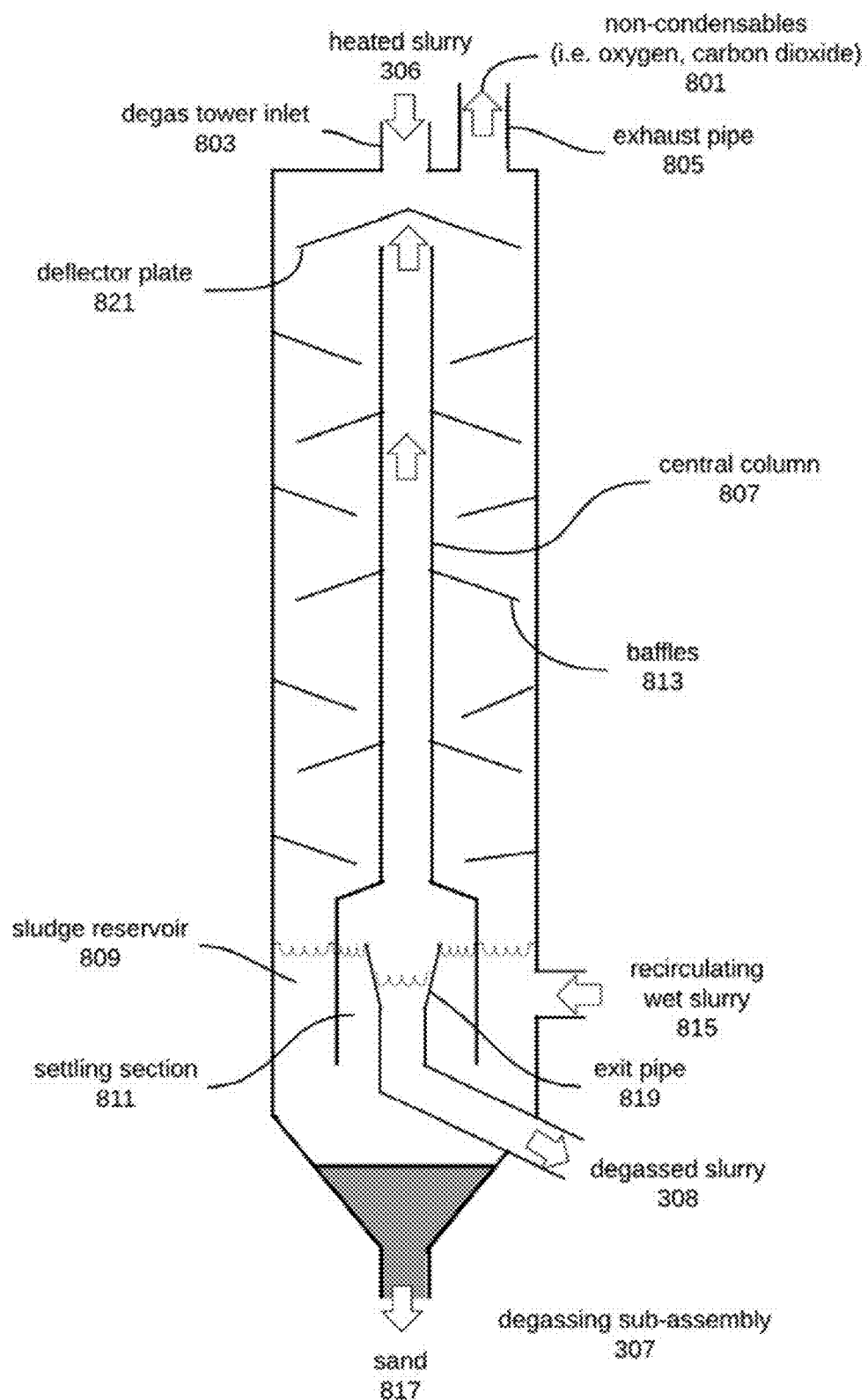
FIG. 8 is a diagram of the degassing sub-assembly.

FIG. 8 is a block diagram of the degassing sub-assembly 307. Heated slurry 306 enters the degassing sub-assembly 307 through the degas tower inlet 803. Non-condensables 801, such as air and carbon dioxide, exit the top of the degassing sub-assembly 307 through the exhaust pipe 805. Degassed slurry 308 exits the bottom of the degassing sub-assembly 307 through the exit pipe 819.

The degassing sub-assembly 307 typically allows for the escape of non-condensables 801 from the system prior to entering the dryer cold side 309. Physical separation of the non-condensables 801 from the heated slurry 306 can be achieved in several ways by methods known to those skilled in the art.

In this example, heated slurry 306 enters through the degas tower inlet 803 and flows over a deflector plate 821. The deflector plate 821 slows the momentum of the heated slurry 306 and distributes the liquid evenly over the surface. The outer edge of the deflector plate 821 contains several raised angular ventilation channels (not shown) that allow non-condensables 801 to flow upward without contacting the heated slurry 306 flowing down it. The heated slurry 306 flows down a series of baffles 813 throughout the tower. Non-condensable gasses 801 such as air, carbon dioxide, and others are released from the heated slurry 306 and flow up the central column 807 and out the exhaust pipe 805. The central column 807 can contain a number of openings (not shown) to allow the non-condensables 801 to enter the central column 807 as they are released. Another example is a configuration where heated slurry 306 enters tangentially into a central column 807 in a spiral flow pattern causing separation of the heated slurry 306 (liquid) and non-condensables 801 (gasses) while mechanically breaking down foam. In this configuration, non-condensables 801 exit through the center of the column 807 and degassed slurry 308 exits the bottom.

The removal of non-condensable gasses 801 during this stage prevents the build-up of non-condensable gasses 801 in downstream units such as the dryer 349 and concentrating tower sub-assembly 351 which could severely decrease the heat transfer coefficient in these units. The degassing sub-assembly 307 functions well because the slurry introduced 306 is heated to nearly boiling which promotes the escape of non-condensable gasses 801. Additionally, the degassing tower sub-assembly 307 mechanically collapses any foam generated during heating. Foaming materials are notoriously difficult to apply to disc dryers. The inclusion of the degassing tower sub-assembly 307 allows for the processing of foaming wet slurries.

After the heated slurry 306 flows down the baffles 813 it enters a large sludge reservoir 809. The sludge reservoir 809 may be sized that it is large enough to hold the volume of the dryer 349 to allow ease of maintenance on the dryer 349. The sludge reservoir may 809 also receive recirculating wet slurry 815 from the wet sand removal system (not shown). The degassed slurry 308 must pass through the settling section 811 to exit the degassing sub-assembly 307. The settling section 811 has a large enough surface area to significantly slow down the velocity of degassed slurry 308 moving through this section. This allows sand (or other large particles i.e. clay, silt, large biomass pieces, gravel, etc.) 817 to settle out and exit the bottom of the degassing sub-assembly 307 once it accumulates. The top of the exit pipe 819 is cone-shaped to slow down the velocity of degassed slurry 308 and to prevent the entrainment of gas bubbles in the liquid as it flows from the settling section 811 to the exit pipe 819. Other geometries may be used for the exit pipe 819 to slow down the velocity of the degassed slurry 308.

Disc Dryer Sub-Assembly

Figure 9:
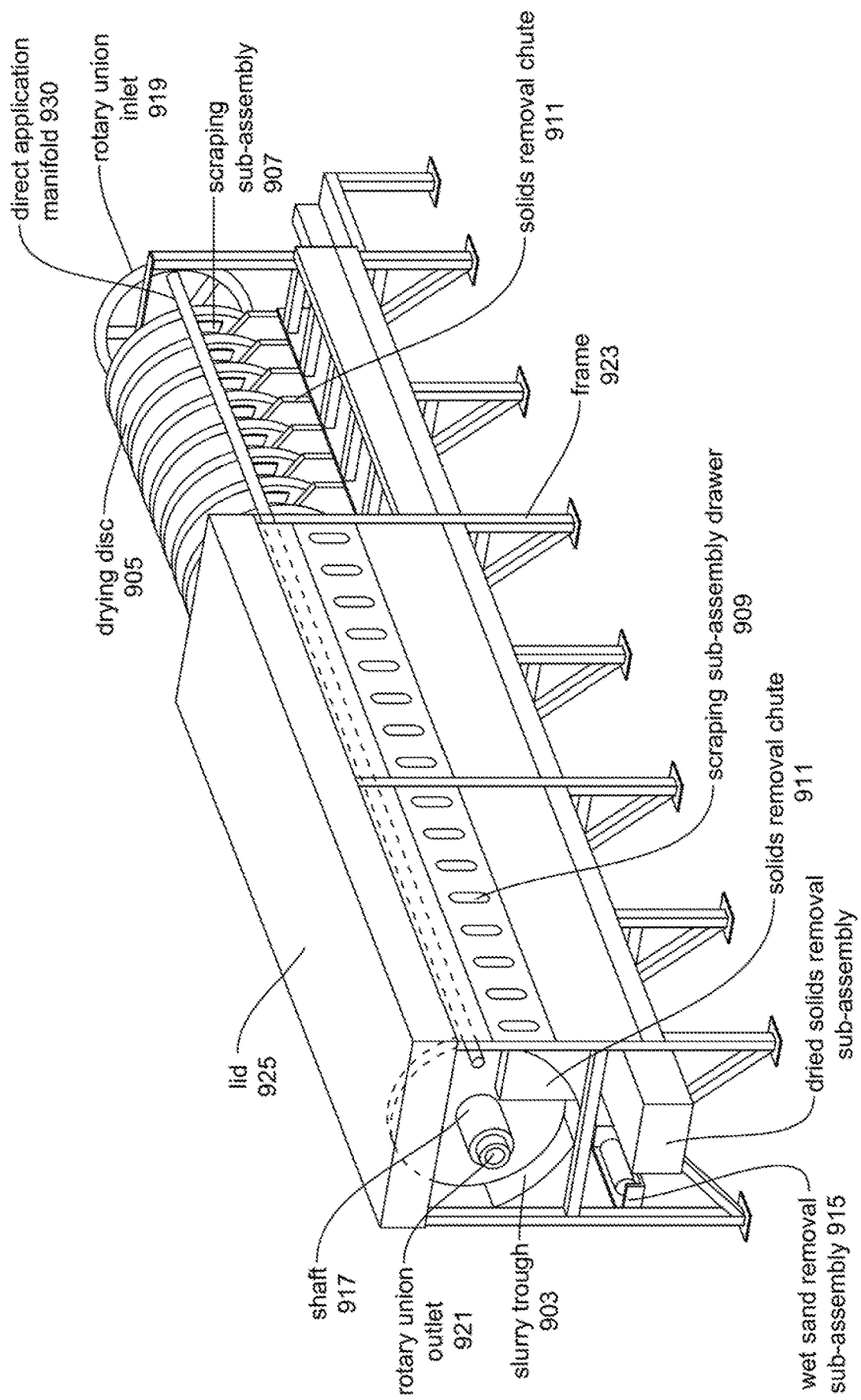
FIG. 9 is a partial isometric view of a disc dryer sub-assembly showing its major components.

FIG. 9 is a partial isometric view of a disc dryer sub-assembly 349 showing its major components. The dryer sub-assembly 349 contains many unique components that will be described following the general descriptions of the various sub-assemblies. Degassed slurry 308 enters the disc dryer 349 into the slurry trough 903. Rotating drying discs 905 pass through the slurry trough 903.

Once in the slurry trough 903 various application devices and methods may be implemented to achieve application of the wet slurry 308 to the disc 905 for drying. One possible application option is directly applying the wet slurry 308 to the disc 905 for drying via the slurry trough 903. An alternative application device and method includes pulling the wet slurry 308 from the slurry trough 903 to the direct application sub-assembly (360 of FIG. 3). A pump (not shown) or comparable piece of equipment within the direct application sub-assembly 360 transports the wet slurry 308 from the dryer trough 903 to the application wipers (not shown). These application wipers force the slurry into contact with the disc 905 for uniform coating. Other application methods may be used within the disc dryer sub-assembly for the application of the wet slurry 308 to the drying disc 905, as will be appreciated by those skilled in the art. The dryer sub-assembly 349 shown includes an exemplary drying discs 905 that are coupled to, and rotate on a, central shaft 917. Other numbers of drying discs 905 can be used as needed. The flow of degassed slurry 308 into the slurry trough 903 is substantially continuous. A scraper sub-assembly 907 removes the dried solids 313 from the surface of the discs 905. The dried solids 313 fall through a solids removal chute 911 which penetrates the wet slurry trough 903 and are removed from the dryer 349 via a dried solids removal sub-assembly 913.

The dyer 349 receives pressurized slurry vapor 319 through the rotary union inlet 919. The pressurized slurry vapor 319 passes through the interior of the central shaft 917 and through the interior of the drying discs 905. As heat from the pressurized slurry vapor 319 is transferred to the degassed slurry 308, a portion of the pressurized slurry vapor 319 condenses in the drying discs 905 to form dryer condensate 333. The pressurized slurry vapor 319 is physically isolated from the degassed slurry 308 while still being able to transfer heat to the degassed slurry 308. The uncondensed portion of the pressurized slurry vapor 319 exits the rotary union outlet 921 as concentrated slurry vapor I 323.

The rotary union outlet 921 receives concentrating tower condensate 331. The concentrating tower condensate 331 combines with dryer condensate 333 in the central shaft 917 and exits through the rotary union inlet 919. The flow of pressurized slurry vapor 319 and dryer condensate 333 are typically in counter current flow.

The disc dryer sub-assembly 349 features removable scraper sub-assembly drawers 909 for ease of maintenance and assembly. A wet sand removal sub-assembly 915 facilitates the removal of settling sand 817 (or other large particles i.e. clay, silt, large biomass pieces, gravel, etc.) from the slurry trough 903 to prevent sand and other larger settling particles from building up in the dryer 349 over time. This sub-assembly could include an auger, a hydraulic movement system, a drag chain, or other equivalent mechanisms known to those skilled of the art. The dryer 349 is housed in a frame 923 that contains a removable lid 925.

Figure 10:
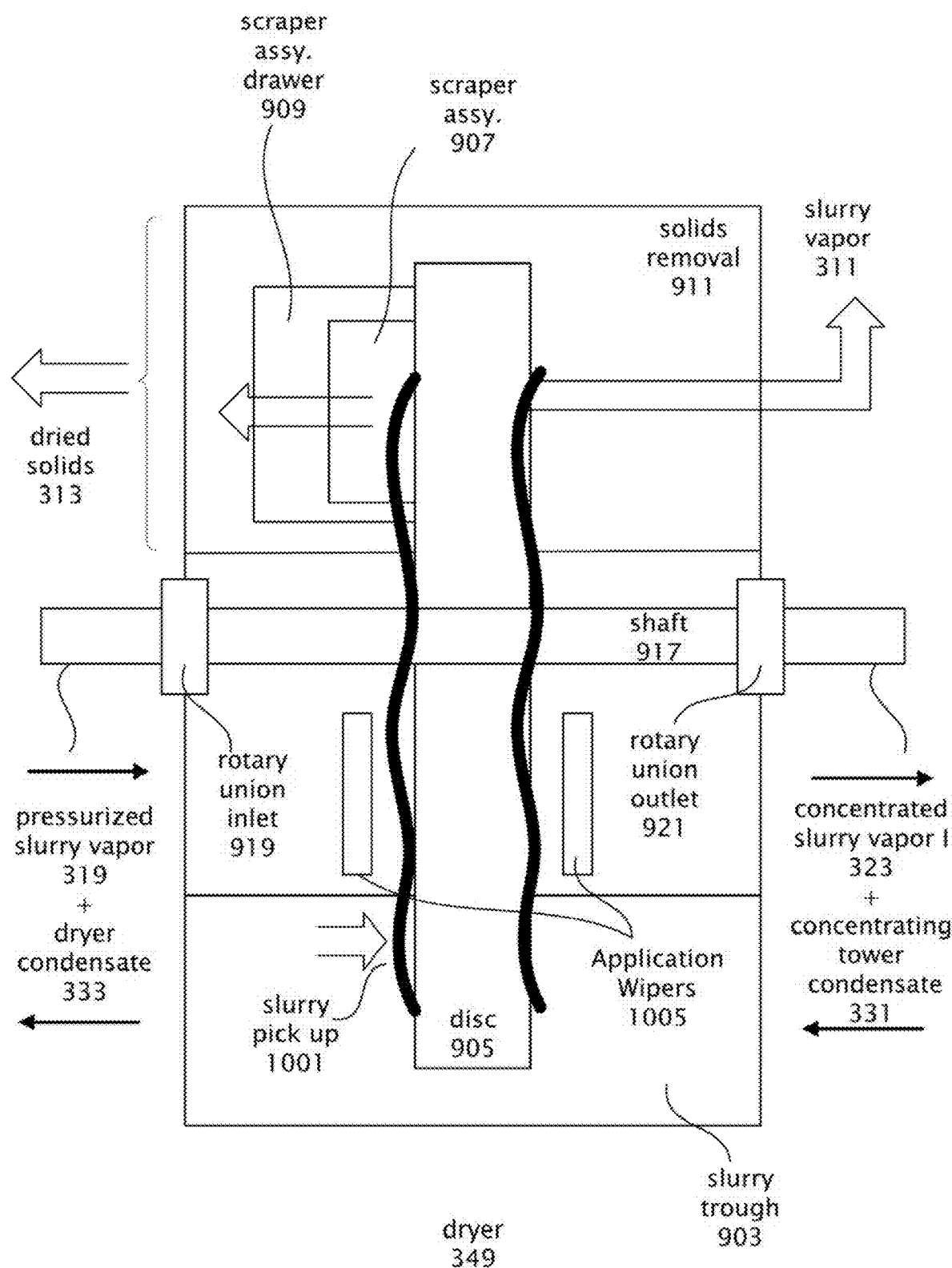
FIG. 10 is a diagram showing the drying process.

FIG. 10 is a diagram showing the drying process occurring in the dryer 349. A heated surface is utilized to provide sufficient heat for separation of liquid and solid fractions. Here the heated surface is a rotating disc. However, in alternative examples the heated surface may have equivalent geometries or need not be moving, as will be realized by those skilled in the art. In the example shown, a heated disc 905 is utilized as the heated surface. Other configurations could utilize alternate geometries (such as a drum, or the like). A shaft 917 is supported by a rotary union inlet 919, and a rotary union outlet 921 in the dryer frame (not shown). A rotating disc 905 of a plurality of discs (one disc is shown for simplicity) is mounted on the shaft 917. The shaft 917 is caused to rotate by the conventional application of a mechanical rotating force. The rotary unions 919, 921 prevent the rotational force from being transferred to plumbing that may be coupled to the rotary unions. The shaft 917 aside from providing support for and causing rotation of the disc 905 also provides a pathway for pressurized slurry vapor 319, and dryer condensate 333 present at the rotary union inlet 919, and the concentrated slurry vapor I 323, and concentrating tower condensate 331 present at the rotary union outlet 921. The shaft 917 and drying discs 905 allow for the concentration of pressurized slurry vapor 319 to concentrated slurry vapor I 323. The concentrated slurry vapor I 323 typically contains a higher concentration of low-boiling point constituents (such as ammonia) than the pressurized slurry vapor 319.

Also included in the dryer 349 is the option of the slurry trough 903 for holding slurry 308 such that the disc 905 is partially immersed in the slurry 308, to a sufficient depth to coat a desired portion of the disc 905 as it rotates through the slurry trough 908.

Alternatively, another option within the dryer 349 is to have the slurry trough 903 provide a flow of wet slurry 308 to the direct application sub-assembly (360 of FIG. 3), with the application wipers 1005 of this assembly being shown. Within the direct application sub-assembly is a pump or equivalently constructed equipment that moves the wet slurry 308 from the slurry trough 903 to the application wipers 1005, which evenly apply the degassed slurry 308 to the disc 905.

Degassed slurry 308 is input from an external source. Slurry level in the slurry trough 903 is maintained by conventional methods known to those skilled in the art.

The disc 905 is heated. Heating is typically achieved by heat transfer from the pressurized slurry vapor 319.

The disc 905 rotates at a rotational speed sufficient to allow the slurry picked up 1001 to be applied to the disc 905 to evenly coat the disc face 950. This speed is also set to dry the slurry picked up 1001 to a predetermined degree by the time a scraper (not shown) in the scraper sub-assembly 907 is encountered. In other configurations, the slurry 308 can be applied to the heated surface utilizing other methods known to those skilled in the art. This includes, but is not limited to spraying the slurry on using an application wiper 1005, using an auger to apply the slurry, using a slurry trough 903, and the like. The scraper sub-assembly 907 may be disposed in a drawer 909 provided for ease of access to the scraper. Dried solids 313 are scraped from the disc 905 by the scraper sub-assembly 907 and deposited into the solids removal chute 911, where they are transferred to the dried solids removal sub-assembly 913 (not shown) and removed from the dryer 349. Liquid evaporating from the slurry 308 picked up on the heated disc 905 is removed from the dryer 349 as slurry vapor 311.

Disc Dryer Sub-Assembly—Dryer Frame—Component Description

Figure 11:
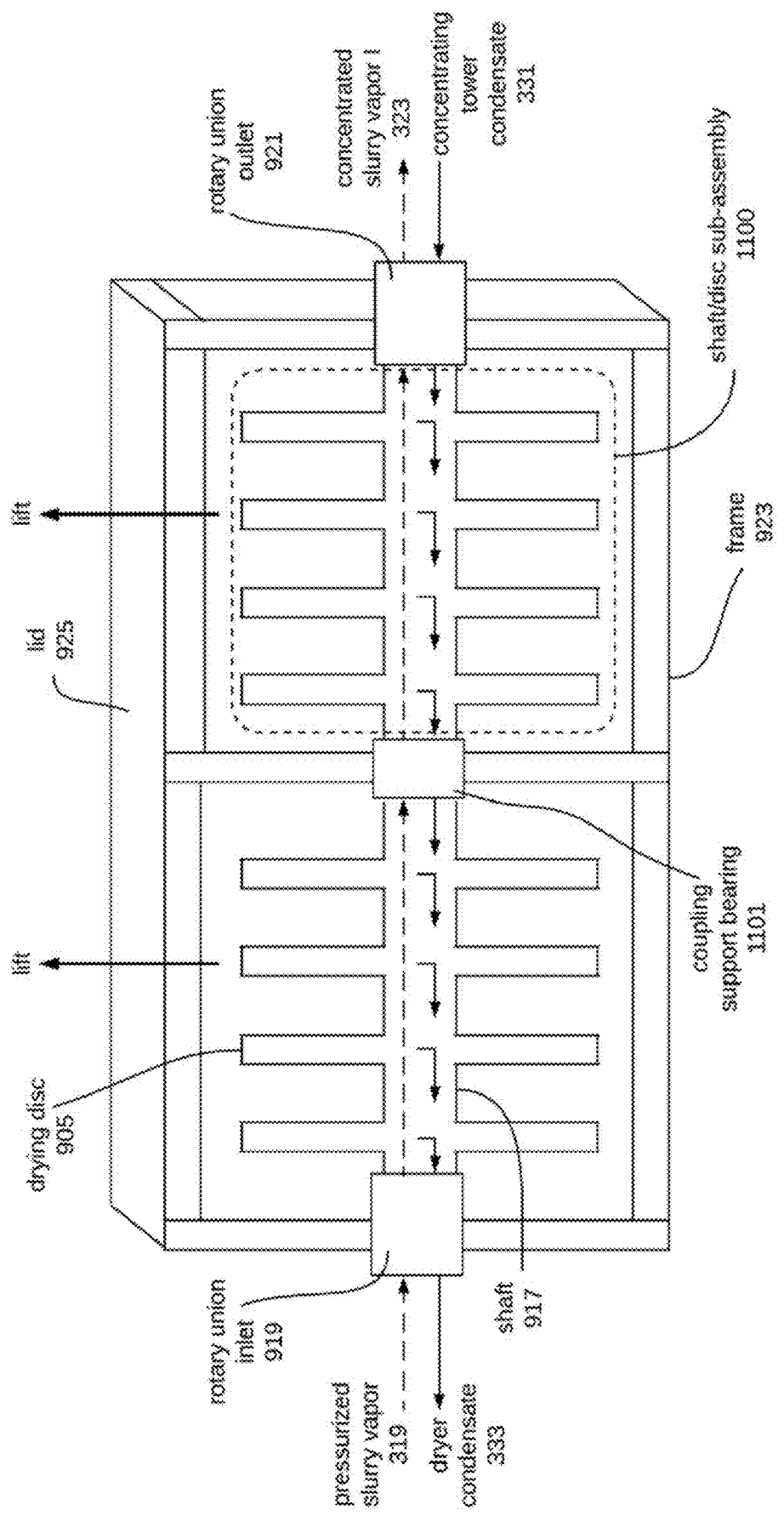
FIG. 11 is a diagram of the frame sub-assembly for the dryer.

FIG. 11 is a diagram of the frame sub-assembly 923 for the dryer 349. The dryer frame 923 is constructed of subsections each supporting a shaft/drying disc sub-assembly 1100. In this example, two subsections are shown, however other numbers of subsections can be constructed. The frame 923 has a lid 925 that can be removed to allow insertion of the shaft/drying disc sub-assembly 1100 into the frame 923 from above. Shaft/drying disc sub-assemblies 1100 are connected between subsections of the dryer 349 utilizing coupling support bearings 1101.

A rotary union inlet 919 allows entry of pressurized slurry vapor 319 into the dryer 349 and allows dryer condensate 333 to exit. The rotary union inlet 919 functions as a drive bearing for the dryer 349 and allows the shaft 917 to rotate. A rotary union outlet 921 allows the exit of concentrated slurry vapor I 323 and the entry of concentrating tower condensate 331.

As pressurized slurry vapor 319 passes through the shaft 917 and drying discs 905 it transfers heat to the wet degassed slurry 308 on the outside of the drying discs 905 and forms dryer condensate 333. The rotary union inlet 919 is typically sized larger than the rotary union outlet 921.

The liquid level of dryer condensate 333 in the shaft 917 during normal operation is high enough that it flows over the flanges of the coupling support bearing 1101 and the rotary union inlet 919. The coupling support bearing 1101 and rotary union inlet 919 are equipped with condensate lifters (not shown) to facilitate emptying of dryer condensate 333 from the dryer 349 during shut down.

Figure 42:
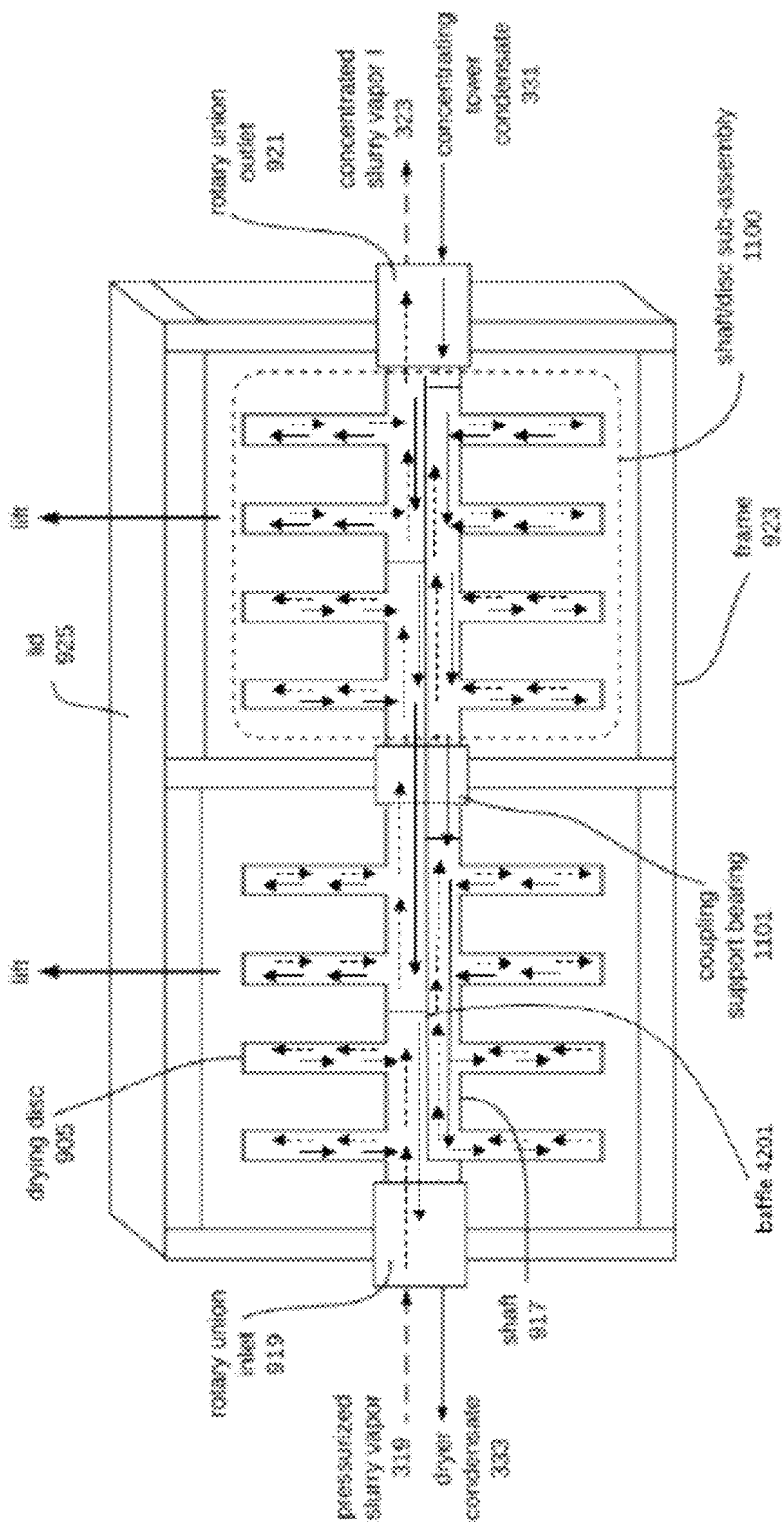
FIG. 42 is diagram of an alternative flow path for steam and condensate to that previously shown in FIG. 11.

There are multiple examples contemplated for having the pressurized slurry vapor 319, concentrated slurry vapor I 323, concentrating tower condensate 331, and dryer condensate 333 flow through the shaft 917 and drying discs 905. FIG. 11 illustrates one example to achieve this while FIG. 42 shows another example. Those skilled in the art will appreciate that there are other alternative structures and methods for achieving a desired shaft flow.

Disc Dryer Sub-Assembly—Drying Disc Component Description

Figure 12:
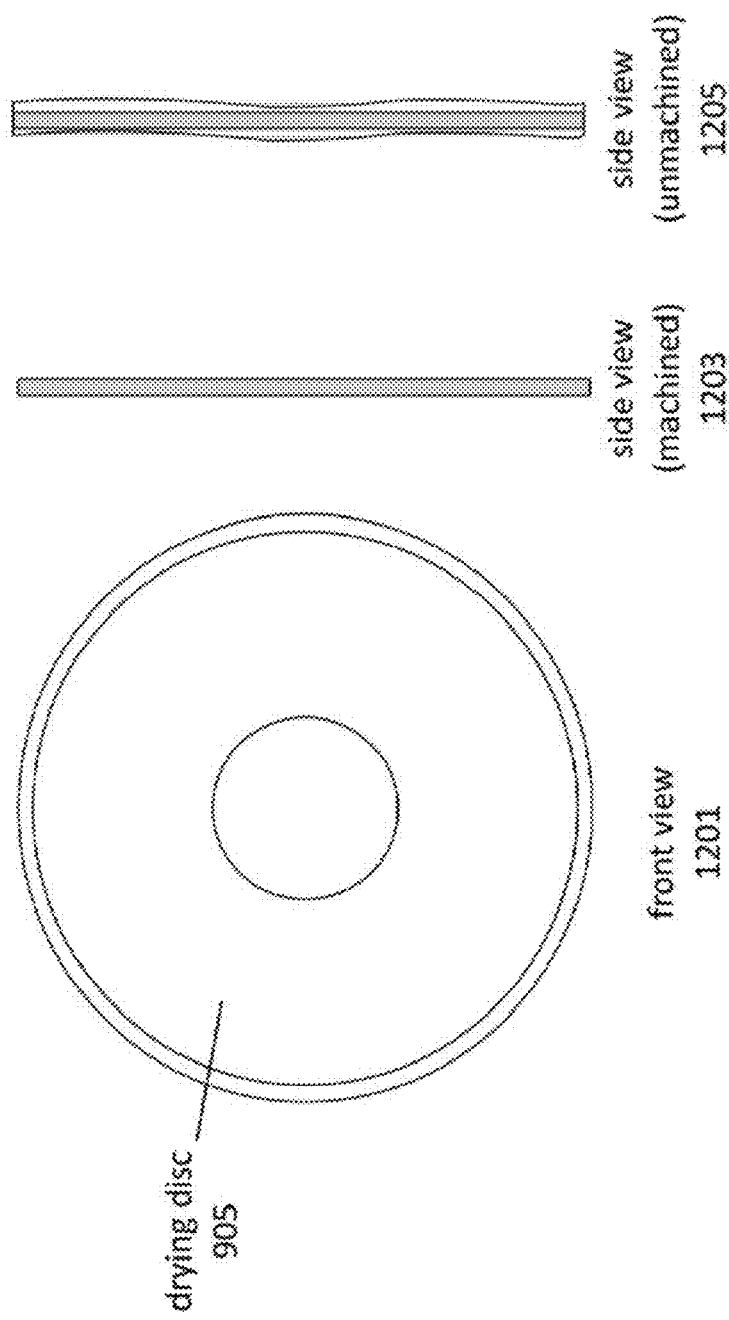
FIG. 12 is a front view, side view (machined) and side view (un-machined) of a drying disc.

FIG. 12 is a front view 1201, side view (machined) 1203 and side view (un-machined) 1205 of a drying disc 905. In this example, drying discs 905 are cylindrical in shape with a hole through the center for the shaft 917 to pass through. Other geometries could be used in other arrangements. The drying discs 905 provide a large surface area of contact between the wet degassed slurry 308 on the outside surface of the drying disc 905 and the pressurized slurry vapor 319 on the inside of the drying disc 905. A larger surface area of contact allows the multi-functional slurry processing system 301 to process larger flow rates of incoming wet slurry 303.

Conventional scraping systems often use a fixed scraper blade to remove dried solids from a surface. When a fixed scraper blade is used the scraping surface needs to be flat to effectively remove material from the surface. A flat surface is most commonly achieved through machining a plate to achieve a specified tolerance level of flatness 1203. As the scraping surface area increases larger plates are required for assembly. The larger plates have a higher variation in surface flatness throughout the plate 1205 and require the removal of much more material to achieve a machined flat surface 1203. This leads to the use of much thicker plate to start with and increases material cost and production cost. The multi-functional slurry processing system 301 contains moving scraper blades that can track to the surface of the drying disc 905. This allows for the use of un-machined drying disc surfaces 1205 and greatly reduces the cost for building large capacity systems.

The ideal material of construction for a drying disc possesses a high heat transfer rate, has sufficient corrosion resistance, and has a high hardness factor. A high hardness factor extends the longevity of the drying disc since the scraper blade will wear out prior to the disc surface. In this example, hardened steel is used.

Drying discs 905 can be assembled in a number of ways as known to those skilled in the art. This includes, but is not limited to, welding, bolting, riveting, and the use of adhesives.

Figure 13:
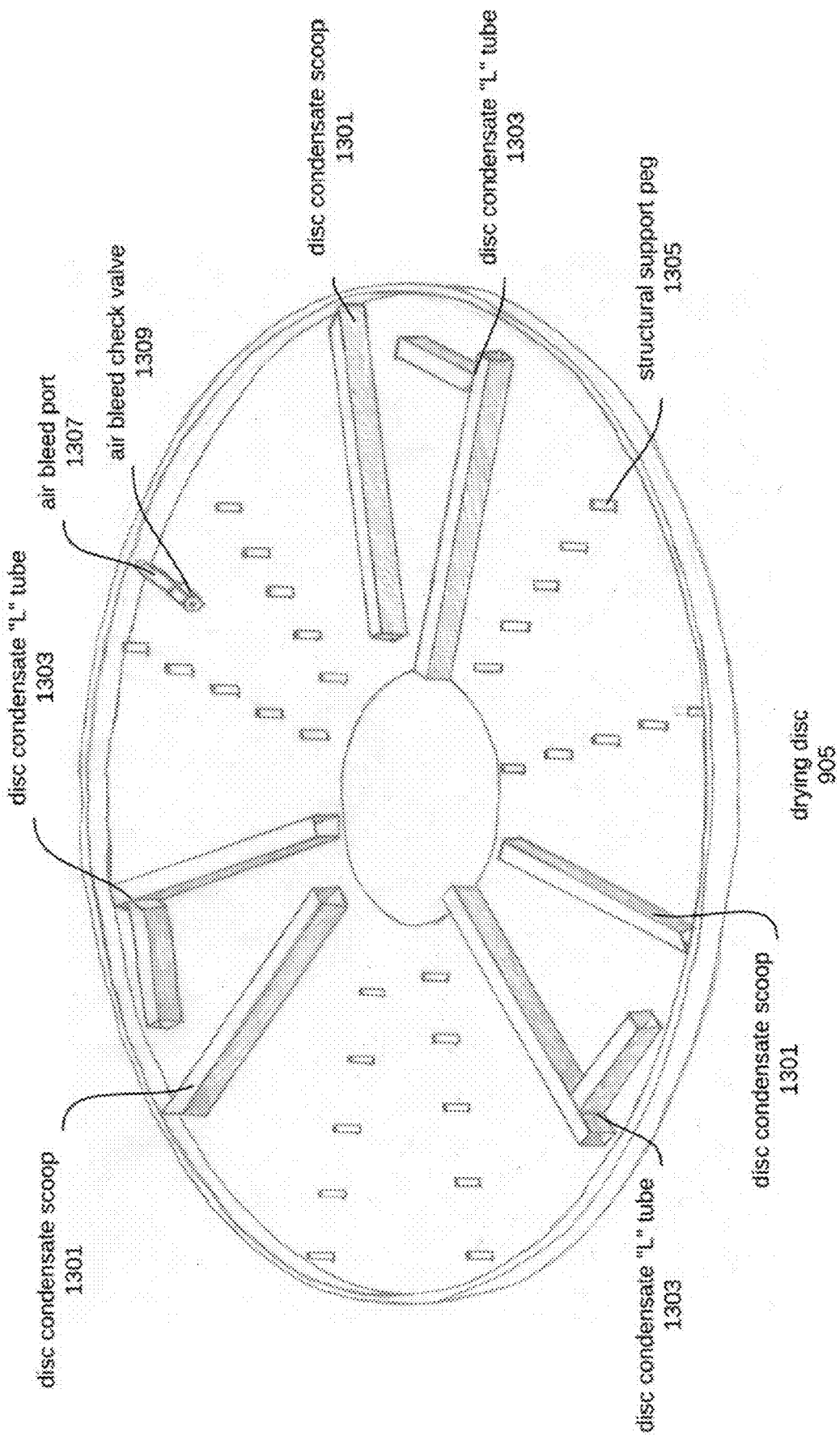
FIG. 13 is a partial isometric view of a drying disc.

FIG. 13 is a partial isometric view of a drying disc 905. The drying disc 905 internals consist of a combination of disc condensate scoops 1301, disc condensate "L" tubes 1303, and structural support pegs 1305. Internal components (1301, 1303, 1305) are included to provide mechanical bracing and rigidity to the drying discs 905, as well as to limit deflection under pressure. Support structures (1301, 1303, 1305) are designed to minimize the occupied area on the disc surface 905. Space that is taken up by support structures is not available for heat transfer and artificially lowers the surface area available for drying. Support structures can have other configurations and can be constructed as known to those skilled in the art.

Disc condensate scoops 1301 and disc condensate "L" tubes 1303 allow for dryer condensate 333 formed inside the drying discs 905 to be removed back into the shaft 917. As the pressurized slurry vapor 319 transfers heat to the degassed slurry 308 it condenses to form dryer condensate 333. If the dryer condensate 333 is not removed from the inside of the drying disc 905 then the disc 905 will eventually fill with dryer condensate 333 and no space will remain for additional condensation to occur. In this example, three sets of disc condensate scoops 1301 and disc condensate "L" tubes 1303 are shown constructed with a hollow interior and arranged in a circular pattern around the disc 905. The disc condensate scoops 1301 have a beveled edge and are flush with the disc exterior edge to allow them to effectively pick up dryer condensate 333 as the disc rotates 905. As the disc 905 rotates upward dryer condensate 333 will fall from the disc condensate scoop 1301 onto the disc condensate "L" tube 1303 which then directs the flow of dryer condensate 333 back towards the shaft 917. The edge of the disc condensate "L" tube close to the shaft 917 can have several configurations such as beveled or flat, among others. In the current example, the edge of the disc condensate "L" tube is flat. Other numbers and arrangements of disc condensate scoops 1301 and disc condensate "L" tubes 1303 can be used. In addition, other configurations can also be constructed to remove dryer condensate 333 from the interior of the drying discs 905. For example, a spiral pattern could be utilized to move condensate 333 from the outer edge of the disc 905 to the interior and then out into the shaft 917.

An optional air bleed port 1307 can also be incorporated into the drying disc 905 to allow any non-condensable gasses 801 to escape from the disc interior 905. In the current example, the air bleed port 1307 is shown as a hollow tube that extends to a sufficient height on the disc interior 905 so dryer condensate 333 cannot enter it, but non-condensable gasses 801 can escape. An air bleed check valve 1309 can be included to prevent degassed slurry 308 from the slurry trough 903 to flow into the disc interior 905 when there is no pressure differential between the interior and exterior of the disc 905. Support structures (1301, 1303, 1305) are constructed in such a way so that flow of non-condensable gasses 801 is not impeded to the air bleed port 1307. Alternate configurations exist for the air bleed port such as internal plumbing to remove non-condensable gasses 801 from the drying disc interior 905.

Disc Dryer Sub-assembly—Shaft Component Description

Figure 14:
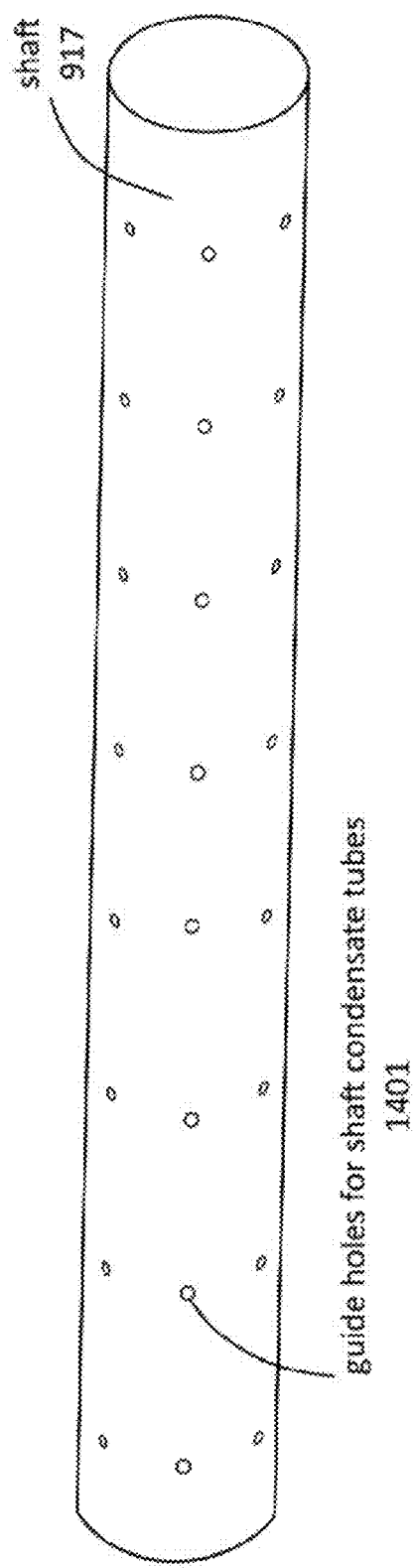
FIG. 14 is an isometric view of the shaft.

FIG. 14 is an isometric view of the shaft 917. The shaft 917 is the support structure on which the drying discs 905 are assembled onto. The shaft 917 structure is typically machined to allow for ease of disc 905 placement onto the shaft 917. Guide holes for optional shaft condensate tubes 1401 are placed in the shaft 917 structure to allow for pressurized slurry vapor 319 to enter the drying discs 905 and for dryer condensate 333 to exit the drying discs 905. The spacing and number of holes 1401 can vary. As those skilled in the art may appreciate the shaft 917 may be a unitary part, or alternatively may be an assembly made up of multiple pieces, as desired.

Disc Dryer Sub-Assembly—Shaft/Drying Disc Component Description

Figure 15:
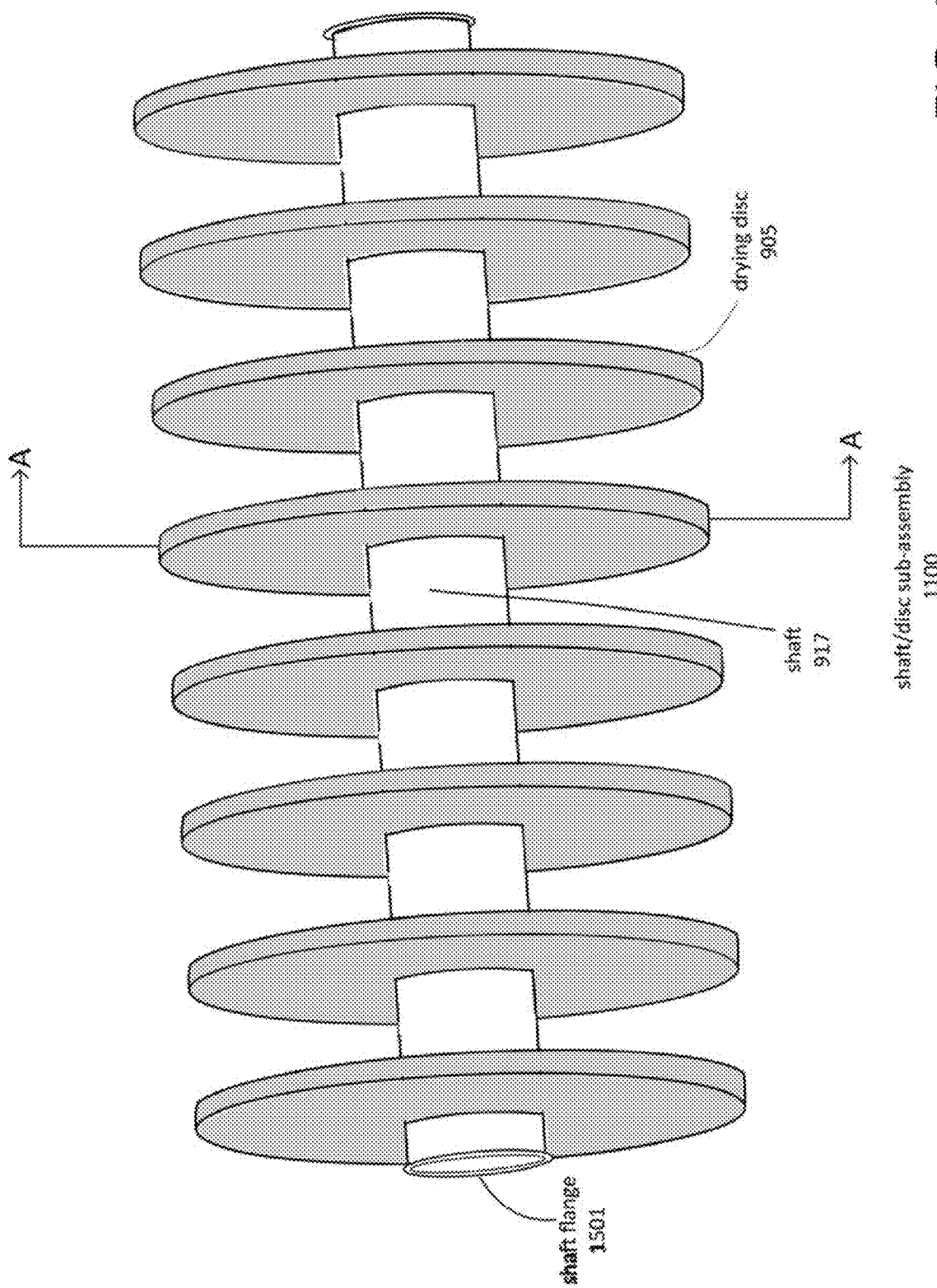
FIG. 15 is an isometric view of the shaft with drying discs.

FIG. 15 is an isometric view of the shaft 917 with drying discs 905. The entire shaft/drying disc sub-assembly 1100 rotates in the dryer 349. As the shaft 917 rotates the drying discs 905 As the shaft 917 continues to rotate the wet degassed slurry 308 is heated and dries until it is finally scraped off as a dried solid product 313.

In this example, eight drying discs 905 are slid onto a unitary spindle shaft 917. Depending on the surface area required for drying, the number of discs 905 used can be greater or smaller. The individual drying discs 905 can be held in place through welding, through a collar to provide spacing, or other methods known to those skilled in the art. The advantage to using a unitary shaft 917 includes less machining of the individual drying discs 905 and improved sealing of the system in one shaft 917. Shaft flanges 1501 are placed at the end of the shaft 917 after disc 905 placement to allow the joining of several subsections together.

An alternate assembly method for the shaft 917 and drying discs 905 is to have a composite spindle or shaft assembled from multiple pieces. In this assembly method, each drying disc 905 contains a flanged hub that allows for the individual joining of drying discs 905 to form the shaft/drying disc sub-assembly 1100. The advantage to using a composite shaft is that individual drying discs 905 can be removed for maintenance. However, the amount of machining and sealing required is greater than when using a unitary shaft 917. In a composite shaft 917, each hub must be machined individually, and a seal must be placed between every disc 905. Alternate methods known to those skilled in the art can be utilized to construct and assemble the shaft/disc sub-assembly 1100.

Figure 16:
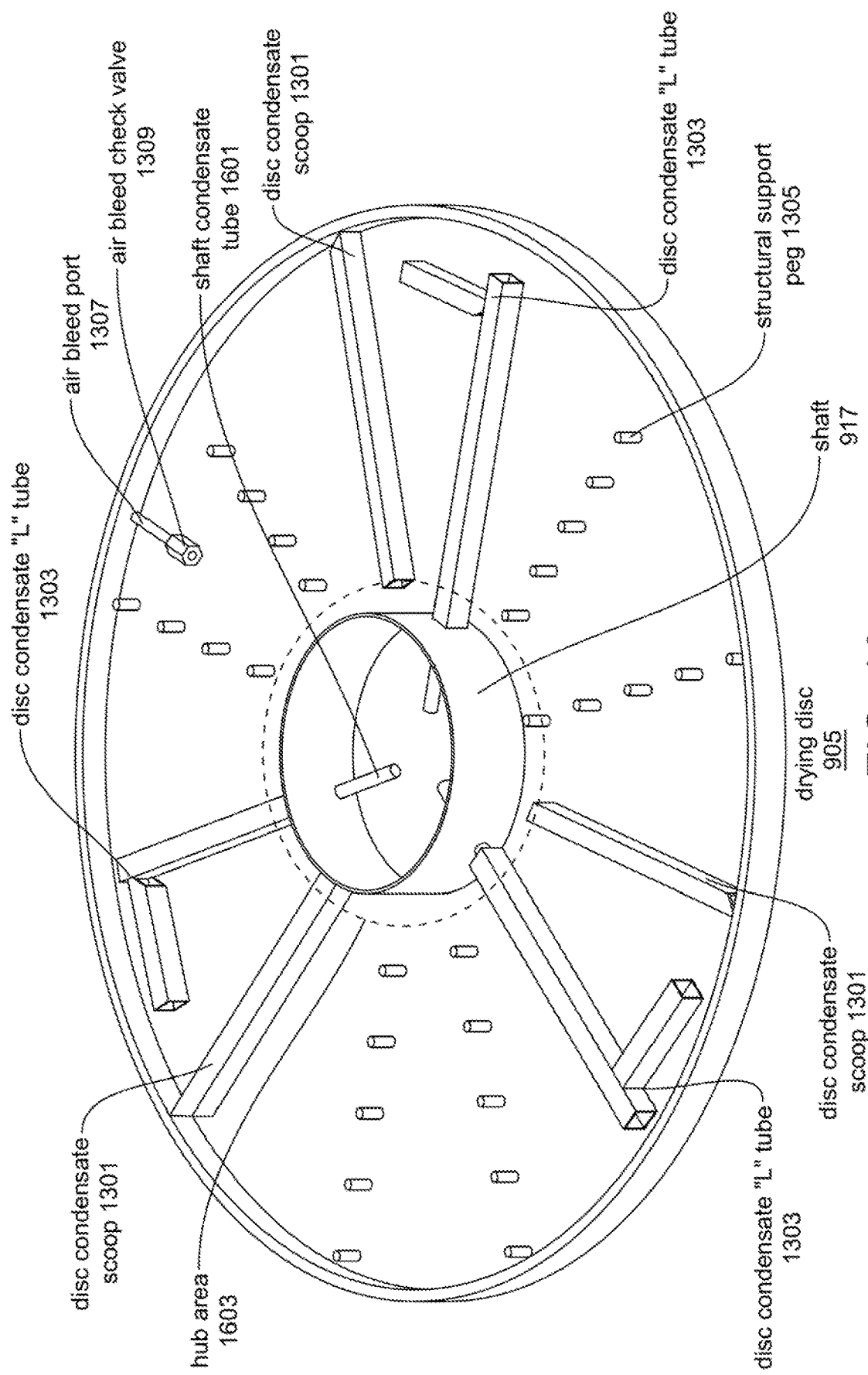
FIG. 16 is a cut-away view of section A-A of FIG. 15.

FIG. 16 is a cut-away view of section A-A of FIG. 15. The optional shaft condensate tubes 1601 align with the disc condensate "L" tubes 1303 to facilitate removal of dryer condensate 333 from the interior of the drying disc 905. The height of the shaft condensate tube 1601 is selected to be of a sufficient height so that dryer condensate 333 moving through the shaft 917 does not flow back into the drying disc interior 905. The hub area 1603 in FIG. 16 is an example of a unitary continuous shaft 917.

Figure 17:
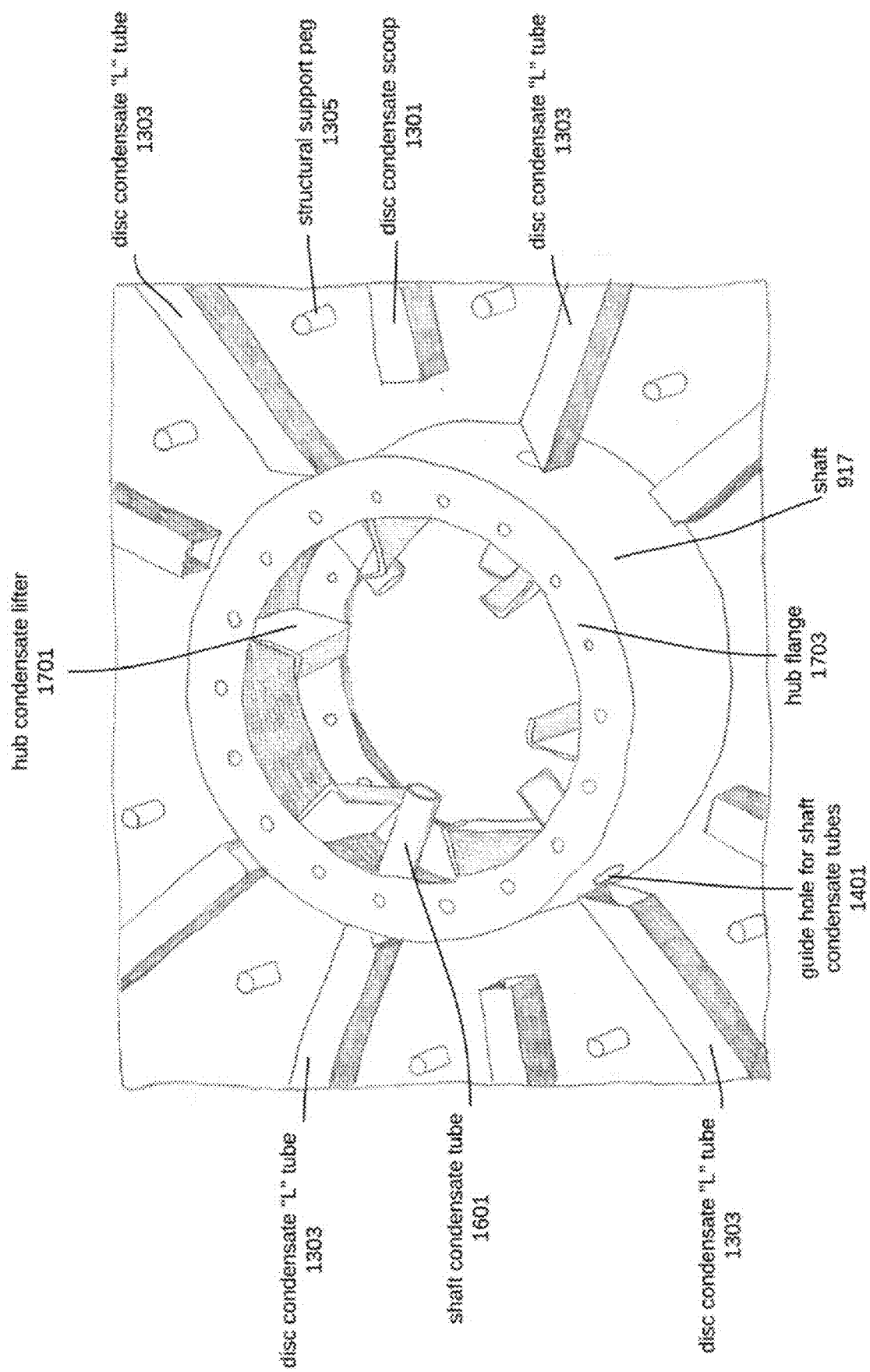
FIG. 17 is an alternate assembly of the shaft section of FIG. 16.

FIG. 17 is an alternate assembly of the hub area 1603 of FIG. 16. In this configuration, each drying disc 905 has a separate flanged hub 1703. The drying discs 905 are brought together to form a discrete spindle shaft 917. The alignment of the shaft condensate tubes 1601 and disc condensate "L" tubes 1303 is the same as in FIG. 16. Hub condensate lifters 1701 are included in each flanged hub assembly to allow for dryer condensate 333 to be pumped out of the system during shut down. During normal operation, the level of dryer condensate 333 in the shaft 917 should be high enough to transfer continuously between flanged hubs 1703.

Disc Dryer Sub-Assembly—Rotary Union Component Description

Figure 18:
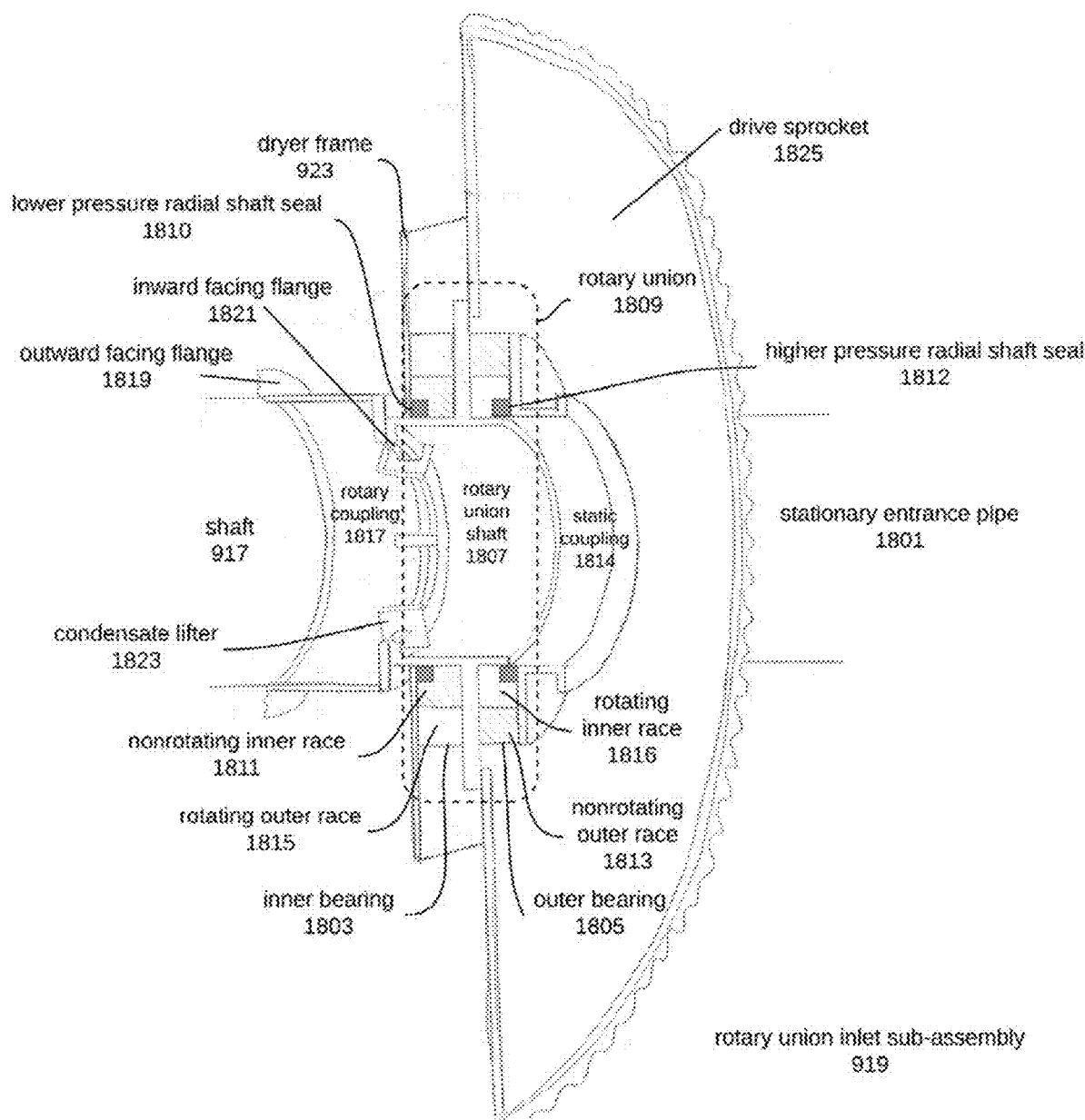
FIG. 18 is a partial isometric view of the inlet rotary union.

FIG. 18 is a partial isometric view of the inlet rotary union sub-assembly 919. Inlet 919 and outlet 921 rotary union sub-assemblies couple the rotating dryer shaft 917 to non-rotating exterior piping. The inlet rotary union sub-assembly 919 couples the shaft 917 to the stationary entrance pipe 1801. Inner bearing 1803, outer bearing 1805, and rotary union shaft 1807 form a rotary union 1809 having a stator and a rotor with roller, ball, or equivalent bearings disposed in the bearing races so that the stator and rotor may rotate relative to each other. A lower pressure radial shaft seal 1810 is used to seal the inner bearing 1803 from the dryer environment 309. A higher pressure radial shaft seal 1812 is used to seal the outer bearing 1805 from the pressurized steam environment 321. Other types of seals such as v-rings, lubricant, or the like may also be used as known to those skilled in the art.

The stator is comprised of a nonrotating inner race 1811 of the inner bearing 1803 and a nonrotating outer race 1813 of the outer bearing 1805. The rotary union 1809 is stationary mounted to the dryer frame 923 via a nonrotating inner race 1811 of the inner bearing 1803.

The nonrotating outer race 1813 of the outer bearing 1805 includes mounting surfaces so that it is stationary mounted to the static coupling 1814. The static coupling 1814 may be coupled to the stationary entrance pipe 1801 through conventional coupling methods known to those skilled in the art to exterior piping. Coupling methods may be threads, welding, bolted joints or the like.

The rotor is comprised of a rotating outer race 1815 of the inner bearing 1803, a rotary union shaft 1807, and a rotating inner race 1816 of the outer bearing 1805. The rotor of the rotary union 1809 is mechanically coupled to the dryer shaft 917 via the rotary coupling 1817. The first end of the rotary coupling 1817 may include an outward facing flange 1819 suitable for coupling to a flanged dryer shaft 917.

The second end of the rotary coupling 1817 may include an inward facing flange 1821 which may be mechanically and fixedly coupled to the rotary union shaft 1807. The rotary union shaft 1807 turns with the dryer shaft 917. The second end of the rotary coupling 1817 may also include lifters 1823 provided to "lift" liquid condensate 333 flowing through the hollow shaft 917 over the inward facing flange 1821. The rotary union shaft 1807 is coupled to a drive sprocket 1825 that causes the shaft 917 to rotate. The lifters 1823 are generally tabs or paddles as shown disposed about the junction of the inward facing flange 1821 and rotary union shaft 1807. As the shaft 917 rotates, so do the paddles 1823 causing liquid to be splashed over the inward facing flange 1821 that tends to create a barrier to the flow of liquid through the shaft 917 and the stationary entrance pipe 1801.

Those skilled in the art will realize that by methods known to those skilled in the art that the function of the inner and outer races of both the inner and outer bearings may be "swapped", that is the rotary union 1809 may be configured so that either the inner or outer race of each bearing may be fixed to the stationary components.

The inlet rotary union sub-assembly 919 tends to provide a passageway of substantially the same diameter as the shaft 917, and the stationary entrance pipe 1801 is also of substantially the same diameter as the shaft 917. However, at the dryer shaft 917 outlet the pipe coupled to the dryer 349 tends to be of a smaller diameter than the dryer shaft 917, and accordingly the union at the outlet 921 described next typically provides coupling to a pipe of lesser diameter than the shaft 917.

Figure 19:
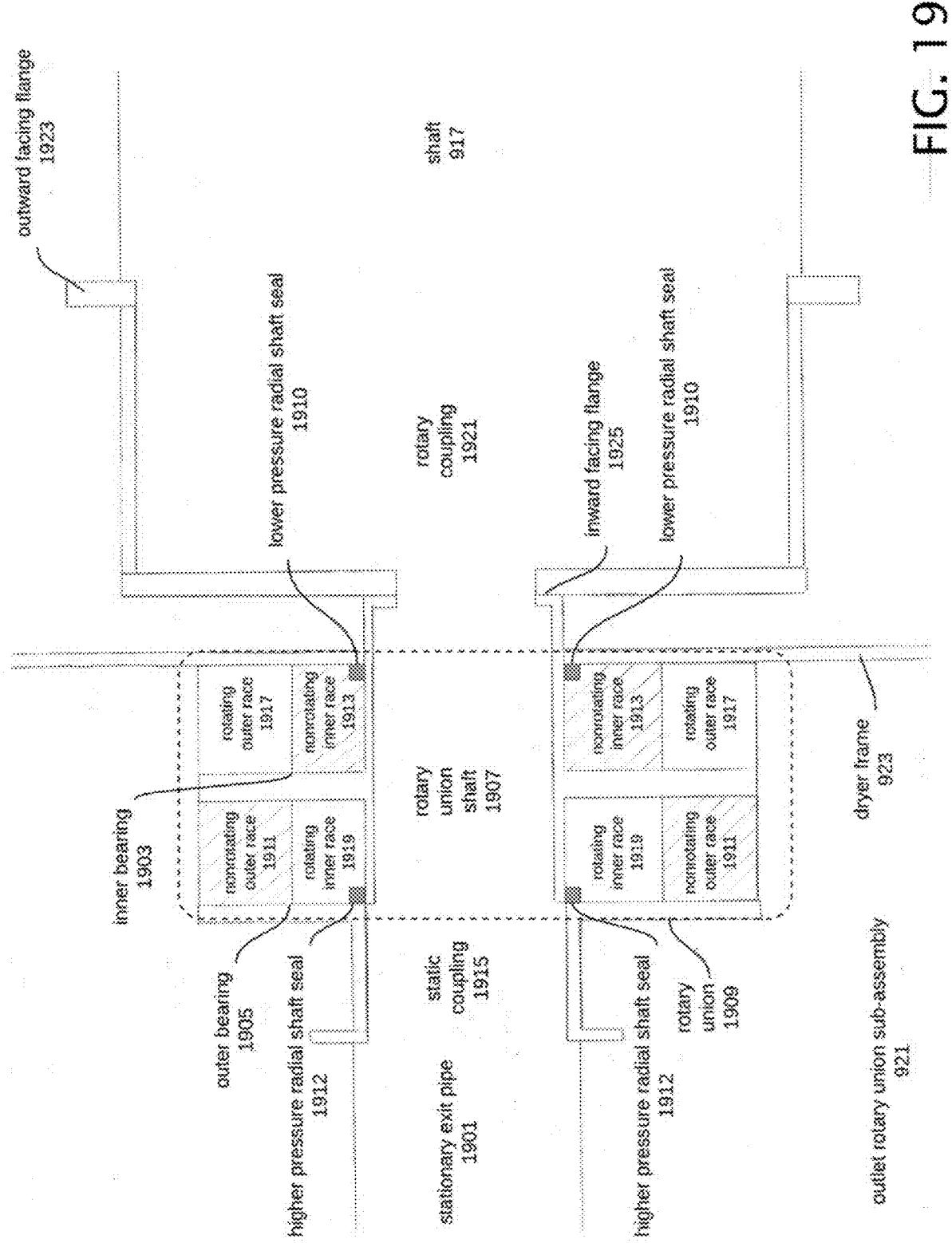
FIG. 19 is a section side view of the outlet rotary union.

FIG. 19 is a section side view of the outlet rotary union sub-assembly 921. The outlet rotary union sub-assembly 921 serves the same purpose as the inlet rotary union sub-assembly 919, namely to isolate the rotating dryer shaft 917 from the stationary exit pipe 1901. Both units provide support for the shaft 917 and serve to conduct fluid through their interior.

The outlet rotary union sub-assembly 921 couples the shaft 917 to the stationary exit pipe 1901. Inner bearing 1903, outer bearing 1905, and rotary union shaft 1907 form a rotary union 1909 having a stator and a rotor with roller, ball, or equivalent bearings disposed in the bearing races so that the stator and rotor may rotate relative to each other. A lower pressure radial shaft seal 1910 is used to seal the inner bearing 1903 from the dryer environment 309. A higher pressure radial shaft seal 1912 is used to seal the outer bearing 1905 from the pressurized steam environment 321. Other types of seals such as v-rings, lubricant, or the like may also be used as known to those skilled in the art.

The stator is comprised of a nonrotating outer race 1911 of the outer bearing 1905 and a nonrotating inner race 1913 of the inner bearing 1903. The rotary union 1909 is stationary mounted to the dryer frame 923 via a nonrotating inner race 1913 of the inner bearing 1903.

The nonrotating outer race 1911 of the outer bearing 1905 includes mounting surfaces so that it is stationary mounted to the static coupling 1915. The static coupling 1915 may be coupled to the stationary exit pipe 1901 through conventional coupling methods known to those skilled in the art to exterior piping. Coupling methods may be threads, welding, bolted joints or the like.

The rotor is comprised of a rotating outer race 1917 of the inner bearing 1903, a rotary union shaft 1907, and a rotating inner race 1919 of the outer bearing 1905. The rotor of the rotary union 1909 is mechanically coupled to the dryer shaft 917 via the rotary coupling 1921. The first end of the rotary coupling 1921 may include an outward facing flange 1923 suitable for coupling to a flanged dryer shaft 917.

The second end of the rotary coupling 1921 may include an inward facing flange 1925 which may be mechanically and fixedly coupled to the rotary union shaft 1907. The rotary union shaft 1907 turns with the dryer shaft 917. The rotary coupling 1921 facilitates a decrease in diameter from the dryer shaft 917 to the rotary union shaft 1907. The outlet rotary union sub-assembly 921 has lower volumes flowing through than the inlet rotary union sub-assembly 919 and can be smaller in diameter as a result.

Those skilled in the art will realize that by methods known to those skilled in the art that the function of the inner and outer races of both the inner and outer bearings may be "swapped", that is the rotary union 1909 may be configured so that either the inner or outer race of each bearing may be fixed to the stationary components.

Disc Dryer Sub-Assembly—Solids Removal Component Description

Figure 20:
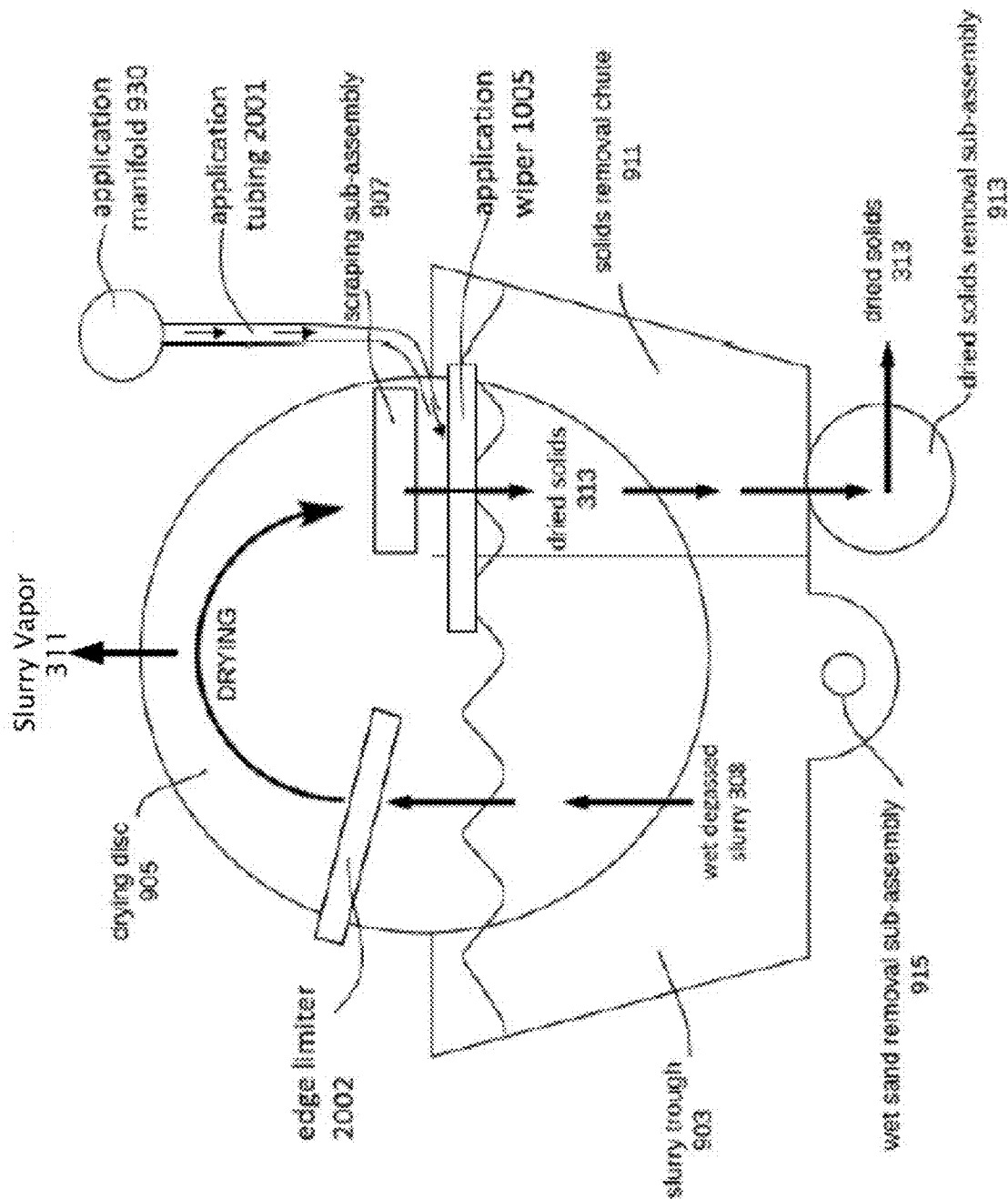
FIG. 20 is a diagram of wet slurry to dried solids movement in the dryer sub-assembly.

FIG. 20 is a diagram of wet degassed slurry 308 to dried solids 313 movement in the dryer sub-assembly 349. Wet degassed slurry 308 adheres to the exterior of the drying disc 905 as it rotates. Typically both sides of the disk 905 are coated with slurry, although in equivalent examples one side may be coated. The wet degassed slurry 308 can be applied via the slurry trough 903, and/or the application wiper 1005, or by equivalent methods known by those skilled in the art. The application wipers 1005 may be supplied with slurry via application manifold carrying slurry that is individually supplied to an application wiper via application tubing 2001.

As the drying disc rotates 905, the wet degassed slurry 308 begins to dry releasing slurry vapor 311. By the time the drying disc 905 rotates to the scraper sub-assembly 907 the wet degassed slurry 308 is dried. The scraper sub-assembly 907 scrapes dried solids 313 from the disc 905 surface. The dried solids 313 scrapings fall through the solids removal chute 911 and into the dried solids removal sub-assembly 913.

For example the cleaned disk area passes through the application wipers 1005, if so equipped, where slurry is applied to its surface, and then continues through the slurry in the trough 903 (if the level is maintained at a sufficient height to contact the disk). The disk next encounters the edge limiter 2002, if so equipped, where the slurry thickness on the disk may be leveled out. The optional edge limiter 2002 can be used to ensure the adhered wet degassed slurry 308 is applied evenly or improve drying.

An optional wet sand removal sub-assembly 915 can be included if the degassed slurry 308 contains larger sand particles. The level of the wet degassed slurry 308 can vary in height to maintain a desired mode of operation.

The rate of rotation of the drying disc 905 can be changed to adjust the thickness of the wet degassed slurry 308 applied to the disc 905 and the final moisture content of the dried solids 313. Adjustment may be done manually or through an automated feedback control system. Rotation may be at a constant rate that is periodically reset to a differing level as dictated by a control system, Alternatively the speed may be continuously and dynamically adjusted as dictated by an embedded control system. Dried solids 313 exiting the dryer 349 system typically have a solids content of 85% total solids (TS). Higher or lower total solids content can be achieved in the dryer sub-assembly 349 if desired. As the dried solids 313 exit the dryer system, the dried solids may be deposited in a dry solids hopper (not shown) for collection or storage.

Wet Sand Removal Sub-System

Figure 21:
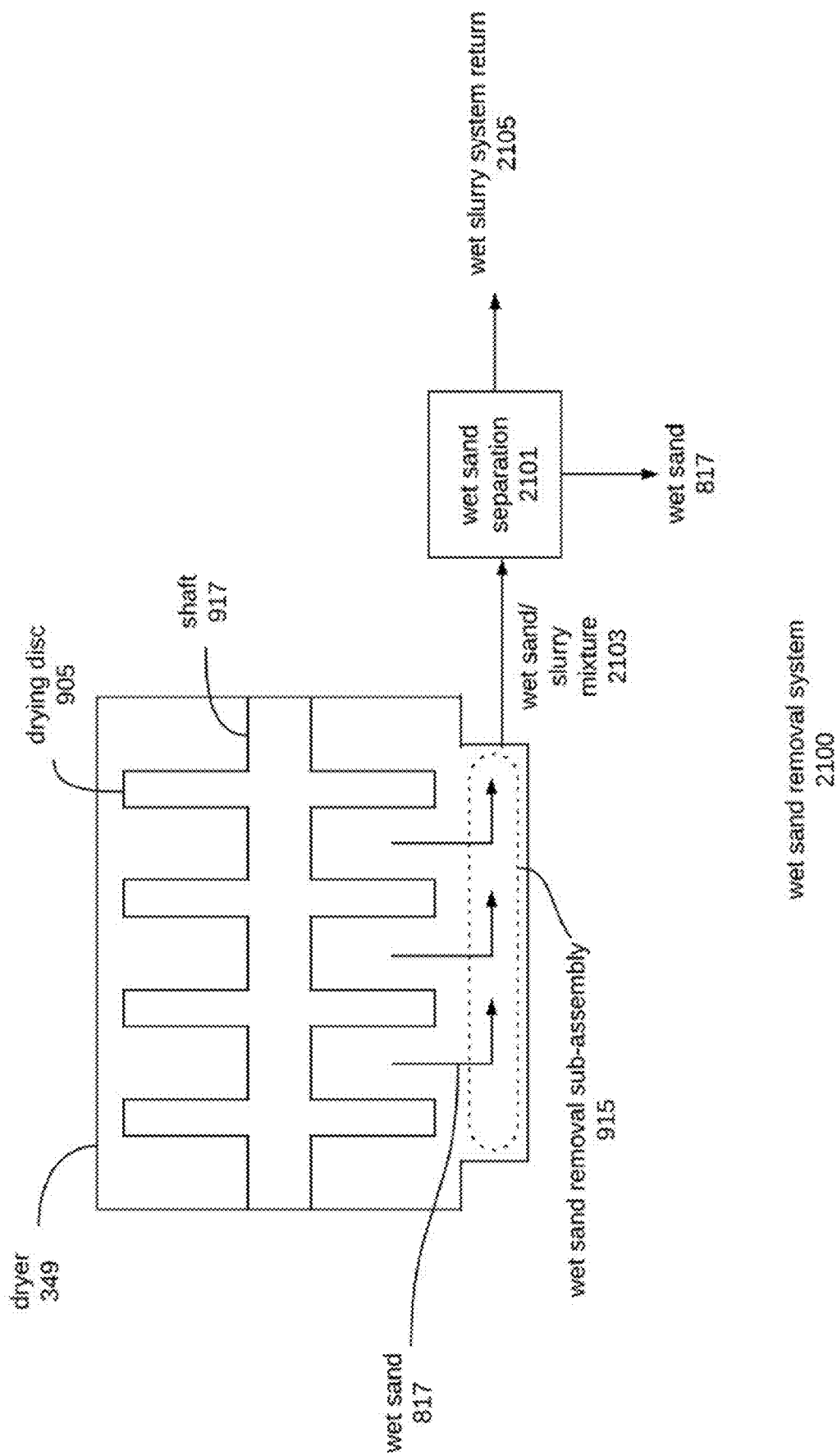
FIG. 21 is a diagram of a wet sand removal system.

FIG. 21 is a diagram of an optional wet sand (or other large particle) removal system 2100. If the wet slurry 303 entering the multi-functional slurry processing system 301 has sand 817 in it then over time the sand 817 can settle out in the slurry trough 903 and cause build up issues. A low spot can be designed into the dryer 349 to allow the wet sand 817 a place to accumulate. The wet sand 817 can then be removed via a wet sand removal sub-assembly 915 using conventional material conveying methods known to those skilled in the art. For example, the wet sand 817 can be removed through the use of an auger or through a water jet stream.

The removed wet sand/slurry mixture 2103 can then be passed through a wet sand separation system 2101 to separate wet sand 817 from the wet slurry 2105. Any conventional wet sand separation system 2101 can be used as known to those skilled in the art. This includes, but is not limited to, hydrocyclones and gravity settling tanks. In one example, the bottom portion of the degassing sub-assembly 307 can be utilized as a settling tank 811.

The separated wet slurry 2105 can be returned to the system. There are several options for where the wet slurry 2105 can be reintroduced. Options for reintroduction include, but are not limited to, pumping back to the headworks of the plant, pumping directly back into the dryers 349, pumping into the degassing sub-assembly 815, or pumping out of the system.

Dried Solids Removal Sub-System

Figure 22:
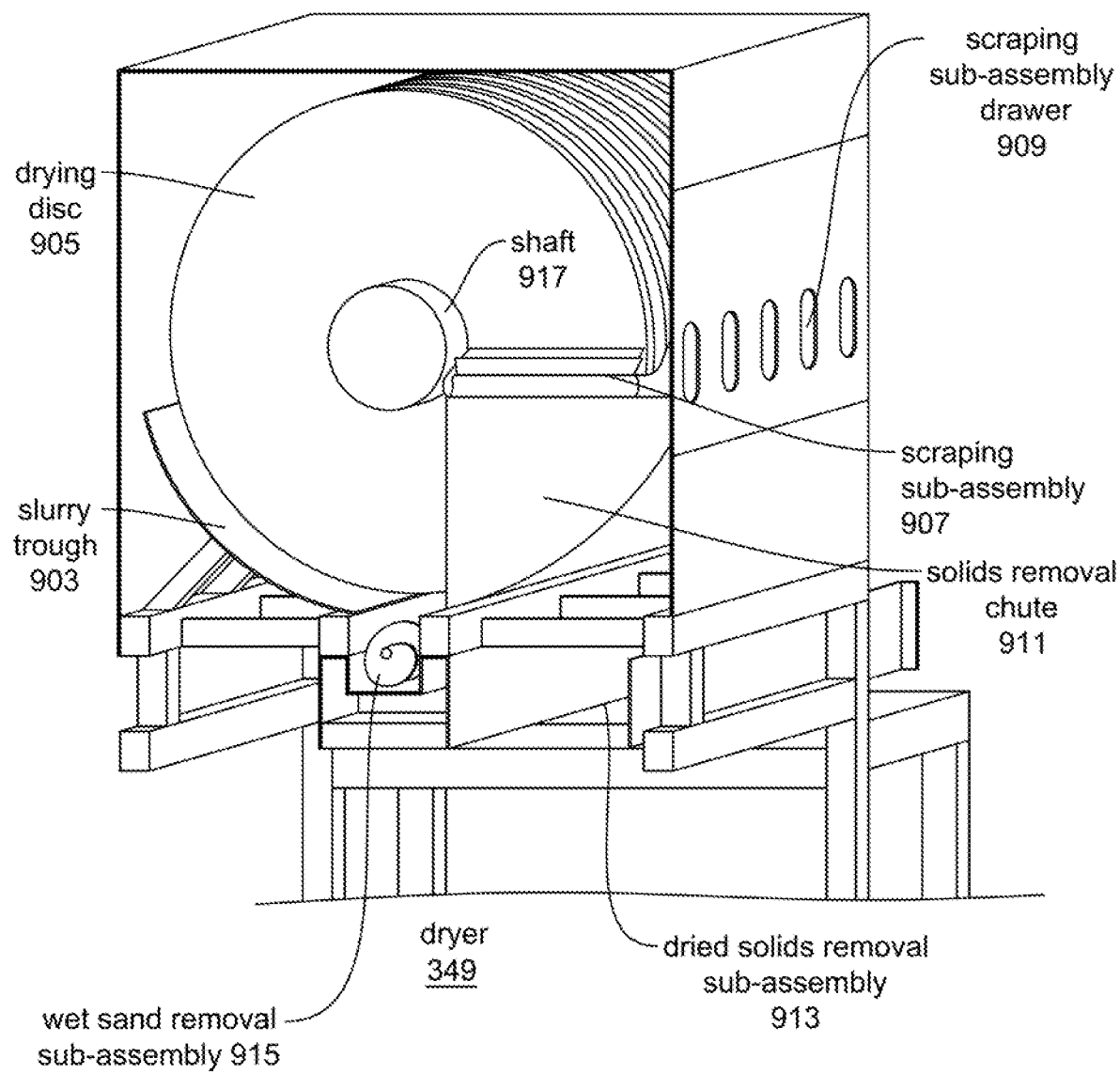
FIG. 22 is a partial isometric view of the dried solids removal from the dryer.

FIG. 22 is a partial isometric view of the dried solids removal from the dryer 349. The dried solids removal sub-assembly 913 is located directly beneath the solids removal chutes 911. Dried solids 313 fall from the scrapers through the chutes 911 and into the dried solids removal sub-assembly 913. In this example, the dried solids 313 are removed via a drag-chain conveyor (not shown). However, any bulk material handling method known to those skilled in the art can be utilized to remove the dried solids 313. This includes, but is not limited to, the use of a belt conveyor, auger (single, twin, live bottom), slide gate, vibratory floor, tubular conveyor, or pneumatic conveying. For simplicity this figure omits equipment associated to the application of the wet degassed slurry 308 to the drying disc 905. Some of the items omitted are the application manifold (930 of FIG. 9), application wipers (1005 of FIG. 10), and edge limiters (2002 of FIG. 20).

In this example, the drag-chain conveyor is designed to have a wide width where the dried solids 313 enter to prevent bridging from occurring. The entire drag-chain conveyor is slightly tilted to allow condensate to drain out during start-up of the unit.

If the dryer 349 is operated at an elevated or lowered internal pressure relative to atmosphere a pressurized dried solids handling system can be used to remove the dried solids 313. The pressurized dried solids handling system enables the removal of dried solids 313 from an elevated or lowered pressure to atmospheric pressure avoiding sharp pressure changes in the evaporation system. The dried solids handling system consists of a pair of knife gates with a transfer chamber between them. The transfer chamber contains a pressuring line with an actuated pressuring valve connected to the pressurized evaporation system and a depressurizing line connected to an actuated pressure bleed valve that vents to atmosphere. To remove dried solids 313 from the system the exterior knife gate and actuated pressure bleed valve are closed. The actuated pressuring valve is then slowly opened to pressurize the transfer chamber to the internal pressure of the multi-stage evaporation system. Once the desired pressure is reached in the transfer chamber the interior knife gate is opened allowing dried solids 313 to enter the transfer chamber. A level sensor is placed in the transfer chamber to indicate when the transfer chamber is full. Once the transfer chamber is full the interior knife gate and actuated pressuring valve close. The actuated pressure bleed valve is then opened slowly to return the transfer chamber to atmospheric pressure. Finally, the exterior knife gate opens to allow the dried solids 313 to exit the evaporation system. This process can be repeated several times to empty the evaporation system 349. Other methods that maintain pressure on both sides of the removal system such as double knife gates, rotary lock, or the like can be used to remove dried solids 313 from a pressurized system as known to those skilled in the art.

Disc Dryer Sub-Assembly—Scraper Component Description

Figure 23:
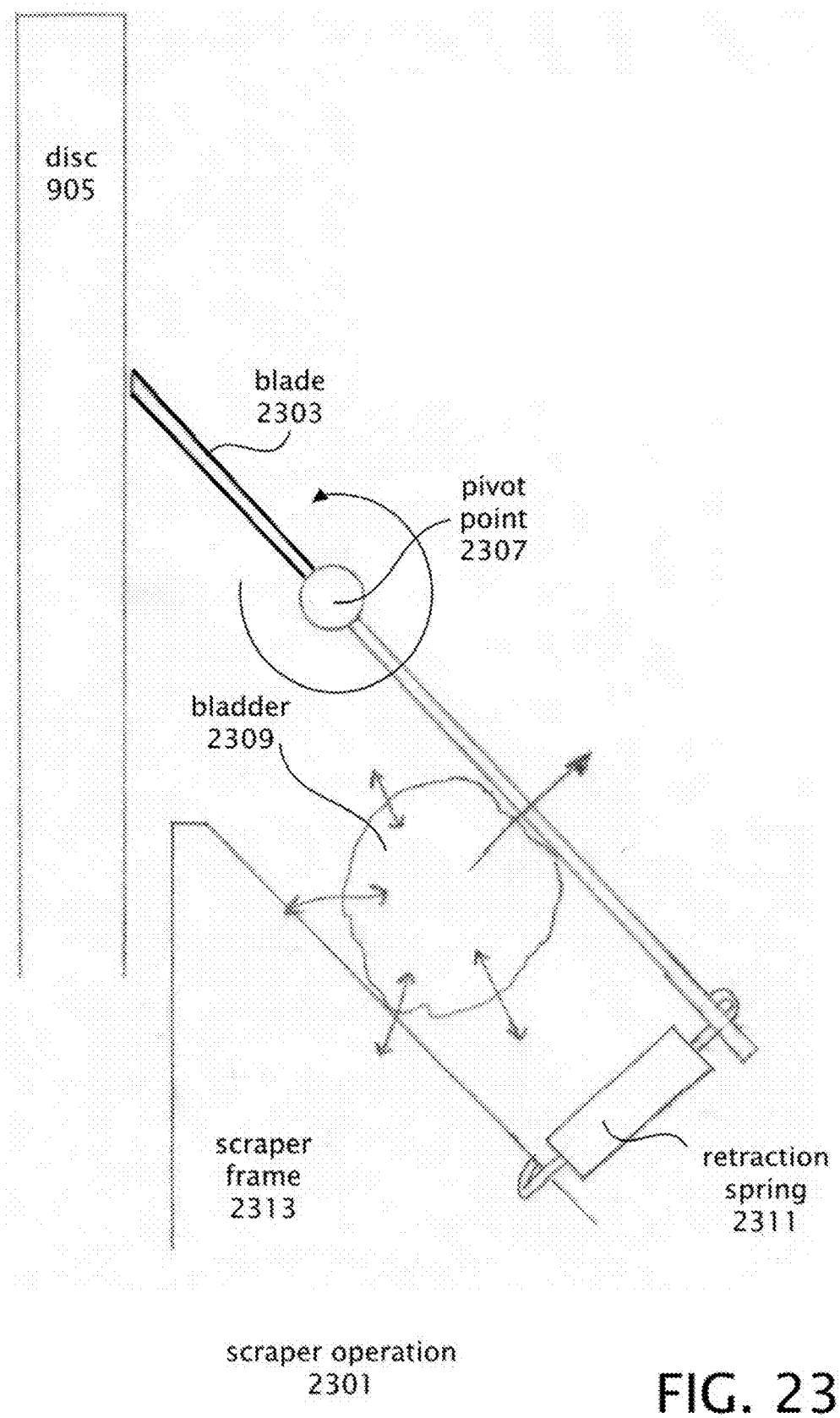
FIG. 23 shows the scraper operation.

FIG. 23 shows the scraper operation 2301. The scraper system 907 utilized to scrape dried solids 313 from the heated and rotating discs 905 is uniquely constructed so that extremely flat discs do not have to be utilized in the dryer 349. In this system the drying discs 905 tend to be large and maintaining a flat surface over a large disc 905 to accommodate the commonly available rigid scraper blades is costly. Accordingly, a scraper system 907 that tends to float over the drying disc surface as provided in the following examples tends to allow the use of discs 905 that have more surface flatness variations than what is currently provided.

The scraper mechanism works by providing a scraper blade 2303 supported on a holder (not shown) that provides a pivot 2307 for the blade 2303 to rotate about. The pivot 2307 allows the scraper blade 2303 at a first end of the blade to be pressed against the disc surface 905, so that the edge of the scraper blade 2303 tends to ride along the surface of the disc 905 conforming to its irregularities. At a second end of the scraper blade 2303 an outward bias must be applied to hold the blade 2303 against the disc 905. An inflatable bladder 2309 or its equivalent may be utilized to provide the outward bias.

In order to disengage the blade 2303 from the disc 905 when air (or any suitable gas or gasses) pressure is removed from the bladder 2309 a retraction spring 2311 is provided at the second end of the scraper blade 2303 to provide an inward bias. Accordingly, when air pressure is removed from the bladder 2309, the blade 2303 retracts from the disc surface 905. When the bladder 2309 is filled with gas the blade 2303 engages the surface of the disc 905 to scrape it clean.

Figure 24:
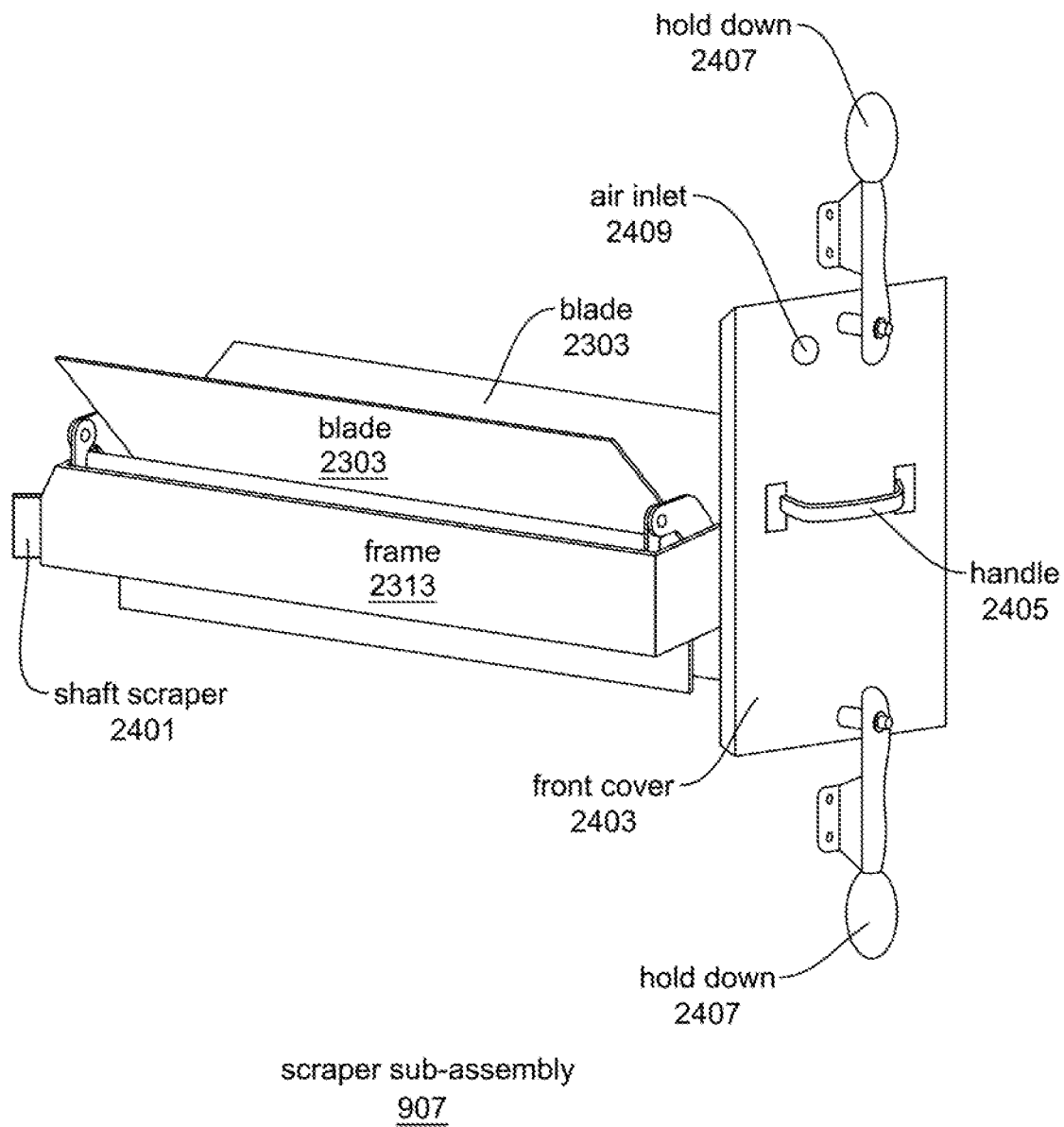
FIG. 24 is an isometric view of the scraper sub-assembly.

FIG. 24 is an isometric view of the scraper sub-assembly 907. The scraper sub-assembly 907 is disposed in a drawer-like frame 909 that fits between two dryer discs 905 and contains two blades 2303. One blade 2303 is provided to scrape each disc 905.

The scraper frame 2313 supports an implementation of the previously described scraper functions including support of the blades 2303, pivots 2307, bladders 2309, and retraction mechanism 2311. The scraper frame 2313 also provides support for a mechanical shaft scraper 2401. The scraper frame 2313 is supported by the dryer frame 923. The scraper sub-assembly 907 may advantageously be pulled out of the dryer frame 923 for maintenance and the like.

The scraper frame 2313 also includes a front cover 2403 that provides a seal to maintain enclosure of the dryer evaporation chamber 349. The front cover 2403 may include one or more handles 2405, a locking mechanism 2407 to maintain the drawer 909 in place, and an air supply inlet 2409. In this example, the locking mechanism is shown as two hold-downs 2407.

Figure 25:
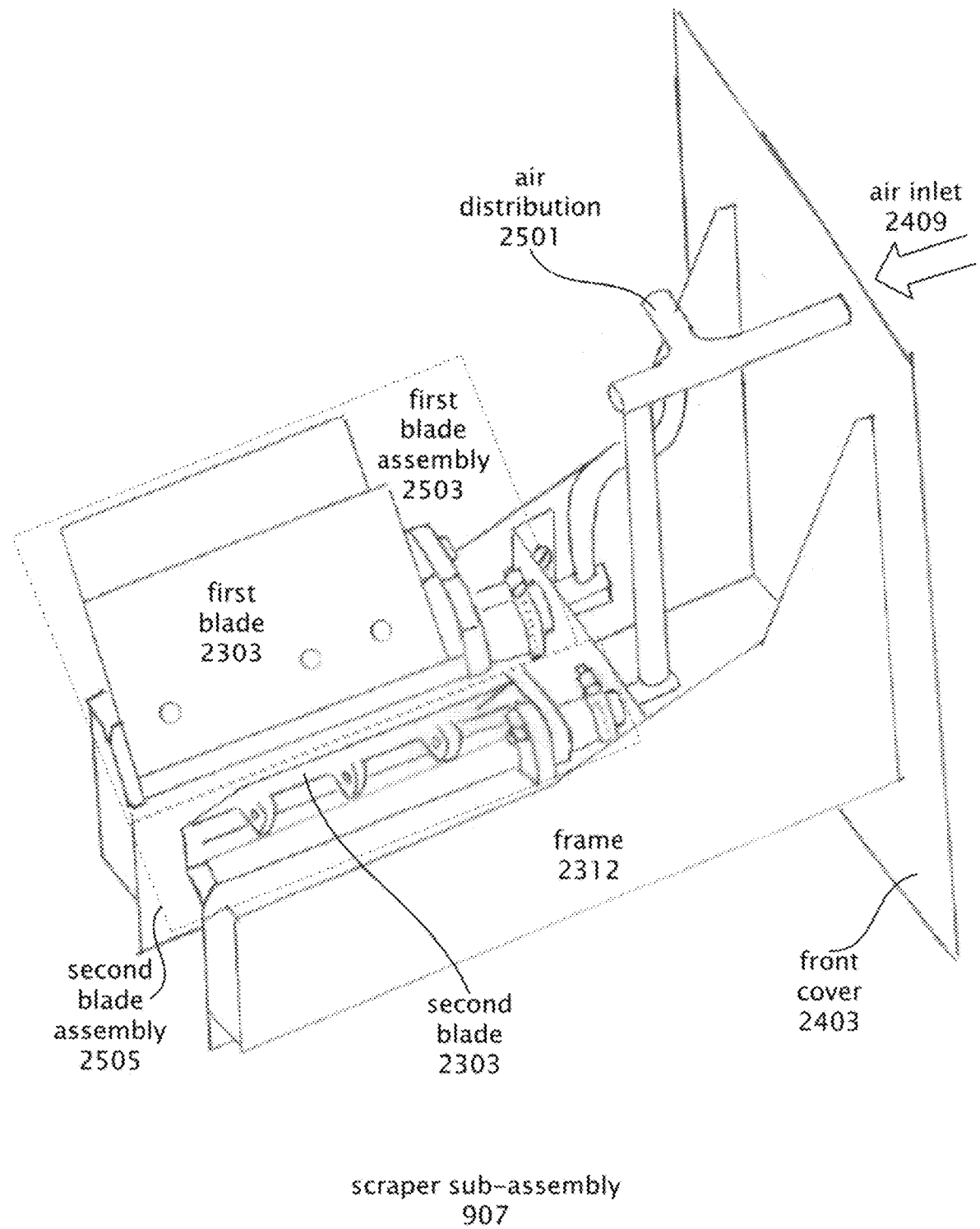
FIG. 25 is a top-down partial isometric view of the scraper sub-assembly showing pneumatic distribution.

FIG. 25 is a top-down partial isometric view of the scraper sub-assembly 907 showing pneumatic distribution 2501. From an air line coupled to the front cover fitting 2409 air pressure is split through a "Y" junction 2501 and distributed to a first blade assembly 2503 and a second blade assembly 2505. The air pressure may be fixed or variable. Variable air pressure may be regulated according to instructions from a controller based on one or more sensor inputs.

Figure 26:
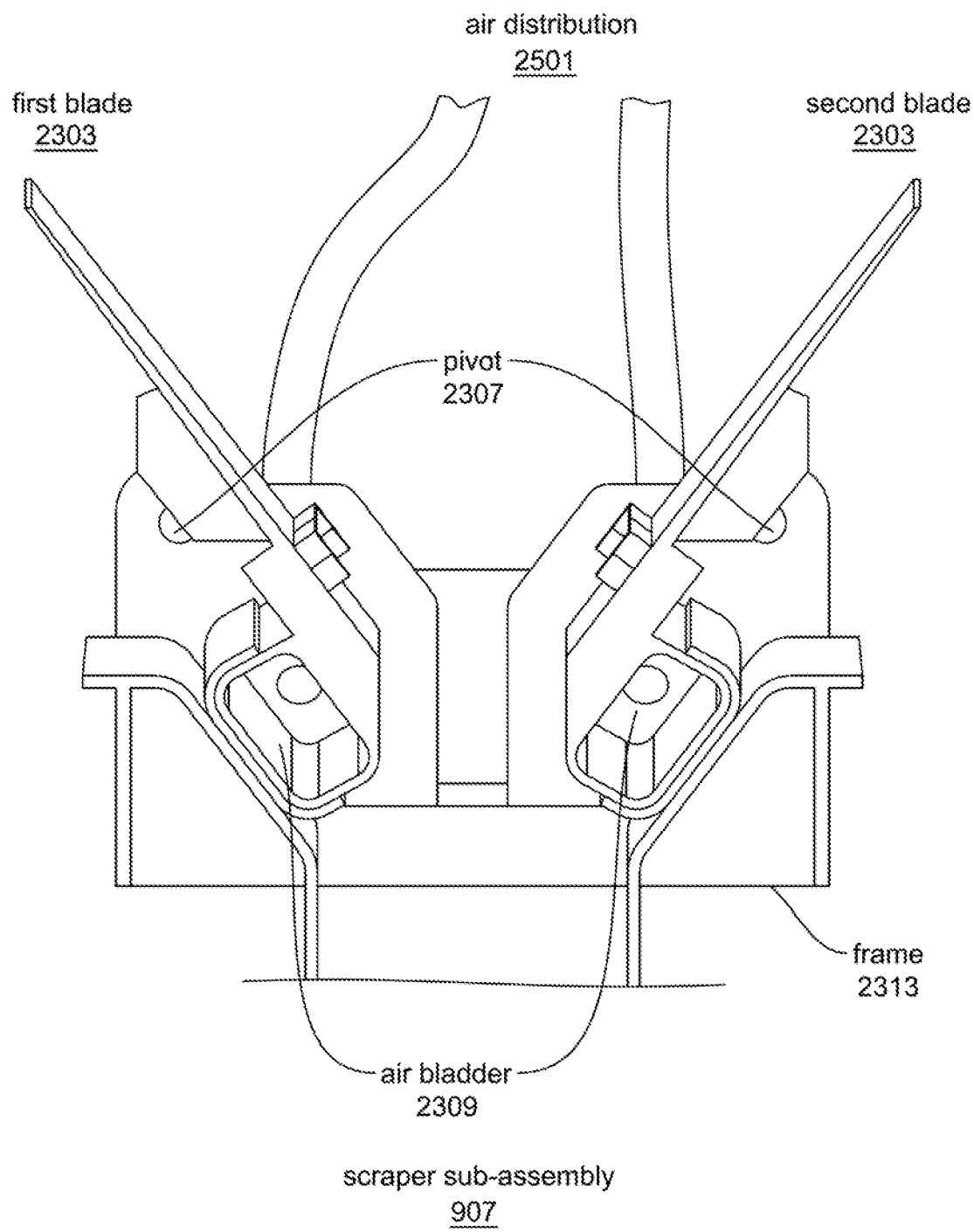
FIG. 26 is a cut away end view of the scraper sub-assembly showing pneumatic actuation of the scrapers.

FIG. 26 is a cut away end view of the scraper sub-assembly 907 showing pneumatic actuation of the scrapers 2303. The first and second scraper blades 2303 are coupled to the frames 2313 at pivot points 2307 (or equivalently by longitudinal shafts, fixed at points about which the blades pivot 2307). At a first end of the blades 2303 an expandable chamber is provided by interleaved metal channels in which a bladder 2309 is disposed. The bladder 2309 is inflated by fittings coupling the air distribution lines 2501 to each bladder 2309. The bladder 2309 inflates in the channels pushing them outward against the frame support 2313 and the first end of the blade 2303.

Figure 27:
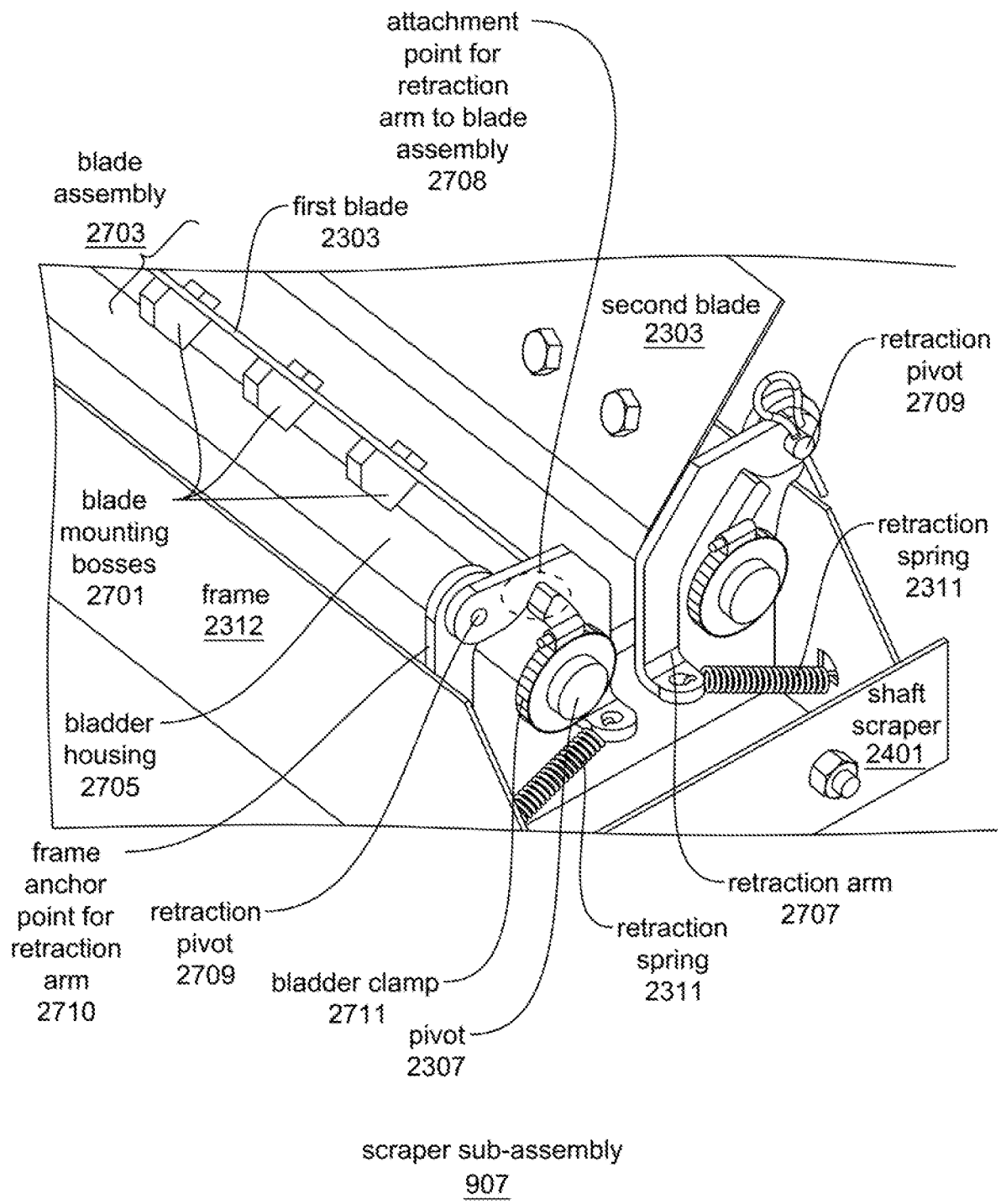
FIG. 27 is a rear inclined view of the scraper sub-assembly showing the spring retraction of the scraper blades.

FIG. 27 is a rear inclined view of the scraper sub-assembly 907 showing the spring retraction of the scraper blades 2303. The scraper blades 2303 are coupled via blade mounting bosses 2701 that are part of the pivot point 2307 to form a blade assembly 2703 along with the bladder housing 2705. This structure of the blade assembly 2703 allows worn or damaged blades 2303 to be easily replaced.

A retraction arm 2707 is part of (or equivalently attached to) to the blade assembly 2703 at an attachment point 2708 along its length. At a first end the retraction arm 2707 is pivotably 2709 coupled to the frame 2313 at a frame attachment point 2710, and at a second end it is coupled to the frame 2313 via a retraction spring 2311 that provides bias for blade retraction.

Also shown in this view are the bladder clamps 2711 that seal the bladder 2309 at this end of the bladder housing. And finally, the shaft scraper 2401 that may be coupled to the frame housing 2313 is partially shown.

Figure 28:
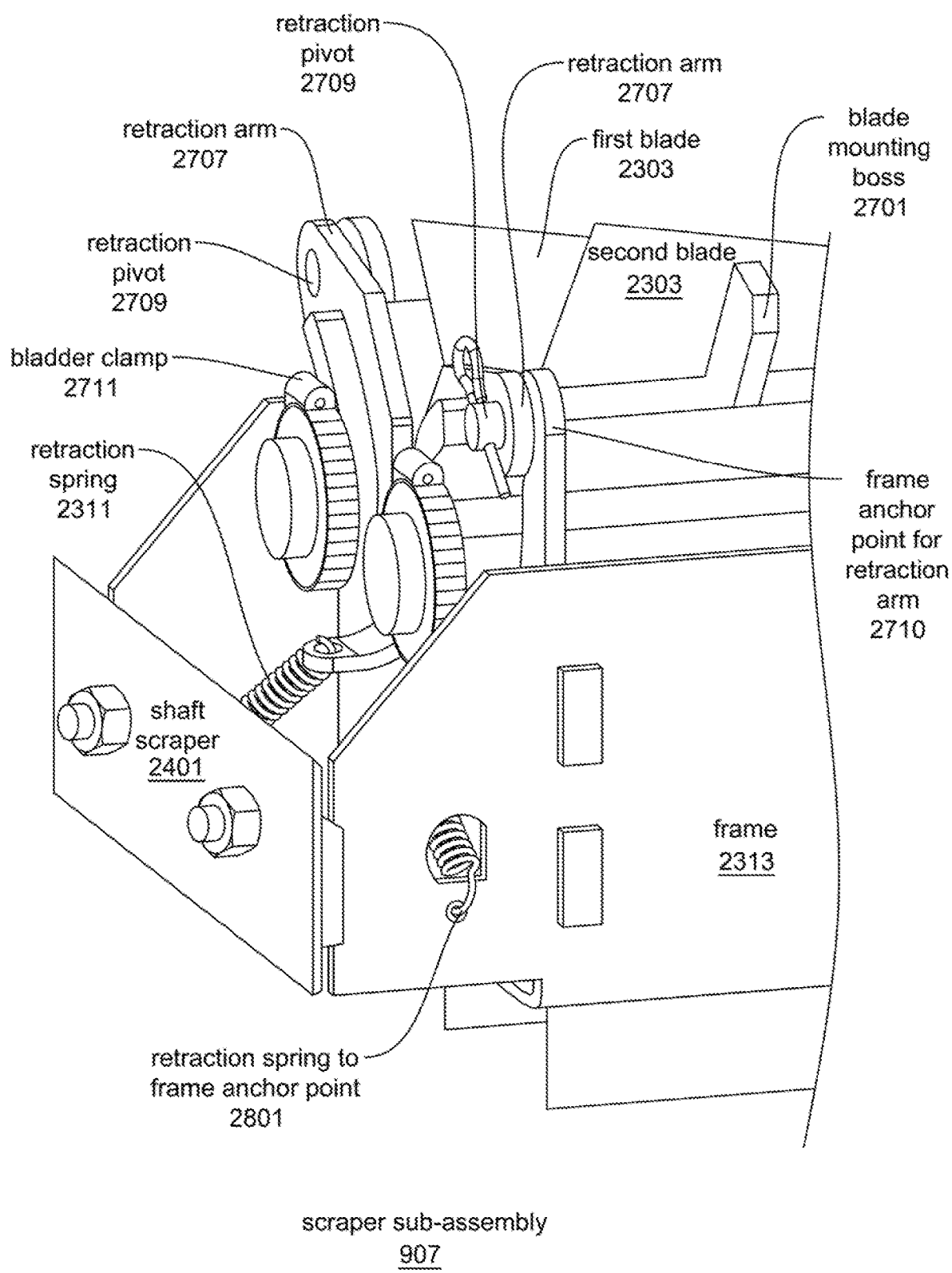
FIG. 28 is a rear isometric view of the scraper sub-assembly showing the shaft scraper blade.

FIG. 28 is a rear isometric view of the scraper sub-assembly 907 showing the shaft scraper blade 2401. This view shows further detail of the blade retraction mechanism including the removable retraction pivot 2709 that couples the retraction arm 2707 to the frame anchor point 2710. Also shown in further detail is the attachment of the retraction springs to the frame 2801, and the central shaft scraper 2401 that is bolted, or equivalently coupled to the frame 2313.

Figure 29:
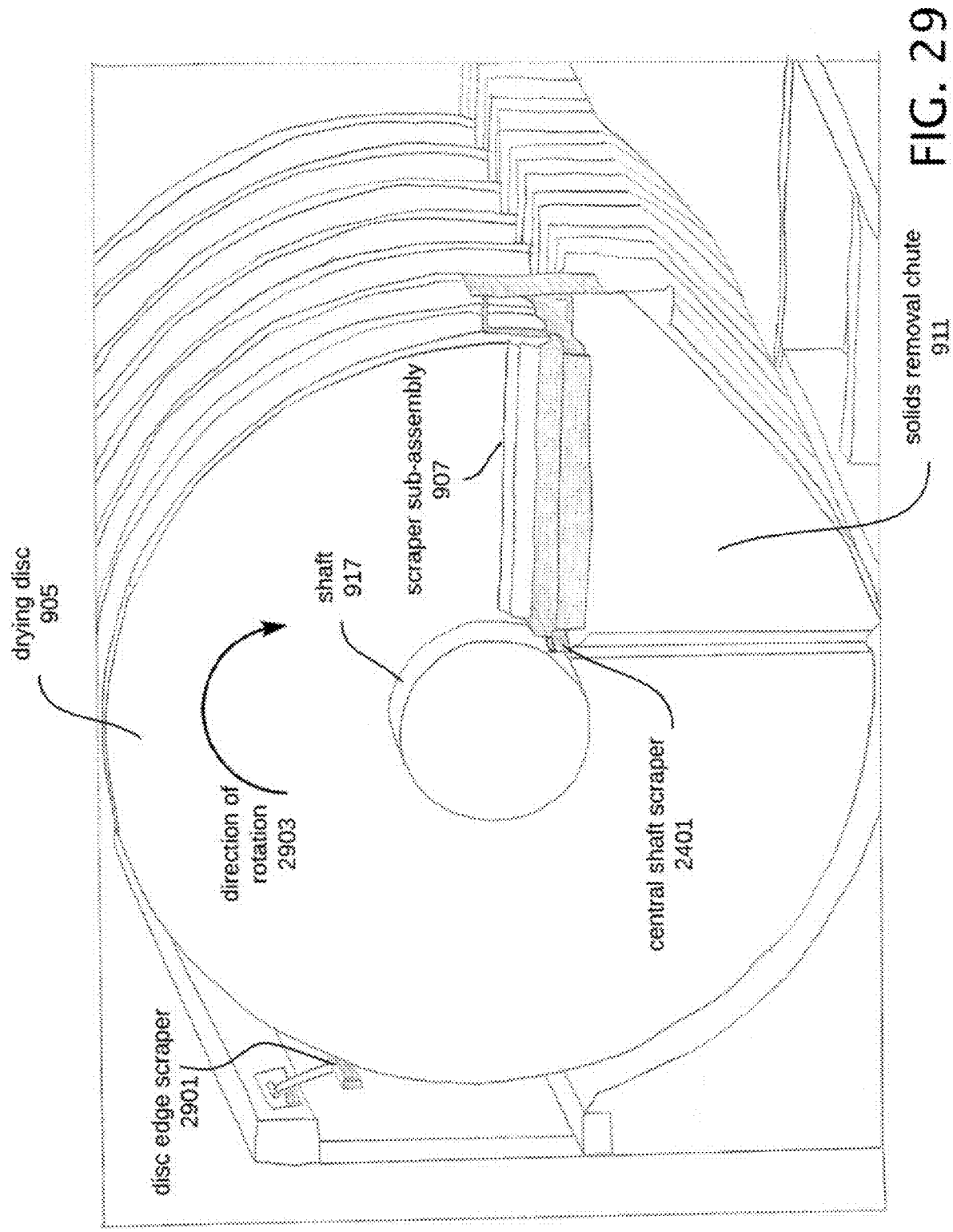
FIG. 29 shows the shaft scraper blade of the scraper sub-assembly, and the disc edge scraper operating on a dryer disc to remove solids accumulation.

FIG. 29 shows a partial isometric view of the shaft scraper blade 2401 of the scraper sub-assembly 907, and the disc edge scraper 2901 operating on a dryer disc 905 to remove solids accumulation. As the heated dryer discs 905 rotate through the slurry mixture 308 dried slurry tends to build up on the disc edges 905 and on the shaft 917. For clarity the figure omits equipment associated to the application of the wet degassed slurry 308 to the drying disc 905. Some of the items omitted are the application manifold (930 of FIG. 9), application wipers (1005 of FIG. 10), and edge limiters (2002 of FIG. 20).

A disc edge scraper 2901 may be mounted on the dryer frame 923 to scrape the edges of the discs 905 as they rotate 2903. When the scraper sub-assembly 907 is inserted into the dryer frame 923 the central shaft scraper 2401 coupled to it is positioned so that solids on the shaft 917 may be removed by it.

The scraper sub-assembly 907 has a bottom that opens into a solids removal chute 911 so that as material is scraped from the heated dryer disc 905 it falls into the chute 911 where it is subsequently removed.

Concentrating Tower Sub-Assembly

Figure 30:
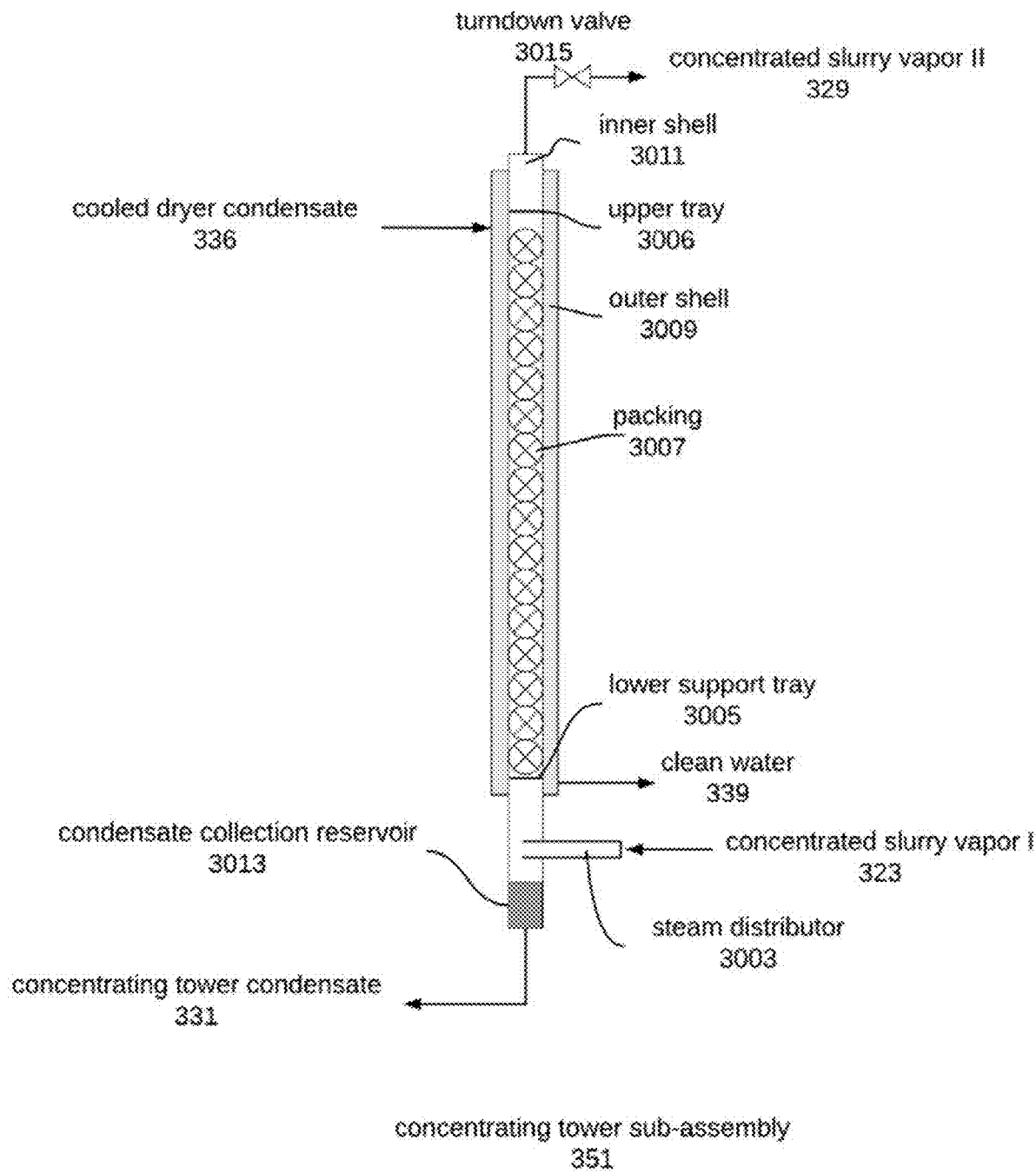
FIG. 30 is a diagram of the concentrating tower sub-assembly.

FIG. 30 is a diagram of the optional concentrating tower sub-assembly 351. Concentrated slurry vapor I 323 enters the concentrating tower sub-assembly 351 through the steam distributor 3003. Concentrated slurry vapor II 329 exits the top of the inner shell 3011 of the concentrating tower sub-assembly 351. Concentrating tower condensate 331 collects in the condensate collection reservoir 3013 and then exits the bottom of the inner shell 3011 of the concentrating tower sub-assembly 351. Cooled dryer condensate 336 (or an alternate cooling medium) enters the top of the outer shell 1109 of the concentrating tower 1101. Clean water 339 exits the bottom of the outer shell 3009 of the concentrating tower sub-assembly 351.

The concentrating tower sub-assembly 351 typically provides heat removal from the hot side of the concentrating tower 327 to the cold side of the concentrating tower 337. The hot side 327 and cold side 337 are typically separated by a physical barrier to prevent materials on the hot side 327 from mixing with those on the cold side 337. The barrier can be constructed in several geometries. In this example, the geometry is an outer pipe 3009 and inner pipe 3011 where the hot side 327 is the inner shell 3011 and the cold side is the outer shell 3009. Another example is a tube-in-tube geometry.

As heat is removed from the concentrated slurry vapor I 323 it begins to form concentrating tower condensate 331 that flows downward through the column inner shell 3011. As the concentrated slurry vapor I 323 rises through the down coming concentrating tower condensate 331 it becomes concentrated in species that are more volatile than water (such as ammonia). Conversely, the concentrating tower condensate 331 is stripped of species that are volatile resulting in a cleaner water. The concentrating tower inner shell 3011 can be filled with packing 3007 or equivalent equipment known to those skilled in the art to increase interactions between the rising concentrated slurry vapor I 323 and the falling concentrating tower condensate 331. A lower support tray 3005 and upper tray 3006 hold the packing 3007 in place. Alternate methods such as trays or baffles can be used to increase contact between the vapor 323 and the liquid phase 331 as known to those skilled in the art.

The rate of condensation that takes place in the concentrating tower sub-assembly 351 is typically controlled through a turndown valve 3015. Other methods can be used to control the rate of condensation taking place in the concentrating tower sub-assembly 351. As the flow rate of vapor out the top of the tower is decreased, the concentrated slurry vapor II 329 increases in the concentration of low-boiling point constituents (such as ammonia).

Figure 31:
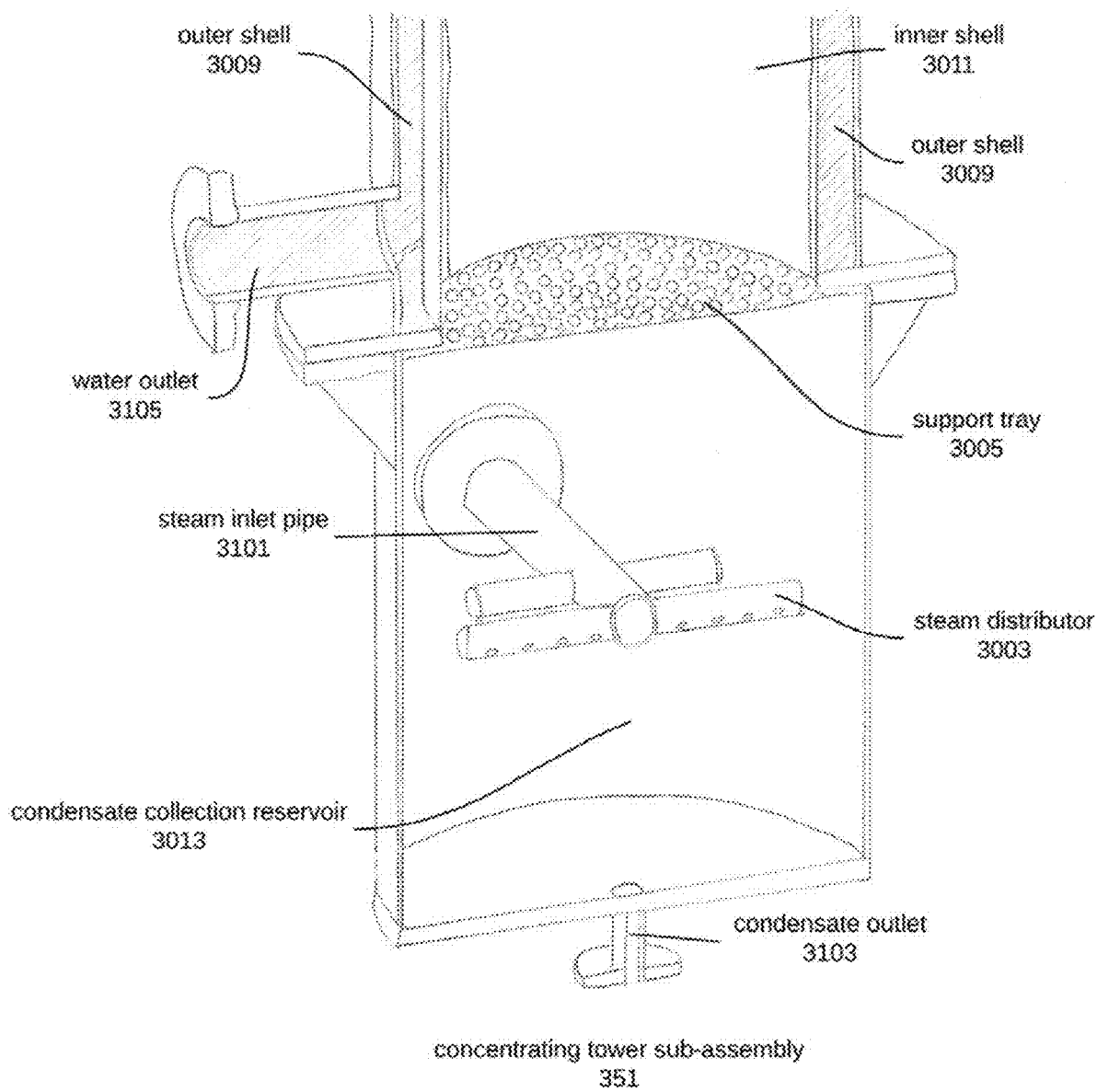
FIG. 31 is a partial isometric view of interior details of the concentrating tower sub-assembly.

FIG. 31 is a partial isometric view of the interior details of the optional concentrating tower sub-assembly 351. Concentrated slurry vapor I 323 enters the inner shell 3011 through the steam inlet pipe 3101 and is distributed throughout the column with the optional the steam distributor 3003. As the vapor 323 rises through the inner shell 3011 it passes through packing 3007 (not shown) and then exits out the top of the tower as concentrated slurry vapor II 329. Concentrating tower condensate 331 exits the bottom of the tower through the condensate outlet 3103. Cooled dryer condensate 336 (or an alternate cooling medium) flows through the outer shell 3009 and acts a heat transfer medium. The cooled dryer condensate 336 (or alternate cooling medium) enters the tower 351 through the water inlet (not shown) and exits through the water outlet 3105.

In the shown example, 1" stainless steel arch ring packing 3007 is used as the packing medium. The packing 3007 is held up in the tower 351 via the support tray 3005. The packing 3007 increases the contact area between the rising vapor 323 and falling condensate 331 in the tower 351 resulting in increased mass transfer between the two phases. Other packing 3007 can be used in the tower 351 with varying diameters and geometries as known to those skilled in the art. Alternate methods such as trays or baffles can be used to increase contact between the vapor 323 and the liquid phase 331 as known to those skilled in the art.

Steam Filter Sub-Assembly

Figure 32:
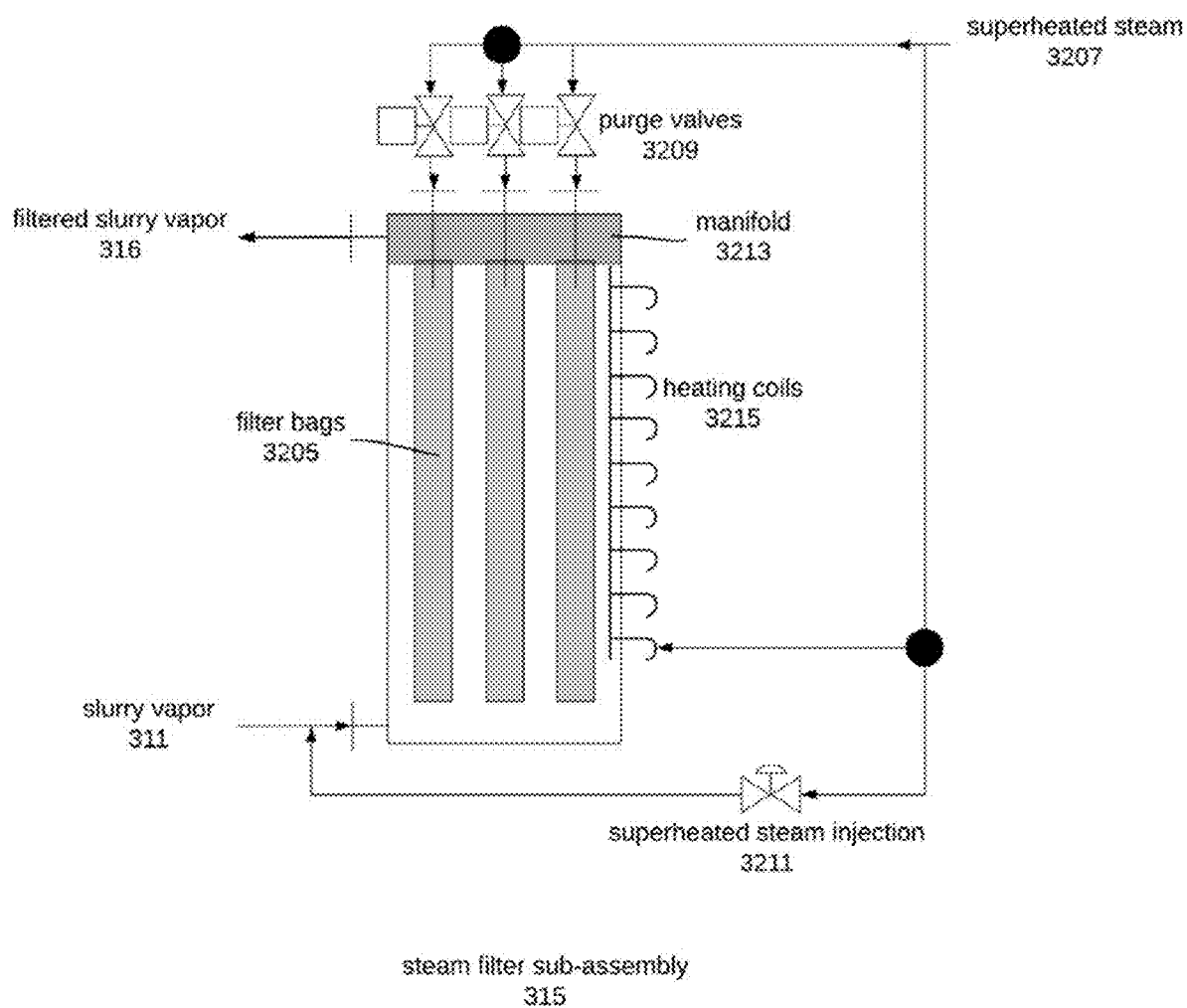
FIG. 32 is a diagram of the steam filter sub-assembly.
Figure 33:
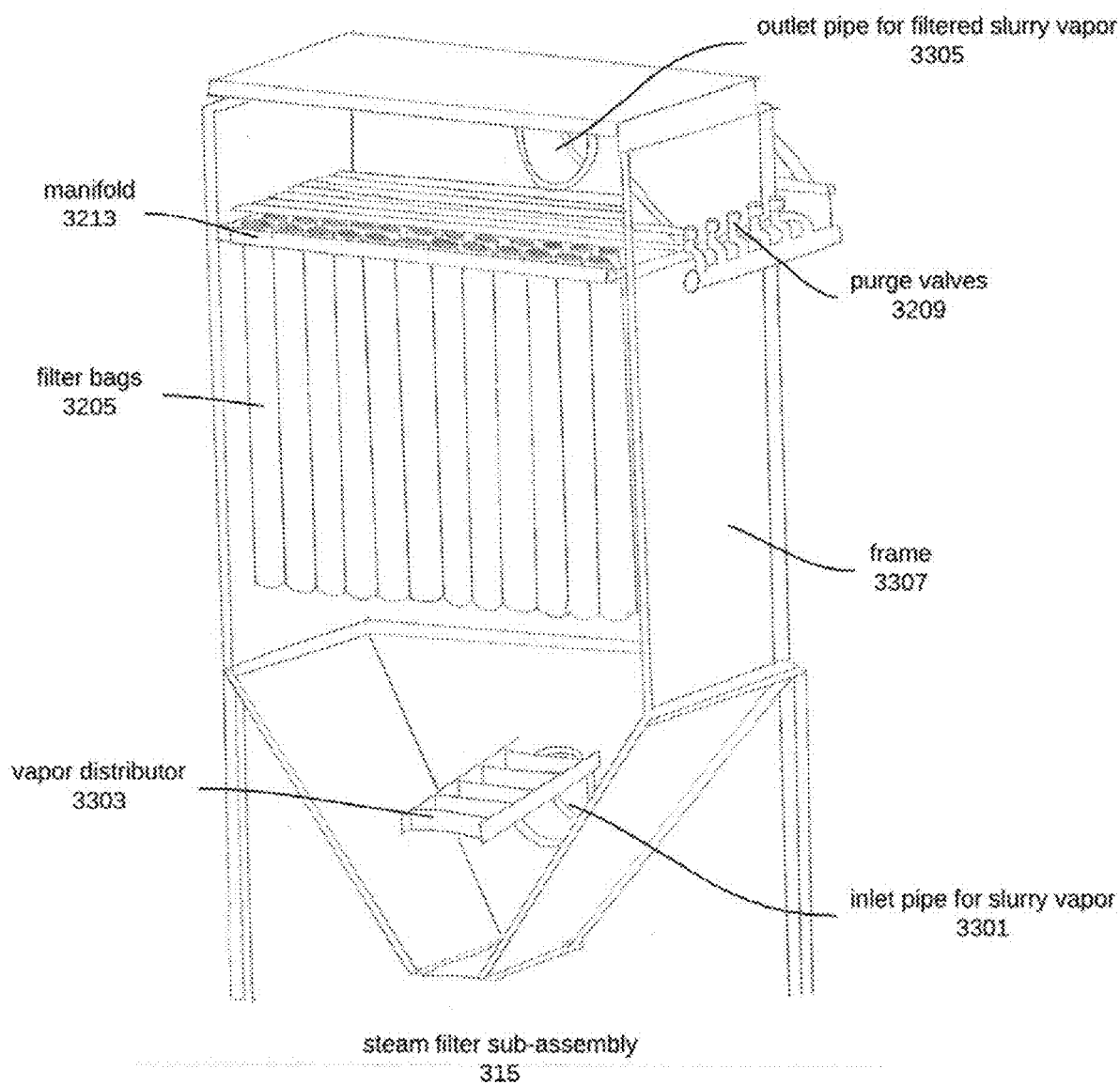
FIG. 33 is a partial isometric view of the steam filter sub-assembly.
Figure 34:
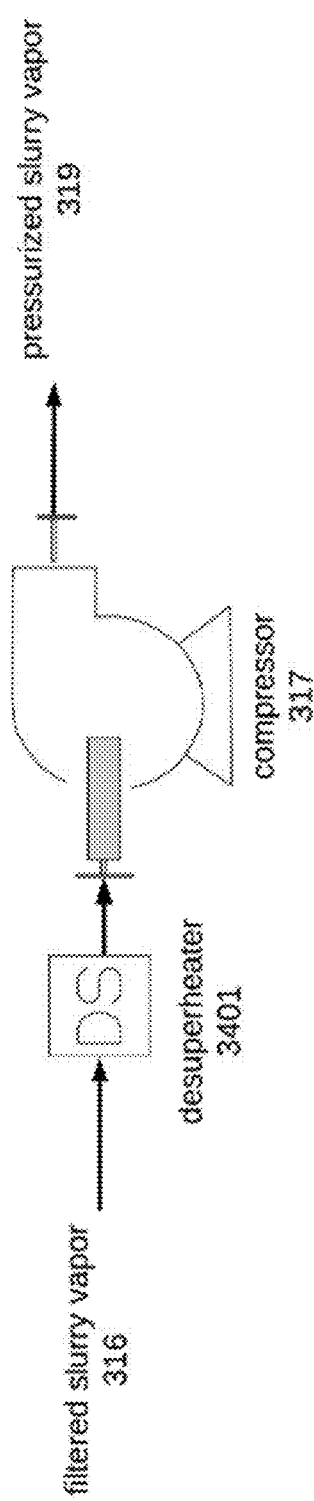
FIG. 34 is a block diagram of the compressor.

FIG. 32 is a diagram of the optional steam filter sub-assembly 315. Inlet slurry vapor 311 enters the bottom of the steam filter sub-assembly 315 and passes through a series of filter bags 3205. Filtered slurry vapor 316 exits the steam filter sub-assembly 315 through the manifold 3213.

The steam filter sub-assembly 315 removes the majority of particulates from the inlet slurry vapor 311. Various pore sizes (i.e. 1 micron filter) and materials (i.e. felt) can be used for the filter bags 3205. While the filtered slurry vapor 316 may include some impurities, the filtered vapor 316 is pathogen-free because the slurry vapor 311 is exposed to high temperatures for a sufficient duration to kill any pathogens in the slurry vapor 311.

In the illustrated example, the steam filter sub-assembly 315 is placed adjacent to the dryer sub-assembly 349. In some cases, the inclusion of a cyclone to remove particulates prior to the steam filter sub-assembly 315 may be needed. In an alternative arrangement, the steam filter sub-assembly 315 can be placed directly on top of the dryer sub-assembly 349 which allows for particulates to fall directly back into the slurry trough 903 and prevents accumulation of particulates in the piping. As many steam filter sub-assemblies 315 as are needed can be placed in parallel.

The steam filter sub-assembly 315 has several features to prevent the system from clogging. The steam filter sub-assembly 315 receives superheated high pressure steam 3207 that is used in several ways. The steam filter sub-assembly 315 has heating coils 3215 wrapped around the exterior tubular shell that holds the filter bags 3205. The heating coils 3215 have superheated high pressure steam 3207 running through them to keep the steam filter sub-assembly 315 at a high temperature. The high temperature prevents the formation of condensation on the filter bags 3205 which would cause severe clogging. Steam injection ports 3211 are located at the bottom of the steam filter sub-assembly 315 to directly inject superheated high pressure steam 3207 into the steam filter inlet port. This ensures that the slurry vapor 311 passing through the filter bags 3205 is superheated and does not form moisture droplets. The top of the steam filter sub-assembly 315 is equipped with a steam filter bag purge 3209. Once the differential pressure across the steam filter bags 3205 exceeds a set limit the filter bags 3205 are purged with superheated steam 3207 to clean off the filter bags 3205.

FIG. 33 is a partial isometric view of the optional steam filter sub-assembly 315. Slurry vapor 311 enters the steam filter sub-assembly 315 through the inlet 3301. The slurry vapor 311 passes through an optional vapor distributor 3303 to allow even dispersal of the slurry vapor 311. As the slurry vapor 311 rises it passes through the filter bags 3205 removing particulates from the slurry vapor stream 311. The slurry vapor 311 travels upward through the interior of the bag 3205 and exits through the outlet 3305 as filtered slurry vapor 316.

The frame assembly 3307 holds the filter bags 3205 and ensures the slurry vapor 311 is routed through the steam filter sub-assembly 315. The filter bags 3205 are grouped together into a common manifold 3213 and hang on the inside of the unit.

As the steam filter sub-assembly 315 operates particulates will accumulate on the outside of the filter bags 3205. The differential pressure between the inlet 3301 and outlet 3305 can be used to monitor how well slurry vapor 311 is passing though the filters 3205. A higher differential pressure indicates the filter bags 3205 are starting to clog. Once the differential pressure between the inlet 3301 and outlet 3305 is above a set value the bags can be cleaned via purging. A series of purge valves 3209 are located above the filter bags 3205 to remove particulates from the exterior surface of the filter bags 3205. Superheated steam 3207 is utilized to perform the purging. The use of superheated steam 3207 prevents condensation from forming on the filter bags 3205 which would impede filtering. An optional line can be added into the inlet to inject additional superheated steam 3211 into the slurry vapor inlet stream 311 (not shown). Optional heating coils 3215 (not shown) can be included in the frame 3307 to keep the environment superheated in the steam filter sub-assembly 315.

Compressor

FIG. 34 is a block diagram of the compressor 317. The compressor 317 may be of conventional construction. The compressor 317 receives filtered slurry vapor 316 from the steam filter sub-assembly 315. Pressurized slurry vapor 319 exits the compressor 317. The vapor entering the compressor 317 is typically filtered slurry vapor 316 if the optional steam filter sub-assembly 315 is included.

Pressurizing the filtered slurry vapor 316 increases the temperature of the vapor providing the necessary temperature difference to continuously evaporate water from the wet degassed slurry 308 located on the exterior surface of the drying discs 905. In this example, the pressurization of the slurry vapor 316 is achieved using a conventional centrifugal steam compressor 317.

A de-superheater 3401 may be included to ensure that the outlet pressurized slurry vapor 319 is saturated and does not superheat. Saturated vapor is preferable for transferring heat.

Those skilled in the art will realize that there are equivalent alternative devices that may be constructed to achieve pressurization of the slurry.

The inlet slurry vapor 316 to the compressor 317 is close to saturated conditions of approximately 1 bar and 100° C., although other saturated conditions can be used in other examples. The slurry vapor 316 is pressurized to approximately 1.38 bar and 108° C. by the steam compressor 317, although other pressures can be used in other examples. The lower pressure side of the dryer 309 can be above or below atmospheric conditions. Following the compressor 317, the pressure of the slurry vapor 316 is increased to generate pressurized slurry vapor 319.

The dryer cold side and hot side can operate at any pressure as long as the hot side is at higher pressure than the cold side. Specifically, operation could be under a vacuum, or under higher pressure than atmospheric.

For example, if there are components to recover that are sensitive to high heat (i.e. in the food industry) operation may be under under vacuum to lower the boiling point of the constituents and still evaporate them, but at lower temperatures so the recovered product is not degraded.

Controls

Typical processes implemented in the multi-functional slurry processing system 301 include a start up process, normal operating processes(s), and a clean-in-place process. The multi-functional slurry processing system 301 of the illustrated example also includes a plurality of automated, integrated, computerized controls interconnected and configured for control of the entire system with only minimal supervision from an operator, during normal operation. Control and monitoring of the equipment and processes are accomplished primarily through a central programmable logic controller ("PLC") that collects inputs from a plurality of sensors, processes the information, and sets output levels for the control devices, such as the valves, motors and the like.

The PLC is also configured to control operation of specialty controls such as the auxiliary heat source 507 used during start up and the clean-in-place system 505. The PLC is also configured to divide the overall system into manageable subsystems, such as material flow, steam filter, steam compression, and condensate recovery. Control inputs are provided to decouple subsystems from each other to the extent desired. The subsystems can be further divided into control loops to provide set points for individual outputs.

The material flow subsystem is configured to provide the correct quantity of wet slurry 303 to the system. Control loops are used to provide the correct quantity of wet slurry 303 to enter the dryer sub-assembly 349, to adjust the drive motors so the discs 905 are rotating at an appropriate rate, and to modulate the dried solids handling system 913 to remove dried solids 313 from the system. This system will also monitor the level of slurry 303 in the slurry holding tank, the pressure and temperature of the slurry infeed, and the level of dried solids 313 in the dried solids bin.

The optional steam filter subsystem 315 is configured to maintain the steam passing through the steam filters in a superheated state to avoid moisture accumulation on the steam filter bags 3205. Control loops are used to regulate superheated steam flow to the heating coils 3215 and steam injection port 3211 and to activate the steam purge valves 3209 when the differential pressure increases across the steam filter bags 3205. This system will also monitor the temperature and pressure of the incoming slurry vapor 311 and the differential pressure across the filter bags 3205.

The steam compression subsystem 317 is configured to maintain an appropriate temperature gradient across the dryer sub-assembly 349. Control loops are used to provide steam at the correct amount, temperature, and pressure by adjusting the compressor 317 speed. This system will also monitor the internal pressure in the dryer 349, the flow, temperature, and pressure of the slurry vapor entering 316 and exiting 319 the compressor 317, and the temperature of the dryer chamber 349.

Figure 35:
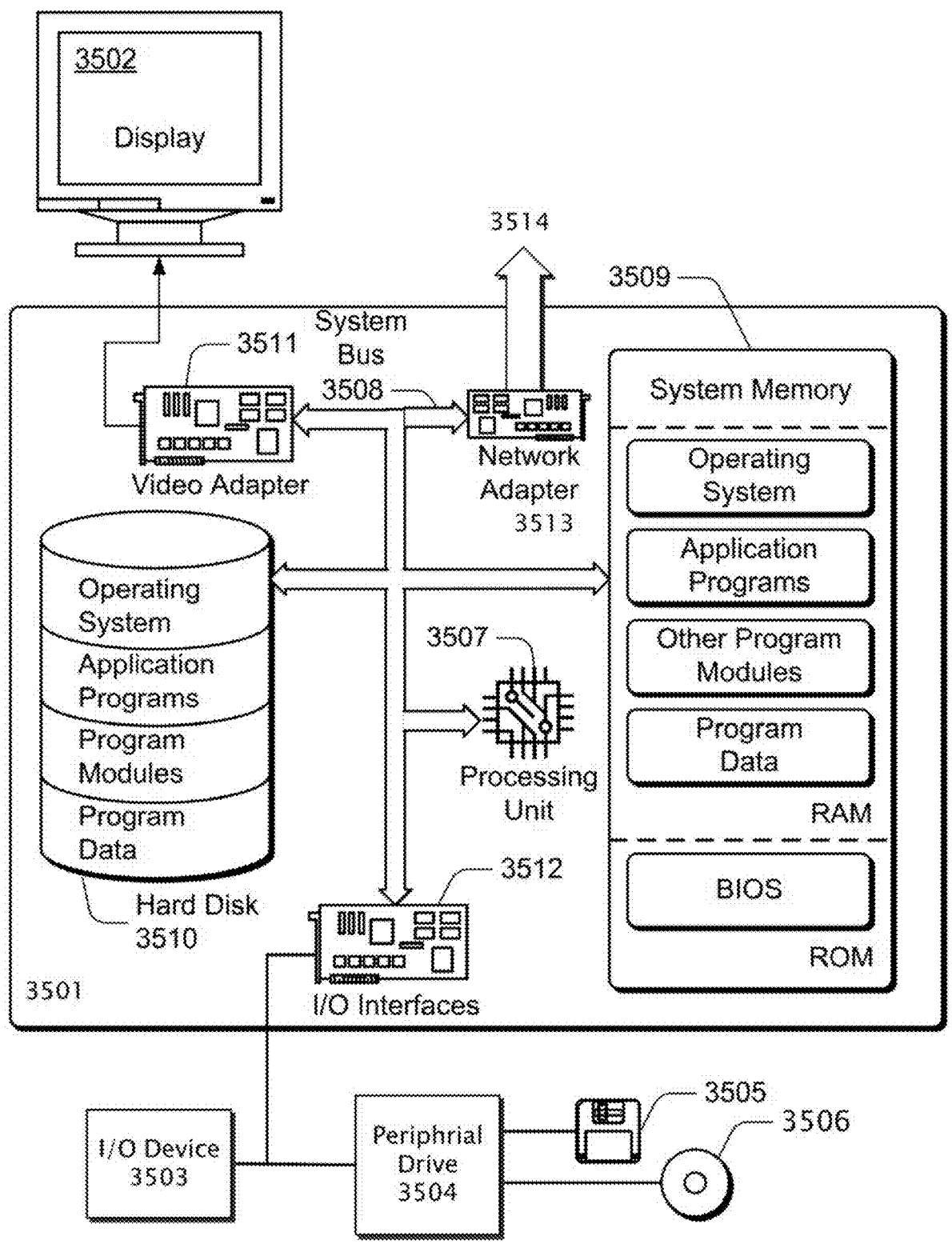
FIG. 35 illustrates an exemplary computing environment in which the control of the multi-functional slurry processing system described in this application, may be implemented.

FIG. 35 illustrates an exemplary computing environment 3500 in which the control of the multi-functional slurry processing system described in this application, may be implemented. Exemplary computing environment 3500 is only one example of a computing system and is not intended to limit the examples described in this application to this particular computing environment.

For example, the computing environment 3500 can be implemented with numerous other general purpose or special purpose computing system configurations. Examples of well known computing systems, may include, but are not limited to, personal computers, hand-held or laptop devices, microprocessor-based systems, PLC controllers, PIC controllers, multiprocessor systems, tablets, cellular telephones, and the like.

The computer 3500 includes a general-purpose computing system in the form of a computing device 3501. The components of computing device 3501 can include one or more processors (including CPUs, GPUs, microprocessors and the like) 3507, a system memory 3509, and a system bus 3508 that couples the various system components. Processor 3507 processes various computer executable instructions, including those to control the operation of the multi-functional slurry processing system, to control the operation of computing device 3501 and to communicate with other electronic and computing devices (not shown). The system bus 3508 represents any number of several types of bus structures, including a memory bus or memory controller, a peripheral bus, an accelerated graphics port, and a processor or local bus using any of a variety of bus architectures.

The system memory 3509 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 3507.

Mass storage devices 3504 may be coupled to the computing device 3501 or incorporated into the computing device by coupling to the buss. Such mass storage devices 3504 may include a magnetic disk drive which reads from and writes to a removable, non-volatile magnetic disk (e.g., a "floppy disk") 3505, or an optical disk drive that reads from and/or writes to a removable, non-volatile optical disk such as a CD ROM or the like 3506. Computer readable media 3505, 3506 typically embody computer readable instructions, data structures, program modules and the like supplied on floppy disks, CDs, portable memory sticks and the like.

Any number of program modules can be stored on the hard disk 3510, Mass storage device 3504, ROM and/or RAM 3509, including by way of example, an operating system, one or more application programs, other program modules, and program data. Each of such operating system, application programs, other program modules and program data (or some combination thereof) may include an embodiment of the systems and methods described herein.

A display device 3502 can be connected to the system bus 3508 via an interface, such as a video adapter 3511. A user can interface with computing device 702 via any number of different input devices 3503 such as a keyboard, pointing device, track-pad, mouse, serial port, and/or the like. These and other input devices are connected to the processors 3507 via input/output interfaces 3512 that are coupled to the system bus 3508, but may be connected by other interface and bus structures, such as a parallel port, game port, and/or a universal serial bus (USB).

Computing device 3500 can operate in a networked environment using connections to one or more remote computers through one or more local area networks (LANs), wide area networks (WANs) and the like. The computing device 3501 is connected to a network 3514 via a network adapter 3513, a wireless interface, or alternatively by a modem, DSL, ISDN interface or the like.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Direct Application Sub-Assembly

Figure 36:
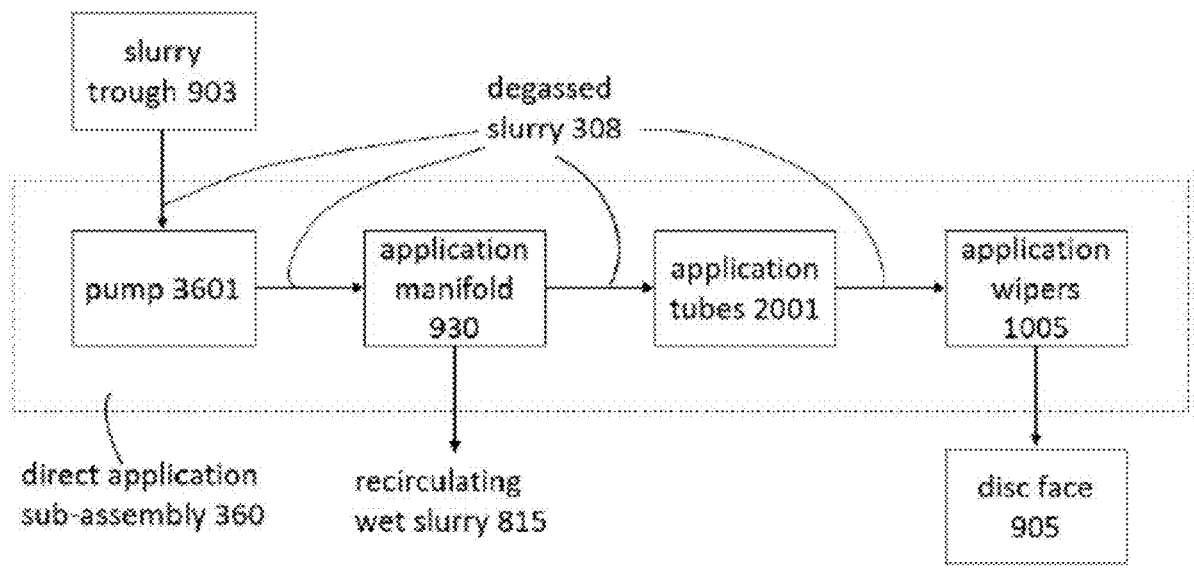
FIG. 36 is a block flow diagram of the direct application sub-assembly

FIG. 36 is a block diagram of the optional direct application sub-assembly 360. The purpose of the direct application sub-assembly is to improve drying, by improving the application of slurry to the flat faces of the drying disks (905 of FIG. 9) This sub-assembly causes the movement of wet degassed slurry 308 from the slurry trough 903 to the application wipers 1005. This movement and distribution can be achieved by using any combination of a pump 3601, application manifold 930, application tubes 2001, application wipers 1005, or similar equipment known to those skilled in the art. The direct application sub-assembly 360 may also optionally remove recirculating wet slurry 815.

Figure 37:
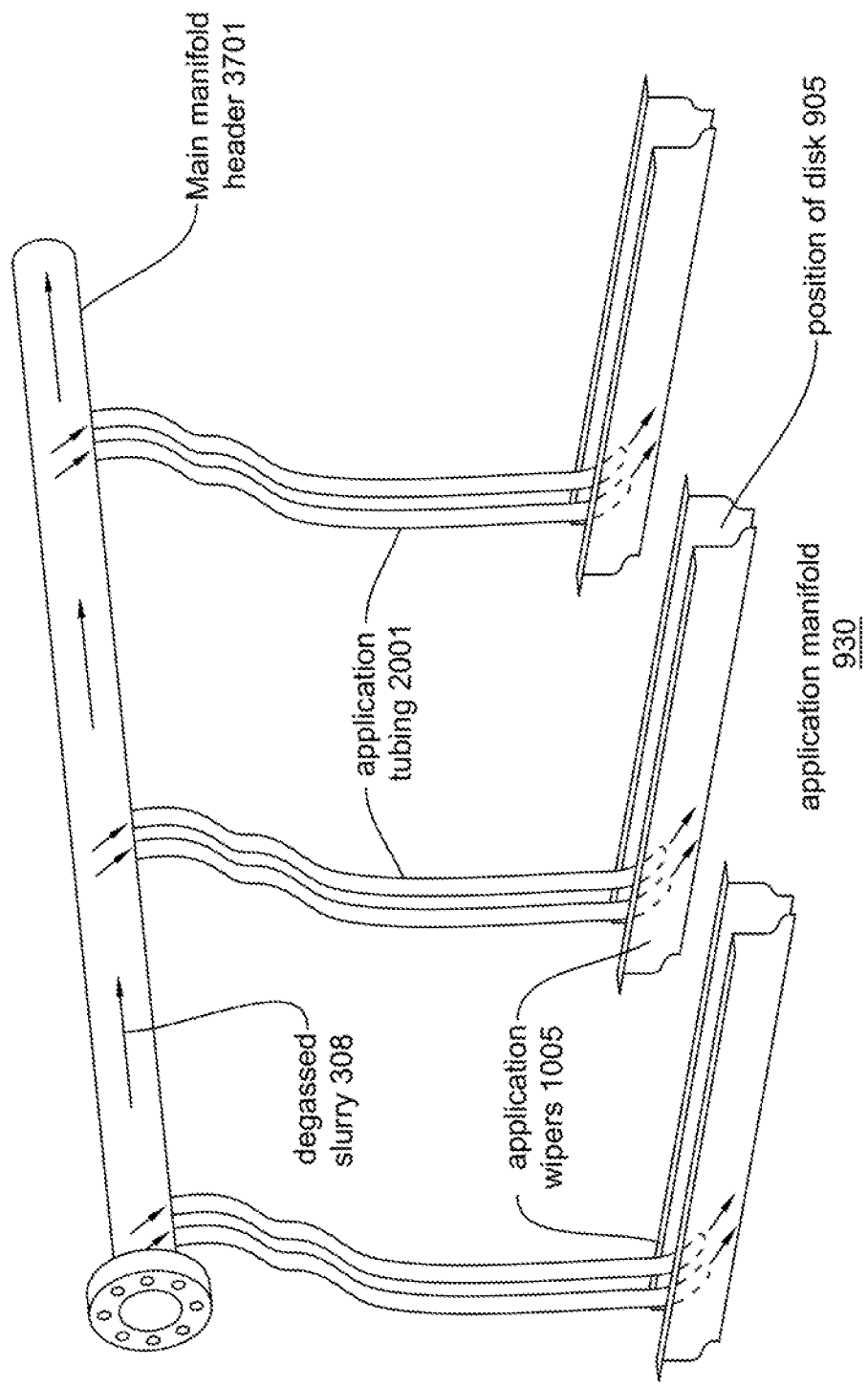
FIG. 37 is a partial isometric view of the application manifold

FIG. 37 is a partial isometric display of the application manifold 930 of the direct application sub-assembly 360. The manifold 930 provides an even distribution of wet degassed slurry 308 throughout the dryer cold side 309. The sizing of the main manifold header 3701 and the application tubing 2001 can be adjusted to meet specific unit flow rate requirements.

The application tubes 2001, are shown as a pair of tubes going from the manifold 3701 to each wiper of a pair of wipers 1005. In alternative examples equivalent tubing arrangements may be provided to route slurry from the manifold 3701 to each blade of the wipers 1005. The application tubes 2001, having a first end coupled to the manifold 3701 feed wet degassed slurry 308 to the application wipers 1005, coupled to a second end of the application tubing 2001. Drying discs 905 (of FIG. 9) are situated between each of the application wiper pairs 1005. As the disks turn an even coating of slurry is applied to the opposing disk faces of the drying disk.

Figure 38:
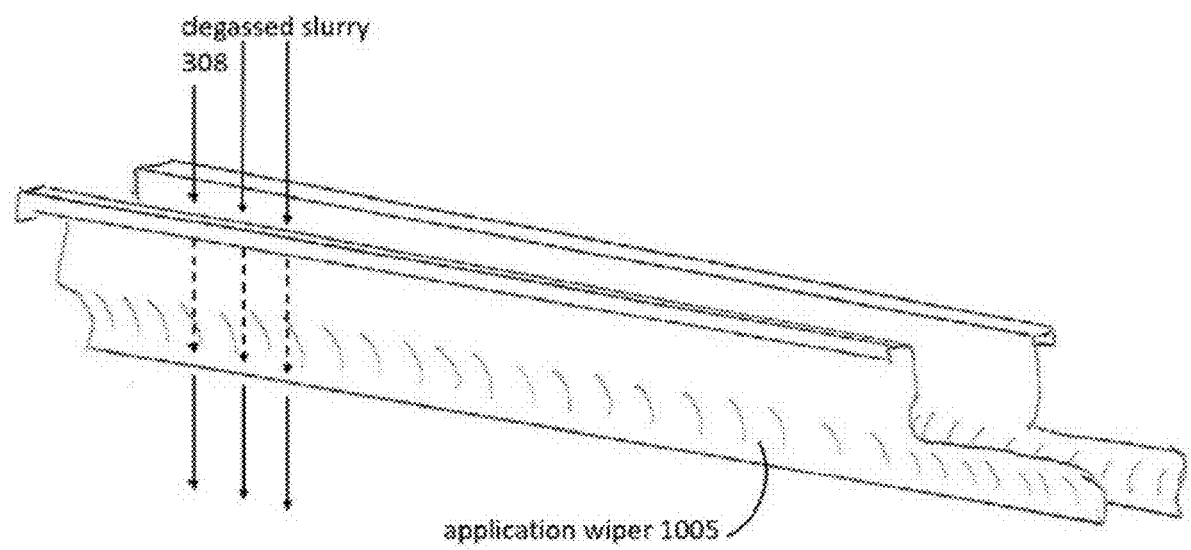
FIG. 38 is a partial isometric view of the application wipers

FIG. 38 is a partial isometric display of the application wipers 1005. The wipers 1005 may be fixedly positioned to provide a desired coating thickness of degassed slurry 308 (or equivalently slurry that has not been degassed), or otherwise configured as known by those skilled in the art to do so. The application wipers 1005 can provide wet degassed slurry 308 to be evenly applied to the faces of disc 905 (of FIG. 9). The application wipers 1005 can provide effective of coating, thickness control, and application rate of wet degassed slurry 308 to the faces of disc 905 (of FIG. 9). The application wipers also provide an innovative application system that increases the efficiency of direct application of slurry as it can allow for a higher percentage of the wet degassed slurry that flows through the application manifold 930 (of FIG. 9) to adhere to the faces of disc 905 (of FIG. 9). Drying discs 905 (of FIG. 9) are situated between application wiper pairs 1005.

Figure 39:
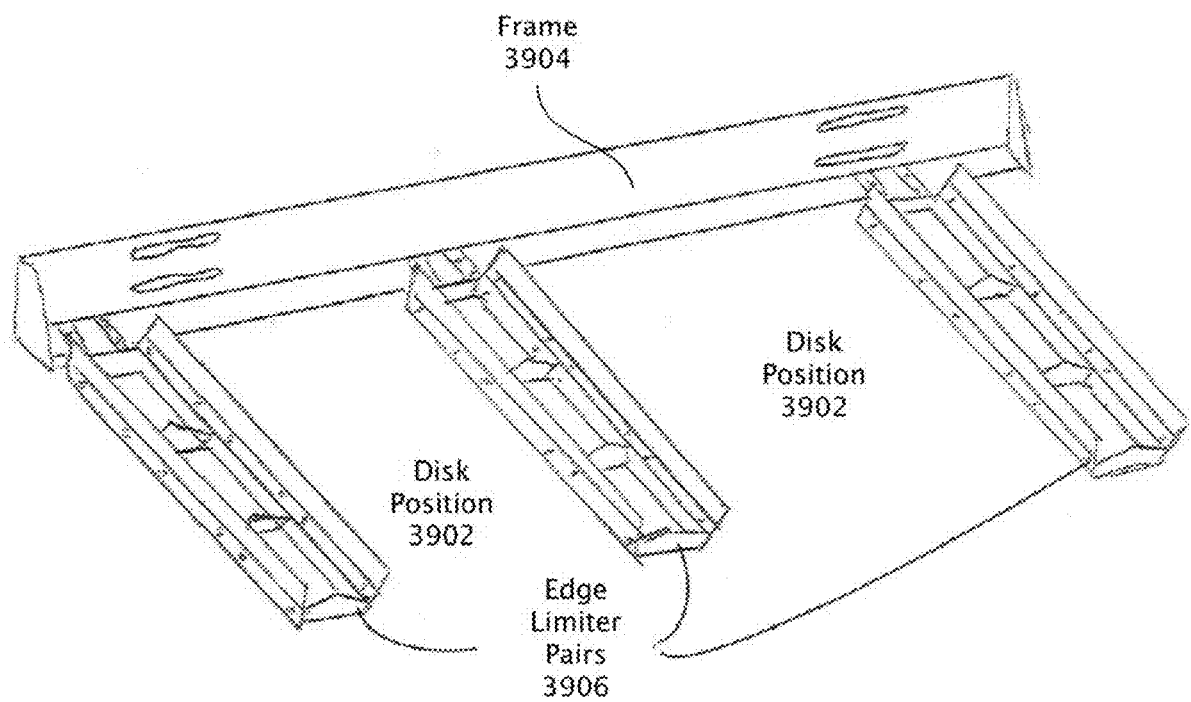
FIG. 39 is a partial isometric view of the edge limiters

FIG. 39 is a partial isometric display of the edge limiter assembly 2002. Edge limiter pairs 3906 are mechanically coupled to a supporting frame 3904. Drying discs (not shown) are situated between edge limiter pairs 3902.

The edge limiter assembly allows for higher drying efficiency, as it can ensure the material thickness of wet degassed slurry that adheres to the disc face before it dries and is scraped off. Similar methods can be used as known by those skilled in the art.

Figure 40:
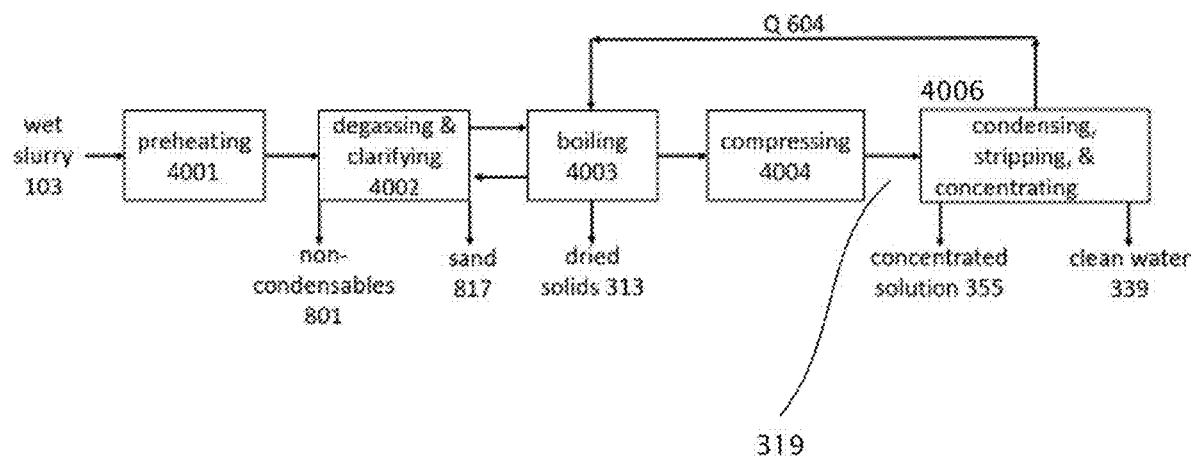
FIG. 40 is an overall process diagram of multi-functional slurry processing.

FIG. 40 is an overall process diagram of multi-functional slurry processing. This outlines the high level process operations within multi-functional slurry processing. The steps outline the general flow path through the system. The inlet wet slurry 103 first is enters a preheating process block 4001. Next the flow enters a degassing and clarifying process block 4002 where non-condensables 801 and larger particles and sand 817 are removed Then the flow enters a boiling process block 4003 where dried solids 313 are removed and the flow is vaporized. After that the flow enters a compressing process block 4004 where the pressure is increased. Finally, the flow 319 enters a condensing, stripping & concentrating process block 4006. Within this process block the flow undergoes condensation coupled with a cross current flow of vapor and liquid. This results in the separation of clean water 355 and the low boiling point constituent concentrated solution 355. This final process block also transfers heat 604 to the earlier boiling process block 4003.

Figure 41:
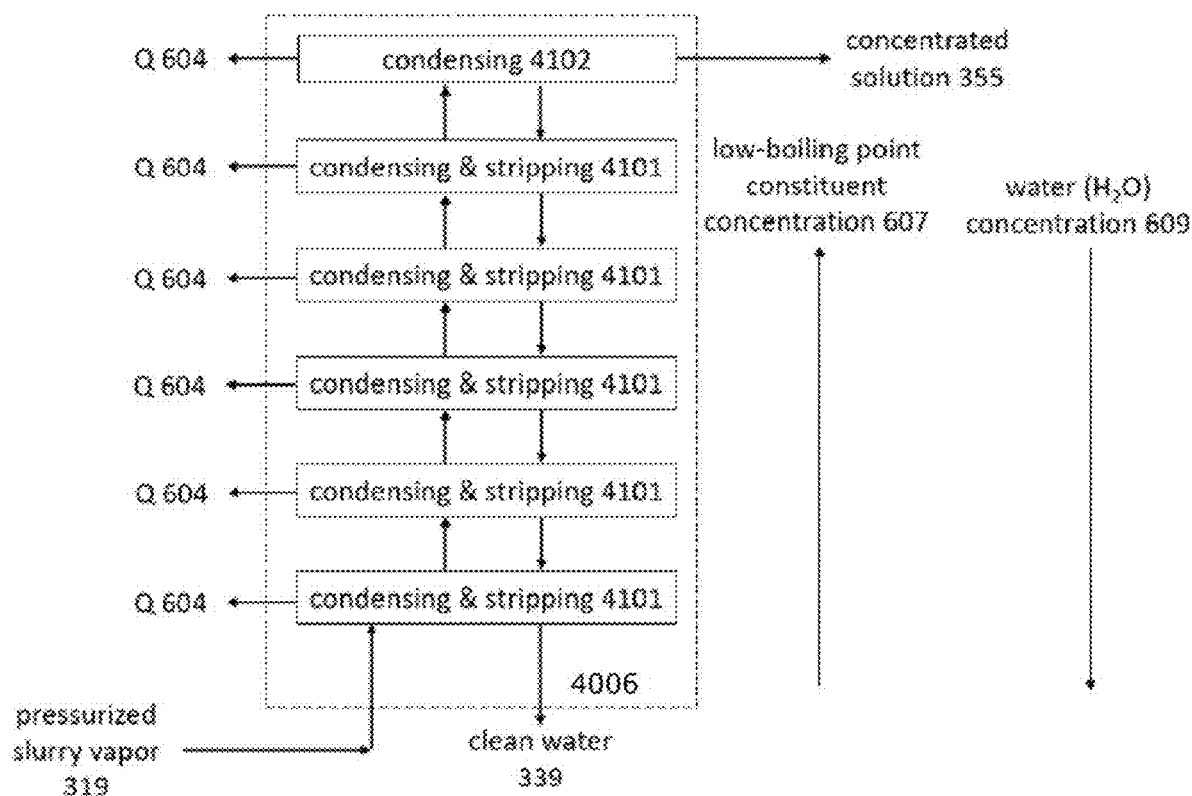
FIG. 41 is a detailed process diagram of the condensing, stripping, and concentrating block of FIG. 40.

FIG. 41. Is a detailed process diagram of the condensing, stripping, and concentrating process block 4006 of (FIG. 40). Pressurized slurry vapor 319 enters the condensing, stripping, and concentrating step 4100. Within this process block there are a series of condensing and stripping steps 4101 where vapor enters and is partially condensed. The inlet pressurized slurry vapor 319 enters the first condensing and stripping process block 4101. Due to the partial condensing that occurs within this first condensing and stripping process block 4101, a smaller vapor flow exits this process block that is more concentrated in a low-boiling point constituent. This vapor flows to the next condensing and stripping process block 4101. The act of condensing releases energy (Q 604). While the vapor is passing through the first condensing and stripping process block 4101, a water rich liquid from the next condensing and stripping process block 4101 flows into the first condensing and stripping process block 4101. This water undergoes stripping of the low-boiling point constituent within the first condensing and stripping process block 4101. This results in an even more water rich liquid flow to exit the first condensing and stripping process block. Since it is the first condensing and stripping process block 4101, the liquid flow out is clean water 339. In this diagram five condensing and stripping 4101 process blocks are shown however, any number of condensing and stripping process blocks 4101 can be linked together in series or parallel. Linking the condensing and stripping process blocks 4101 together results in the low-boiling point constituent concentration 607 to increase in the vapor and the water ($H_2O$) concentration 609 to increase in the liquid. At the end of the condensing, stripping, and concentrating process block 4100, the optional sub-process block condensing 4102 converts the low-boiling point rich vapor from the last condensing and stripping 4101 process block into a liquid concentrated solution 355.

FIG. 42 shows an alternative flow path of pressurized slurry vapor 319, concentrated slurry vapor I 323, concentrating tower condensate 331, and dryer condensate 333 of that previously shown in FIG. 11. Within this structure there is a series of baffles 4201 that direct flow through the shaft 917 and the drying discs 905. Pressurized slurry vapor enters through the rotary union inlet 919 where it meets a baffle 4201. This baffle 4201 directs the pressurized slurry vapor 319 into one or more drying discs 905. The pressurized slurry vapor 319 flows through the drying disc 905 back into the shaft 917 on the other side of the baffle 4201. This steam then flows through the next drying disc 905 or set of drying discs 905 in the same manner. As the steam flows through the disks, it also purges non-condesables from the system. This continues the length of the dryer. Both concentrating tower condensate 331 and dryer condensate 333 flows counter current to the pressurized slurry vapor 319 and concentrated slurry vapor I 323.

The invention claimed is:

1. A system for the processing of waste, the system comprising:
    a preheater comprised of at least a cold side configured to receive a wet slurry on the cold side, and a hot side, wherein heat from the hot side can pass to the cold side to produce a heated wet slurry;
    a degassing sub-assembly configured to receive the wet slurry from the preheater;
    a dryer comprised of at least a cold side configured to receive slurry from the degassing sub-assembly and output a slurry vapor and dried solids, and a hot side configured to receive a pressurized slurry vapor and output a first concentrated slurry vapor and dryer condensates, the hot side including:
        one or more drying discs that are substantially cylindrical with a shaft running through a center thereof, wherein each of the one or more drying discs is at least partially hollow and contains one or more disc condensate tubes and one or more disc condensate scoops configured to output the dryer condensates; and
    a compressor configured to receive the slurry vapor and output the pressurized slurry vapor into the hot side of the dryer.

2. The system for the processing of waste of claim 1, the system further comprising:
    a steam filter configured to receive the slurry vapor and remove particulates from the slurry vapor.

3. The system for the processing of waste of claim 1, the system further comprising:
    a concentrator apparatus having at least a hot side configured to receive the first concentrated slurry vapor from the dryer and to further concentrate the slurry vapor into a super concentrated slurry vapor, and a cold side configured to output water.

4. The system for the processing of waste of claim 1, further comprising:
    a condenser configured to receive super concentrated slurry vapor.

5. The system for the processing of waste of claim 1, wherein the one or more drying discs further comprise:
    one or more shaft condensate tubes aligned with the one or more disc condensate tubes and are configured to remove dryer condensate from the interior of the one or more drying discs.

6. The system for the processing of waste of claim 1, wherein the dryer hot side is further comprised of one or more scrapers configured to scrape the surface of each of the one or more drying discs.

7. The system for the processing of waste of claim 6, wherein the dryer hot side is further comprised of one or more edge limiters for each of the one or more drying discs configured to evenly redistribute liquids on a surface of the one or more drying discs.

8. The system for the processing of waste of claim 7, wherein the dryer hot side is further comprised of one or more wipers configured to evenly distribute slurry onto the one or more drying discs.

9. A method of processing slurry using the system for the processing of waste of claim 1 comprising:
    preheating the wet slurry with the dryer condensates in the preheater to produce a cooled dryer condensate and the wet heated slurry;
    evaporating the heated slurry to separate the slurry into the dried solids and the slurry vapor;
    compressing the slurry vapor to produce the pressurized slurry vapor; and
    utilizing the pressurized slurry vapor as a heat source for the evaporating, whereby, the dryer condensates are produced.

10. The method of processing slurry of claim 9, further comprising degassing the heated wet slurry prior to the drying using the degassing sub-assembly.

11. The method of processing slurry of claim 9, in which the pressurized slurry vapor condenses to provide energy for the evaporating of the heated slurry, and forms a first concentrated slurry vapor that strips at least one of a plurality of low boiling point constituents from the dryer condensate.

12. The method of processing slurry of claim 11, further comprising concentrating the first concentrated slurry vapor to produce a second concentrated slurry vapor and a concentrating tower condensate.

13. The method of processing slurry of claim 12, further comprising condensing the second concentrated slurry vapor.

14. The method of processing slurry of claim 12, further comprising applying the concentrating tower condensate to the dryer hot side.

15. A system comprising:
    a dryer including
        a slurry trough containing a heated slurry;
        a plurality of adjacent heated rotating hollow circular drying discs for collecting dried solids scraped from the plurality of adjacent heated rotating hollow circular drying discs;
        a hollow spindle coupling each heated rotating hollow circular drying disc of the a plurality of adjacent heated rotating hollow circular drying discs and forming a pathway for an input flow of a pressurized slurry vapor, and an input for a counter flow pathway for a concentrating tower condensate;

a compressor with a compressor input coupled to a dryer cold side of the dryer, and a compressor output coupled to the pathway for the input flow of the pressurized slurry vapor in the dryer; and a concentrating tower sub-assembly coupled to the pressurized slurry vapor pathway of the dryer for accepting a first concentrated slurry vapor from the dryer, the concentrating tower sub-assembly including a concentrating tower that passes the concentrating tower condensate to the input of the dryer, the concentrating tower having an output coupled to the input of the dryer, and a second output for a second concentrated slurry vapor.

16. The system of claim 15, further comprising a condensing sub-assembly coupled to the second output of the concentrating tower.

17. The system of claim 15, further comprising a preheater coupled to the slurry trough of the dryer by a wet slurry input, the preheater configured to heat a slurry feed to provide the heated slurry of the slurry trough.

18. The system of claim 17, in which a heat input to the preheater is coupled to a first dryer spindle input.

19. The system of claim 15, further comprising a degassing subassembly coupled to the slurry trough.

20. The system of claim 15, in which the dryer further includes a direct application subassembly coupled to each of the a plurality of adjacent heated rotating hollow circular drying discs.

\* \* \* \* \*